US007924315B2

United States Patent
Kanamori et al.

(10) Patent No.: US 7,924,315 B2
(45) Date of Patent: Apr. 12, 2011

(54) IMAGE PROCESSING METHOD, IMAGE PROCESSING APPARATUS, IMAGE PROCESSING PROGRAM, AND IMAGE FILE FORMAT

(75) Inventors: Katsuhiro Kanamori, Nara (JP); Hideto Motomura, Nara (JP); Hiroyoshi Komobuchi, Kyoto (JP)

(73) Assignee: Panasonic Corporation, Osaka (JP)

( * ) Notice: Subject to any disclaimer, the term of this patent is extended or adjusted under 35 U.S.C. 154(b) by 674 days.

(21) Appl. No.: 11/807,716

(22) Filed: May 30, 2007

(65) Prior Publication Data
US 2007/0229658 A1 Oct. 4, 2007

Related U.S. Application Data

(63) Continuation of application No. PCT/JP2005/021257, filed on Nov. 18, 2005.

(30) Foreign Application Priority Data

Nov. 30, 2004 (JP) ................................. 2004-346985

(51) Int. Cl.
*G06K 9/40* (2006.01)
*G06K 9/00* (2006.01)
*G06K 9/32* (2006.01)

(52) U.S. Cl. ................... 348/207.99; 382/253; 382/298; 382/254

(58) Field of Classification Search .................. 348/135, 348/140, 143, 146, 207.99, 208.13, 220.1, 348/222.1; 382/108, 118, 159, 160, 170, 382/209, 299, 243, 173, 176, 254, 263, 266, 382/275, 276, 298, 300, 240, 253
See application file for complete search history.

(56) References Cited

U.S. PATENT DOCUMENTS

| 5,517,588 | A | 5/1996 | Kondo |
| 6,647,139 | B1 * | 11/2003 | Kunii et al. ................... 382/159 |
| 6,681,056 | B1 | 1/2004 | Tseng et al. |
| 6,847,397 | B1 * | 1/2005 | Osada ............................ 348/273 |

(Continued)

FOREIGN PATENT DOCUMENTS

AU 7184701 1/2002

(Continued)

OTHER PUBLICATIONS

Yoshito Abe, et al., "Edge Enhancement of Images Using Multiresolution Vector Quantization," in The Institute of Electronics, Information and Communication Engineers, Tokyo, Japan, May 25, 1996, vol. J79-A, No. 5, pp. 1032-1040, and a partial English translation thereof.

(Continued)

*Primary Examiner* — David L Ometz
*Assistant Examiner* — Peter Chon
(74) *Attorney, Agent, or Firm* — Harness, Dickey & Pierce, P.L.C.

(57) ABSTRACT

In a learning process, first, images having different resolutions are obtained from a target region of the subject (S101). Further, the subject characteristic of the target region is obtained (S102). Then, the resolution conversion rules are learned from the images having different resolutions, and those are recorded to a storage device along with the subject characteristics (S103). When converting the resolutions, the resolution conversion rules learned for the corresponding subject characteristics are applied to each region of the original image so as to convert the resolutions of the original image.

14 Claims, 45 Drawing Sheets

U.S. PATENT DOCUMENTS

| | | | |
|---|---|---|---|
| 6,961,466 B2 * | 11/2005 | Imagawa et al. | 382/190 |
| 7,085,436 B2 * | 8/2006 | Akhan et al. | 382/298 |
| 7,203,381 B2 * | 4/2007 | Motomura et al. | 382/299 |
| 7,366,330 B2 * | 4/2008 | Ito | 382/118 |
| 7,636,393 B2 * | 12/2009 | Kanamori et al. | 375/240.21 |
| 2002/0114534 A1 * | 8/2002 | Nakamura et al. | 382/276 |
| 2004/0151376 A1 * | 8/2004 | Nomura et al. | 382/181 |

FOREIGN PATENT DOCUMENTS

| | | |
|---|---|---|
| CN | 1520580 A | 8/2004 |
| EP | 571180 A2 | 11/1993 |
| JP | 05-328185 | 12/1993 |
| JP | 07-067028 A | 3/1995 |
| JP | 07-143439 | 6/1995 |
| JP | 08-251477 | 9/1996 |
| JP | 11-252428 | 9/1999 |
| JP | 11252428 A * | 9/1999 |
| JP | 11-344669 | 12/1999 |
| JP | 3240339 | 10/2001 |
| JP | 2002-170112 A | 6/2002 |
| JP | 2002-203240 A | 7/2002 |
| JP | 2003-203237 | 7/2003 |
| JP | 2004-518312 A | 6/2004 |
| JP | 2004-240622 A | 8/2004 |
| WO | 02/05208 A2 | 1/2002 |

OTHER PUBLICATIONS

Shinji Umeyama, "Separation of Diffuse and Specular Components of Surface Reflection—Using Multiple Observations through a Polarizer and Probabilistic Independence Property," Symposium on Image Recognition and Understanding 2002, pp. I-469-I-476, and a partial English translation thereof.

Shinji Umeyama, "Simultaneous Observation System of Two Images for Diffuse/Specular Reflection Separation", The 9$^{th}$ Symposium on Sensing via Image Information, Transactions, I-1, pp. 537-542.

* cited by examiner

\<Recording process\>

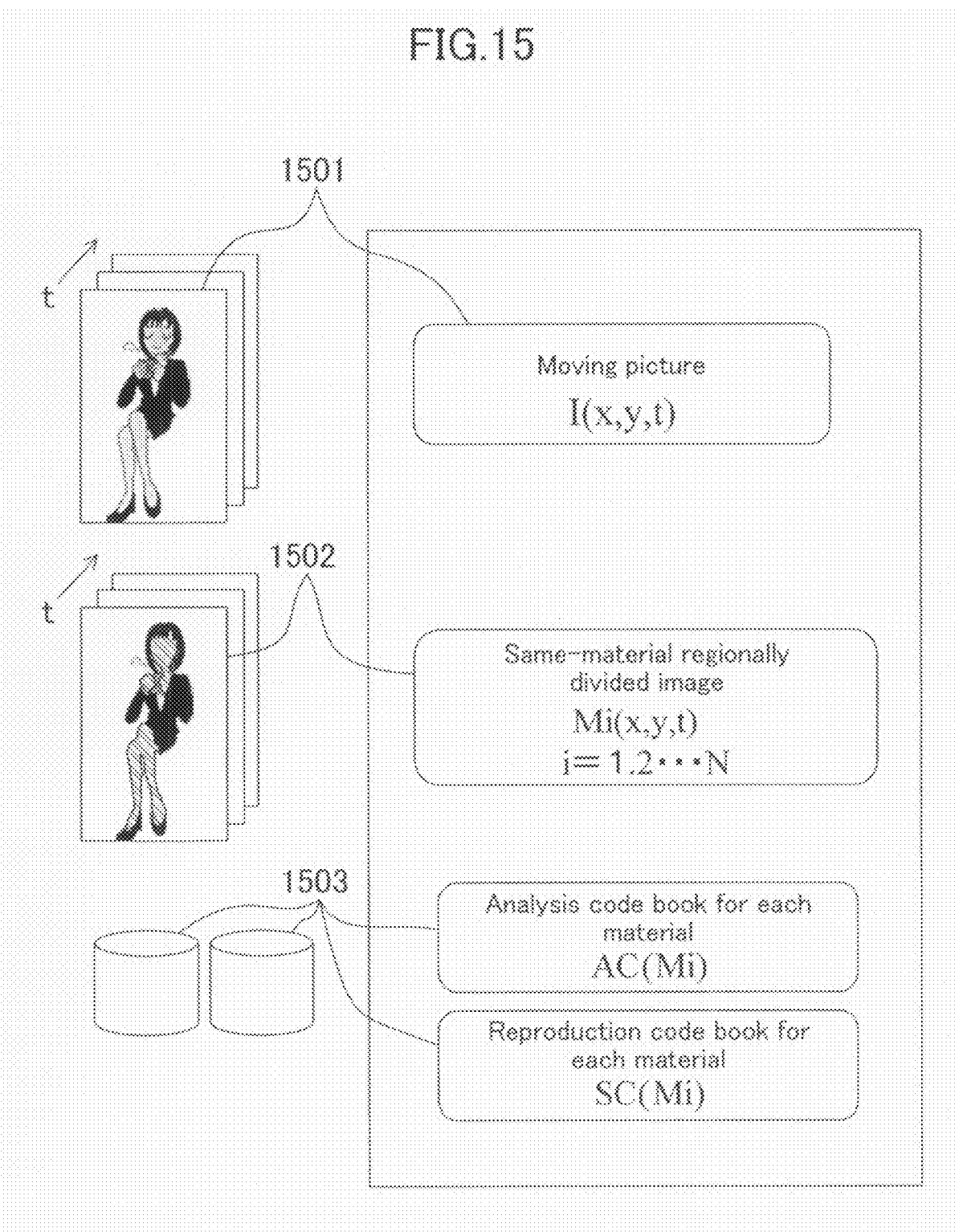

401 Optical-axis variable zooming mechanism

<Moving picture recording process>

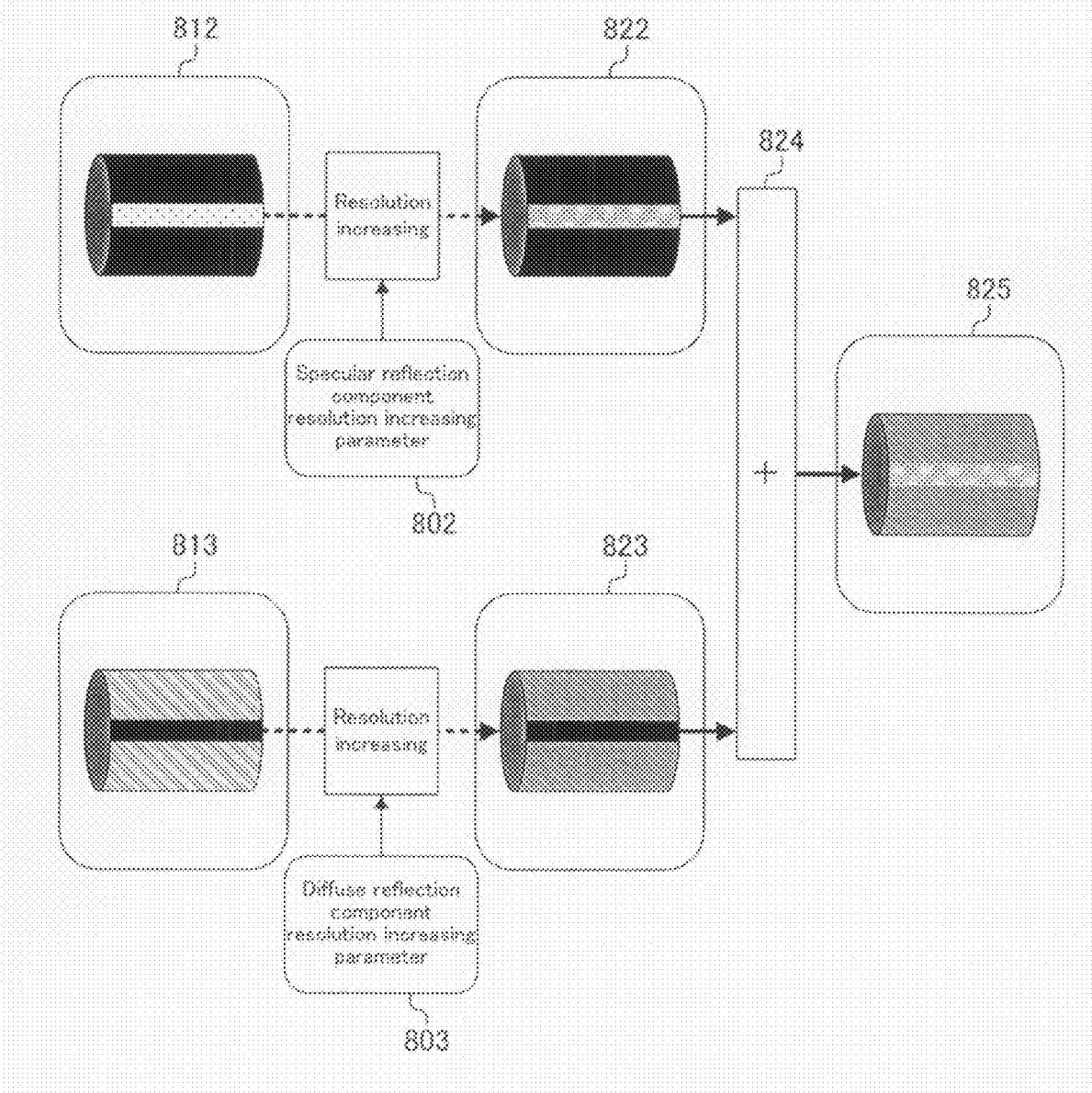

IMAGE PROCESSING METHOD, IMAGE PROCESSING APPARATUS, IMAGE PROCESSING PROGRAM, AND IMAGE FILE FORMAT

CROSS-REFERENCE TO RELATED APPLICATIONS

This is a continuation of Application PCT/JP2005/021257, filed on Nov. 18, 2005. This non-provisional application claims priority under 35 U.S.C. §119(a) on Patent Application No. 2004-346985 filed in Japan on Nov. 30, 2004, the entire contents of which are hereby incorporated by reference.

BACKGROUND OF THE INVENTION

1. Technical Field

The present invention relates to an image processing technique, and more particularly, to a technique for performing resolution conversion such as providing increased resolution in moving pictures.

2. Background Art

Due to spreading of digital video apparatus networks, it has become common to handle digital images in different standard formats in various input/output apparatuses. In particular, there are various kinds of image sizes ranging from a low resolution to an ultra-high resolution. In still pictures, it is common for an imaging element of a consumer digital still camera to have 5 million pixels or more. Currently, there has been introduced a product with more than 10 million pixels, and it has come close to achieving sufficiently high resolution to be used in printing digital pictures.

However, it is anticipated that the use of digital images in the future will be developed into such cases where a part of an actual image is cut out and enlarged or deformed, and texture mapping is carried out for creating a real CG, etc. Further, when used in electronic commercial transactions or medical services, there is also an interactive display usage for allowing an interested region of an image to be enlarge-displayed when presenting the target product or a diseased portion on a display. Further, since high resolution in still pictures has been achieved to a certain extent, it is anticipated that there will be great needs for expanding the resolution in moving pictures in the future (particularly high-resolution moving pictures which are so good that each of the frame images can be used as a still picture as in a movie film).

As described, it is desired to achieve still higher resolution of image digitally. In order to meet this demand, not only the advancement in imaging elements but also sophistication of the digital image processing is essential.

As the application targets of the high-resolution images, there are two fields, e.g. a field of an image input system such as a camera, and a field of image display system such as a television. This application of the present invention regards mainly to an application of the image input system.

As a conventional technique of this field, there is a technique that employs an optical zooming mechanism to obtain a high-resolution still picture with a wide view angle in the end, even though it uses a low-resolution imaging device.

For example, Patent Document 1 discloses a camera that generates a single wide-view-angle/high-resolution still picture by successively superimposing moving pictures, which are filmed by carrying out continuous optical zooming, on an image buffer while considering the zooming ratio. Further, Patent Document 2 discloses a technique for generating a high-resolution image on a master memory, in which: a zoom lens is moved step by step from a maximum zoom position on a telephoto side to a minimum zoom position on a wide angle side; a plurality of images at each position are written to a magnetic tape; and each image is reduced or enlarged to be converted into the images of the same magnification to be superimposed. Furthermore, Patent Document 3 discloses a technique in which a single high-resolution still picture is generated through laminating optical zoom images to each other while aligning the positions, which is composed into a pyramid format of hetero structure.

Moreover, Patent Document 4 discloses a technique for creating a high-resolution moving picture from low-resolution and high-resolution images without using an optical zoom. That is, corresponding points within moving picture of small number of frames captured by a high-resolution and low-speed camera are obtained from the corresponding point information in consecutive moving pictures captured by a low-resolution and high frame rate camera, and high-resolution consecutive frame moving picture is generated form the high-resolution images by using an interpolation technique of the time direction.

Further, Patent Document 5 also discloses a technique for creating a high-resolution moving picture from low-resolution and high-resolution images. In Patent Document 4 described above, a motion is added to a high-resolution still picture to obtain a moving picture. With the technique of Patent Document 5, however, a frame of the low-resolution moving picture and the high-resolution still picture are related by each sample time, and the moving picture is interpolated spatially to achieve high resolution.

Patent Document 1: Japanese Unexamined Patent Publication H11-252428 (FIG. 3)
Patent Document 2: Japanese Unexamined Patent Publication H8-251477 (FIG. 2)
Patent Document 3: U.S. Pat. No. 6,681,056
Patent Document 4: Japanese Unexamined Patent Publication 2003-203237 (FIG. 1)
Patent Document 5: JP Patent Publication No. 3240339 (FIG. 14)

However, the conventional techniques have the following problems.

First, with the technique for generating a high-resolution image using an optical zoom as disclosed in Patent Documents 1-3, there is such a problem that the high-resolution image generated thereby is limited to a till picture. In practice, however, the resolution of a digital moving picture is lower than that of a digital still picture, so that there is a large demand for achieving increased resolution in the digital moving picture.

There are three problems as follows in the conventional techniques regarding the high resolution of moving pictures.

First, when the techniques of Patent Documents 1-3 are applied to a moving picture, it is necessary to execute both a recording process for filming a moving picture by a camera work according to the intention of the shooting person and an image obtaining process for obtaining a partial image by the optical zoom. When both processes are executed in shifted time from each other, relevancy between the high-resolution image and the low-resolution image in each region becomes unclear. Further, in order to find the spatial relevancy for each region of the image, it is necessary to execute the image obtaining process by the optical zoom for each region. For that, it requires repeated actions of carrying out optical zooming by selecting minute regions within the image, which is a complicated work and it is not practical to be done manually.

Second, the technique disclosed in Patent Document 4 is a technique for improving the frame rate of a high-resolution still picture by time interpolation technique, in which a motion is added to a high-resolution still picture with a motion vector. Thus, the image generated thereby is no better than a series of still pictures. Particularly, in a moving picture, there are various scenes that change smoothly due to a change in form, rotary motion of a subject itself, or a camera work such as panning, tilting, and zooming. Therefore, it is difficult to generate all of the high-resolution images by an interpolation technique of the still picture.

Third, the technique disclosed in Patent Document 5 is a technique for creating a spatially high-resolution moving picture from a low-resolution moving picture. Specifically, the moving picture and the still picture are related at dispersed points on the time axis. Thus, for a moving picture frame having no corresponding information, an edge of a similar signal level is searched by using the information of a frame whose relevancy is already known, and pixels to be spatially interpolated are determined considering it as a move of the same subject. Therefore, there is not only a problem of having a heavy load of searching processing, but also having a possibility when there is a change in the distance between the subject or change in form of the subject that it becomes difficult to achieve increased resolution because the moving picture and the still picture cannot be related.

SUMMARY OF THE INVENTION

In view of the forgoing problems, it is an object of the present invention to provide a technique for converting the resolution of an image such as improving the resolution of a moving picture, which achieves highly accurate conversion of the resolution with a small-processing amount.

The present invention enables conversion of the resolution of the original image through: learning resolution conversion rules by each subject characteristic from a plurality of obtained images of the subject having different resolutions from each other; the captured original image is divided into regions based on the subject characteristics; and applying the learned resolution conversion rules regarding the corresponding subject characteristics to the divided regions.

With the present invention, first, the resolution conversion rules of the subject is learned by each subject characteristic from a plurality of images having different resolutions from each other. Further, the original image as a target of the resolution conversion is divided into regions based on the subject characteristics. Then, the resolution conversion rules learned regarding the corresponding subject characteristics region are applied to each region in order to convert the resolution of the original image. That is, resolution conversion of the original image is executed by applying the resolution conversion rules of each subject characteristic, so that it is possible to achieve highly accurate resolution conversion by reflecting the subject characteristics. Furthermore, the processing amount of the image processing is reduced dramatically, since the same conversion rule is applied to the regions that have the same subject characteristic regardless of their positions on the original image.

With the present invention, it is possible to achieve highly accurate resolution conversion by reflecting the subject characteristics with a small amount of image processing. The present invention therefore is effective for converting a low-resolution moving picture into a increased-resolution picture. The optical characteristics calculated from each pixel can be used as the subject characteristics, so that the characteristics can be easily applied to various scenes that change smoothly because of a complicated camerawork, a change in the distance between the camera and the subject, a change in form,
rotary motion, and the like, thereby allowing generation of a high-quality moving picture. Furthermore, the present invention can be applied not only for achieving increased resolution but also for general resolution conversion. Therefore, it can be effectively utilized for generating a low-resolution image used for displaying images in low-resolution display systems such as portable telephones, for example.

BRIEF DESCRIPTION OF THE DRAWINGS

FIG. 15 is an illustration showing an image file format according to the second embodiment of the present invention;

FIG. 46 is a flowchart showing a resolution increasing process according to the eighth embodiment of the present invention.

DESCRIPTION OF THE PREFERRED EMBODIMENTS

Figure 1:
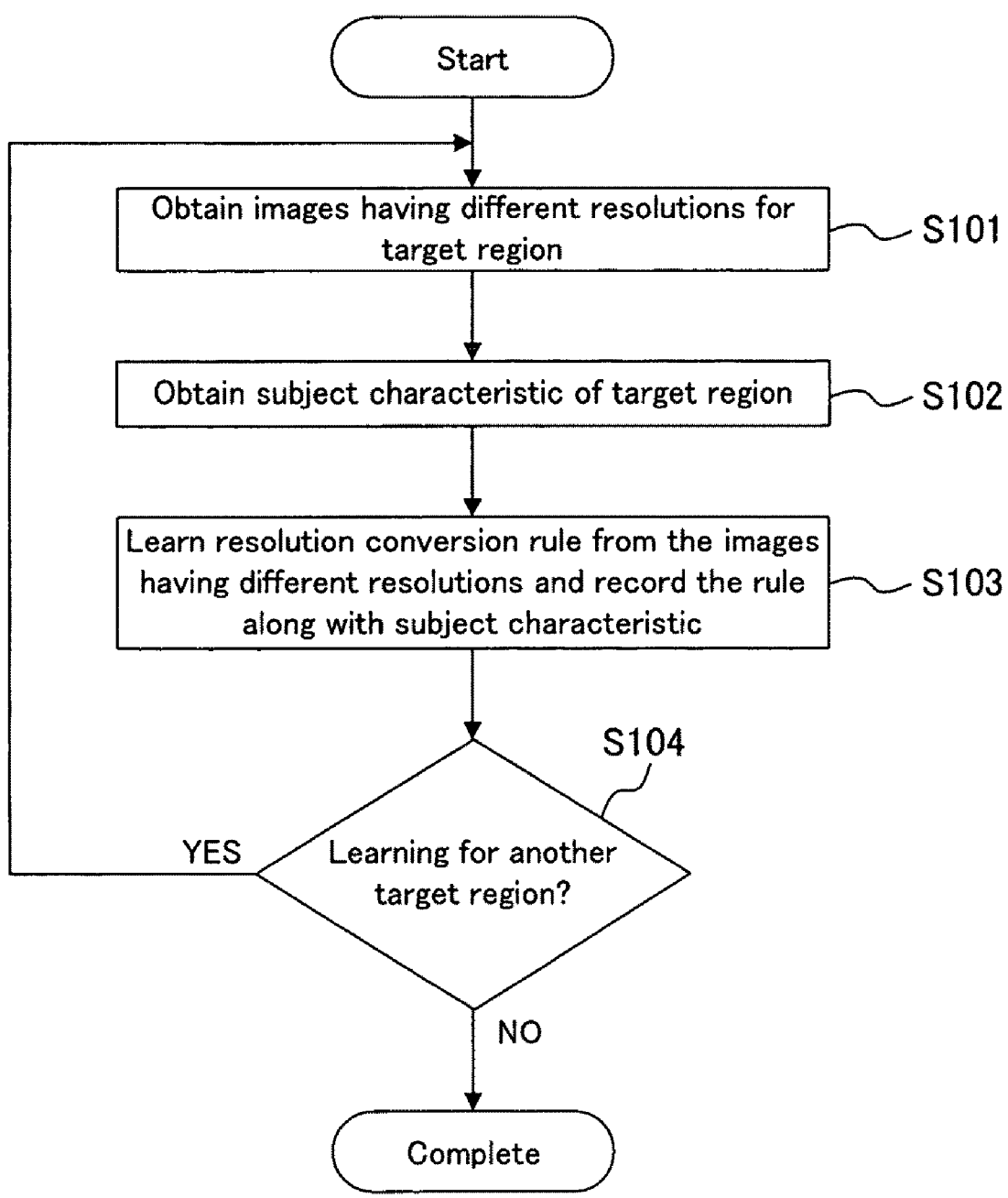
FIG. 1 is a flowchart showing a learning process of an image processing method according to a first embodiment of the present invention.

A first aspect of the present invention provides an image processing method which includes the steps of: (a) obtaining a plurality of images of a subject each having a different resolution, and learning a resolution conversion rule from the plurality of images for each of subject characteristics; (b) obtaining an original image and dividing the original image into regions based on the subject characteristics; and (c) converting the resolution of the original image by applying to each of the regions obtained in (b) the resolution conversion rule learned in step (a) regarding the subject characteristic corresponding to the region.

A second aspect of the present invention provides the image processing method according to the first aspect, wherein the subject characteristics include an optical characteristic independent of a shooting distance.

A third aspect of the present invention provides the image processing method according to the second aspect, wherein the optical characteristic is obtained from spectral reflectance data or infrared spectral reflectance data of the image.

A fourth aspect of the present invention provides the image processing method according to the first aspect, wherein the subject characteristics include a material of the surface of the subject.

A fifth aspect of the present invention provides the image processing method according to the first aspect, wherein the subject characteristics include a reflection state of a surface of the subject.

A sixth aspect of the present invention provides the image processing method according to the first aspect, wherein the resolution conversion rule describes a corresponding relation of texture feature vectors between the images having different resolutions.

A seventh aspect of the present invention provides an image processing method which includes the steps of: determining a target region of a subject; obtaining a first image and a second image with different resolutions regarding the target region; generating a resolution conversion rule for relating the first and second images to each other; obtaining a subject characteristic for the target region; and relating the resolution conversion rule and the subject characteristic and registering the related resolution conversion rule and subject characteristic to a storage device.

An eighth aspect of the present invention provides an image processing method which includes the step of: obtaining a still image or a moving image of the subject, and dividing the obtained image into regions based on the subject characteristic.

A ninth aspect of the present invention provides an image processing method which includes the steps of: obtaining an original image and region dividing information that indicates regions on the original image divided based on subject characteristics; and converting a resolution of the original image by applying to each of the regions indicated by the region dividing information a resolution conversion rule regarding the subject characteristic corresponding to the region.

A tenth aspect of the present invention provides an image processing apparatus which includes: an obtaining portion operable to obtain, regarding a target region of a subject, a first and a second images having different resolutions, as well as a third image indicating a subject characteristic; a rule generating portion which generates, from the first and second images, a resolution conversion rule for relating the first and second images to each other; and a regionally divided image generating portion which generates, from the third image, a regionally divided image that is divided into regions based on the subject characteristic.

An eleventh aspect of the present invention provides the image processing apparatus according to the tenth aspect, wherein the obtaining portion obtains, as the third image, a spectral image constituted with spectral information of the subject.

A twelfth aspect of the present invention provides the image processing apparatus according to the tenth aspect, wherein the obtaining portion obtains, as the third image, a specular/diffuse ratio image which shows a ratio of a specular reflection component to a diffuse reflection component on a surface of the subject.

A thirteenth aspect of the present invention provides the image processing apparatus according to the tenth aspect, wherein the obtaining portion obtains the first and second images having different resolutions each for a specular reflection image and a diffuse reflection image.

A fourteenth aspect of the present invention provides the image processing apparatus according to the tenth aspect, wherein the obtaining portion includes a zoom lens and obtains the first and second images by using an optical zooming method.

A fifteenth aspect of the present invention provides the image processing apparatus according to the tenth aspect, which further includes a learning button for giving an instruction to generate the resolution conversion rule from an exterior of the apparatus.

A sixteenth aspect of the present invention provides the image processing apparatus according to the tenth aspect, which further includes a display portion for displaying the regionally divided image.

A seventeenth aspect of the present invention provides the image processing apparatus according to the tenth aspect, wherein the obtaining portion includes an optical-axis variable zooming mechanism, and obtains the first and second images through performing optical zooming to a designated target region by using the optical-axis variable zooming mechanism An eighteenth aspect of the present invention provides the image processing apparatus according to the seventeenth aspect, which further includes a still picture shooting function and a self-timer mechanism, wherein when shooting a still picture using the self-timer mechanism, the obtaining portion obtains the first, second, and third images during a timer operation period before shooting the still picture.

A nineteenth aspect of the present invention provides the image processing apparatus according to the tenth aspect, which further includes a shooting function and a lighting estimation portion for detecting a change in lighting environment, wherein, when a change in the lighting environment is detected by the lighting estimation portion during shooting, a necessity to regenerate a resolution conversion rule is informed to a shooting person.

A twentieth aspect of the present invention provides the image processing apparatus according to the tenth aspect, which further includes a shooting function and a function for prohibiting shooting when it is necessary to generate a resolution conversion rule.

A twenty-first aspect of the present invention provides the image processing apparatus according to the tenth aspect, which further includes a moving picture recording function, wherein the obtaining portion can execute an obtaining action of the first and second images in parallel to a recording action of the moving picture.

A twenty-second aspect of the present invention provides the image processing apparatus according to the twenty-first aspect, wherein provided that the resolution of the first image is higher than the second image, the obtaining portion shoots a still picture as the first image during a recording action of the moving picture, while obtaining, as the second image, the moving picture that is being recorded.

A twenty-third aspect of the present invention provides the image processing apparatus according to the twenty-second aspect, wherein when an unlearned subject characteristic is recognized from the third image, the obtaining portion obtains the first and second images.

A twenty-fourth aspect of the present invention provides the image processing apparatus according to the twenty-second aspect, wherein the obtaining portion obtains the first and second images at intervals of a prescribed time.

A twenty-fifth aspect of the present invention provides the image processing apparatus according to the tenth aspect, wherein the obtaining portion includes a plurality of imaging devices having different resolutions for shooting the first and second images.

A twenty-sixth aspect of the present invention provides an image processing program embedded in a computer readable medium for allowing a computer to execute the steps comprising: (a) learning resolution conversion rules by each subject characteristic from a plurality of images of a subject having different resolutions; (b) dividing an obtained original image into regions based on the subject characteristics; and (c) converting the resolution of the original image by applying to each of the regions obtained in step (b) the resolution conversion rule learned in step (a) regarding the subject characteristic corresponding to the region.

A twenty-seventh aspect of the present invention provides an image file format which includes: image data showing an original image; regionally divided image data showing regions on the original image divided based on subject characteristics; and resolution increasing parameter data obtained for each of the subject characteristics in order to achieve increased resolution of the original image.

A twenty-eighth aspect of the present invention provides the image file format according to the twenty-seventh aspect, wherein the resolution increasing parameter data is a function of time and a position in the original image.

In the followings, embodiments of the present invention will be described in detail by referring to the accompanying drawings.

First Embodiment

Figure 2:
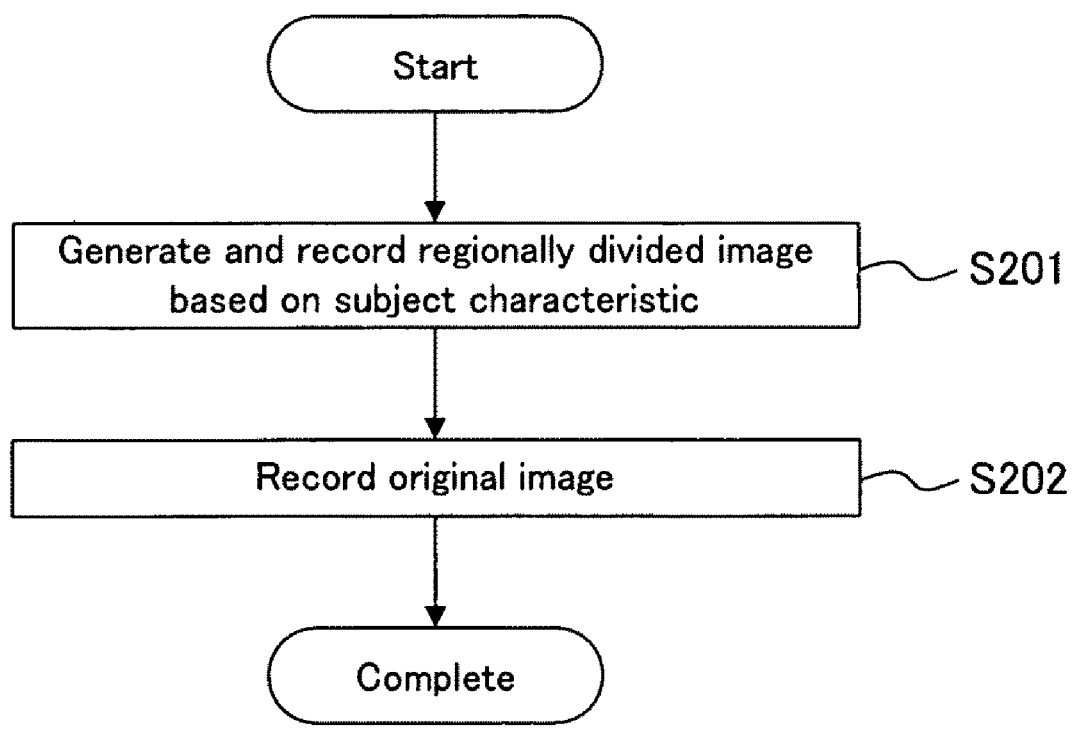
FIG. 2 is a flowchart showing a recording process of the image processing method according to the first embodiment of the present invention.
Figure 3:
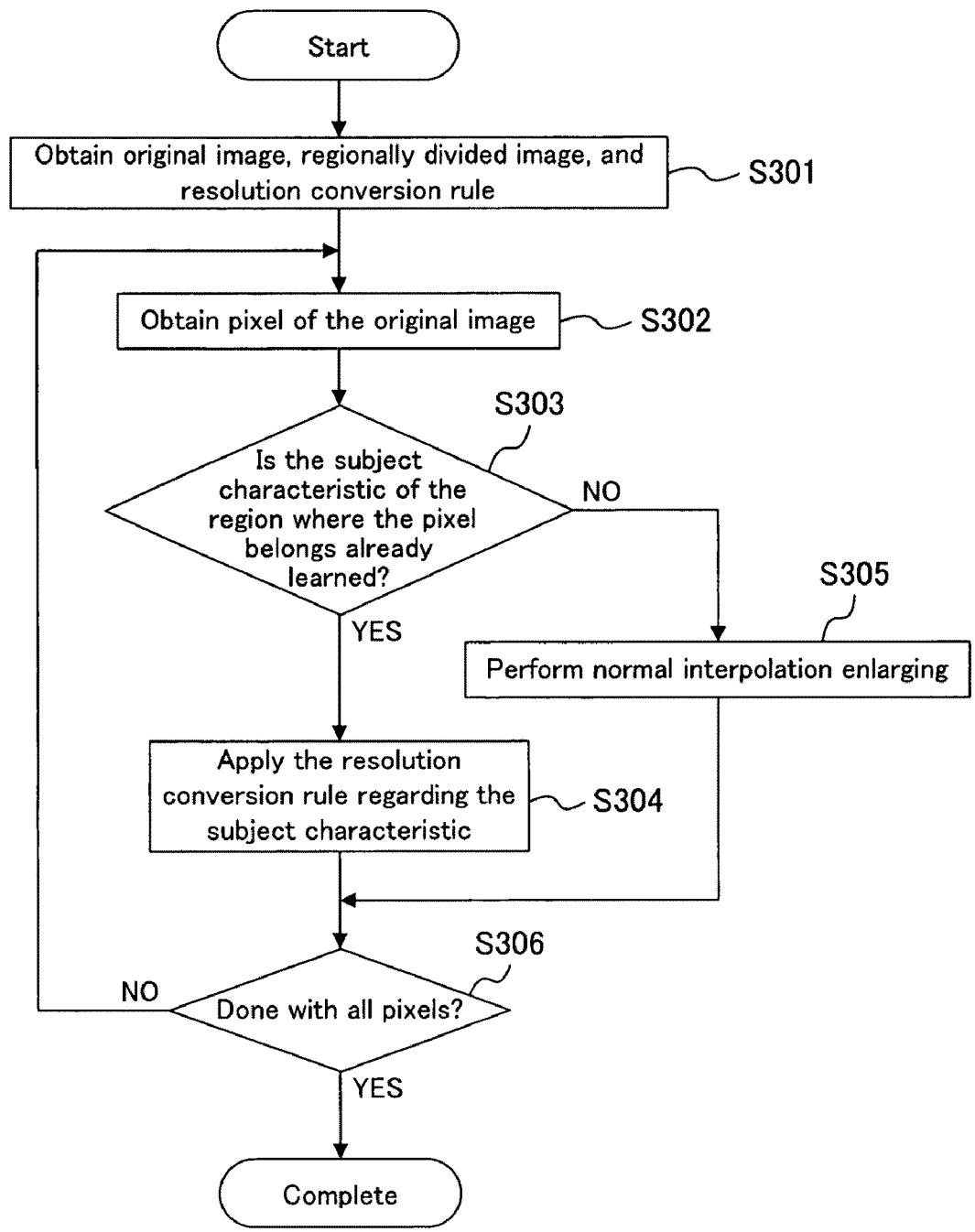
FIG. 3 is a flowchart showing a resolution increasing process of the image processing method according to the first embodiment of the present invention.

FIG. 1-FIG. 3 are flowcharts showing an image processing method according to a first embodiment of the present invention. FIG. 1 shows a learning process, in which a plurality of images of a subject having different resolutions from each other are obtained, and resolution conversion rules are learned from the plurality of images by each subject characteristic. FIG. 2 shows a recording process, in which a still picture or a moving picture of the subject is obtained as an original image, and the original image is divided into regions based on the subject characteristics. FIG. 3 shows a resolution increasing process, in which the resolution of the original image is converted by applying, to the divided regions, the resolution conversion rules learned in regards to the corresponding subject characteristics. Resolution increasing processing of the recorded original image is achieved herein in order to perform high-resolution display thereof on a display.

The subject characteristic can be obtained from spectral information of the subject, for example. The spectral information depends on the material of the subject. The "material" herein includes not only the characteristic of the material of the subject itself but also the state of the surface such as roughness of the subject surface. The subject characteristic in the present invention is not limited to the spectral information but may be of any information, as long as it is the optical characteristic independent of the shooting distance. For example, it is possible to use physical reflective characteristics such as the reflective characteristic (BRDF: bidirectional distribution function) of the subject surface, and the ratio of the specular reflection component to diffuse reflection component, by obtaining the polarization component of the light and the image simultaneously.

In the learning process of FIG. 1, first, images having different resolutions are obtained from a target region that is the interested region of the subject (S101). For example, a low-resolution image and a high-resolution image are obtained. Further, the subject characteristic of the target region is obtained (S102). Then, the resolution conversion rules are learned from the images having different resolutions, and those are recorded to a storage device along with the subject characteristics (S103). Such processing is executed for all the target regions (S104).

In the step S103, for example, the texture features of the low-resolution image and the high-resolution image are obtained, respectively, the corresponding relation between the texture features is parameterized, and the parameter is used as the resolution conversion rule. This parameter is referred to as a resolution increasing parameter in this specification of the present invention.

The texture feature is a completely different concept from the above-described subject characteristic. The subject characteristic is obtained from the spectral information, for example, and it is the optical characteristic to which the material or the like of the subject is reflected upon. Meanwhile, the texture feature is the pixel pattern information of the image itself.

In the recording process of FIG. 2, not a local target region but a regular moving picture or still picture is obtained as an original image (S201). At the same time, the subject characteristics are identified, and the image is divided into regions based thereupon to generate and record a regionally divided image (S202).

In the resolution increasing process of FIG. 3, first, there are obtained the original image and the regionally divided image recorded in the recording process, and the resolution conversion rules of each subject characteristic learned in the learning process (S301). Then, the pixels of the original image are obtained (S302), and it is judged whether or not the resolution conversion rule for the subject characteristic of the region where the pixels belong has been learned (S303). When judged that it has already been learned (YES in S303), the resolution conversion rule regarding that subject characteristic is applied to perform resolution increasing processing (S304). When judged that it has not been learned (NO in S303), normal interpolation enlarging is performed to achieve high resolution (S305). Such processing is executed for all the pixels that are the targets of resolution conversion (S306).

In the present invention, the subject characteristics are used to for associating the resolution conversion rules and for dividing the image into regions. The reasons for not using the character of the image itself such as the texture but suing the subject characteristics are as follows.

First, when the image characteristics are used, it is difficult to divide the regions highly accurately, and the processing amount becomes extensive. In particular, it is anticipated that dividing the moving picture into regions in real-time is difficult. Secondly, the image characteristics often become difficult to be identified due to a blur in the image itself or difference in the shooting distance. In the meantime, the subject characteristic can be obtained from the information of a single pixel, so that the identification processing thereof is simple, and it is robust for the shooting distance and blurring. That is, even if the image is blurred to such an extent that the image characteristics are lost, it is highly possible for the subject characteristic to be remained as the information. Further, the subject does not normally stand still in a moving picture but moves within the screen. In that case, it is necessary to search the corresponding portion from the image in the case of using the image characteristics. However, when the subject characteristic is used, the search becomes extremely easy.

Each of the processes shown in FIG. 1-FIG. 3 is typically executed in order of the learning process, the recording process, and the resolution increasing process. However, the learning process and the recording process may be performed in parallel in terms of time, for example.

Second Embodiment

In a second embodiment of the present invention, described is a specific image processing method, having the above-described first embodiment as the base. In this embodiment, an optical zooming method is employed for obtaining the images having different resolutions. Further, the spectral information of the subject is used as the subject characteristic, and the resolution increasing parameter, i.e. the parameter indicating the corresponding relation between the texture features of the image, is used as the resolution conversion rule.

Figure 4A:
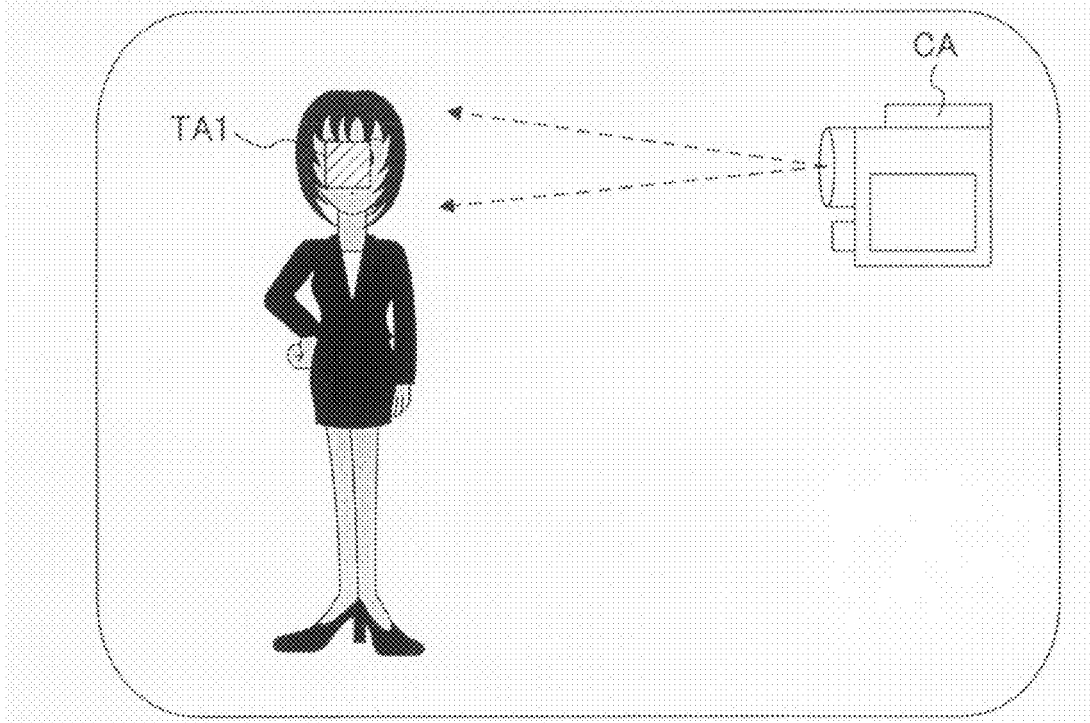
FIG. 4 is a conceptual diagram showing examples of the learning process and the recording process.
Figure 4B:
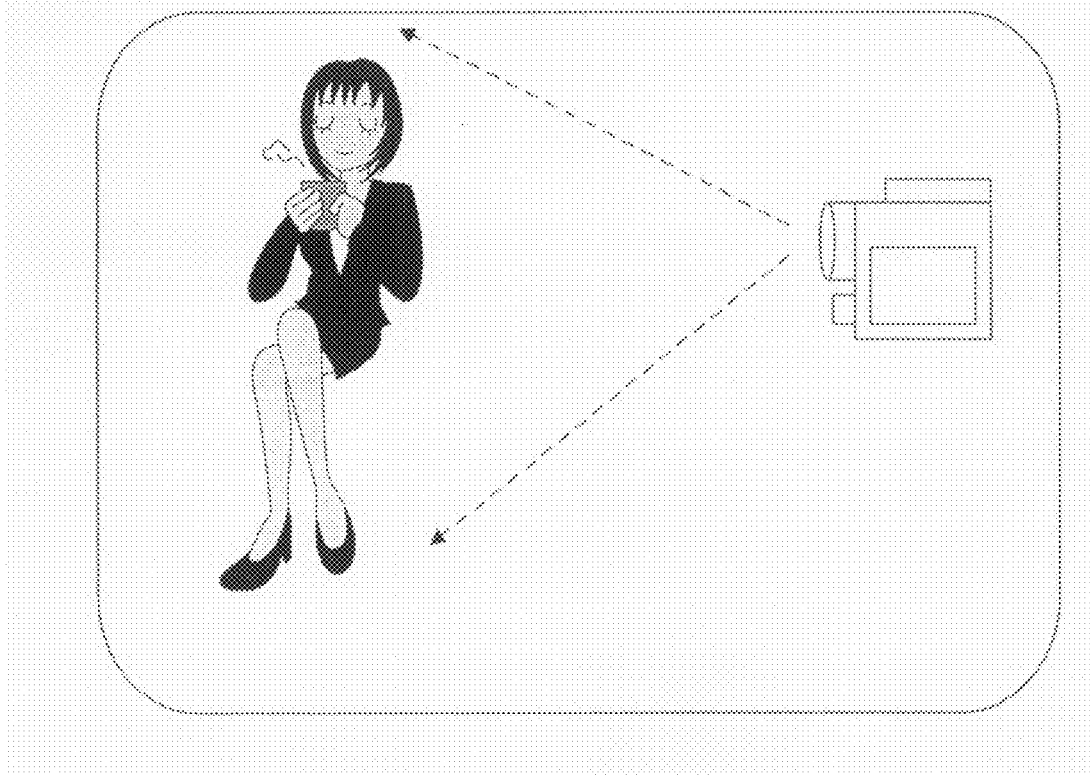

FIG. 4 is a conceptual diagram showing examples of the learning process and the recording process. As shown in FIG. 4A, when filming a moving picture of a character, a target region TA1 (face of the character in the drawing) is set in advance in the learning process, and the optical zooming is performed by directing the optical axis of a camera CA towards the target region TA1. Thereafter, as shown in FIG. 4B, it is advanced to the recording process. The character almost stands still in this case even though there is a little movement, it is possible to perform the learning process regarding the subject itself to be recorded. This is desirable for improving the quality of high resolution. Of course, it is not possible to execute the processes in such order for such an event that occurs only once, for example. In such case, after performing the recording process, the learning process is performed if there is a plenty of time. It is also possible to perform both processes simultaneously, and such case will be described later.

Figure 5:
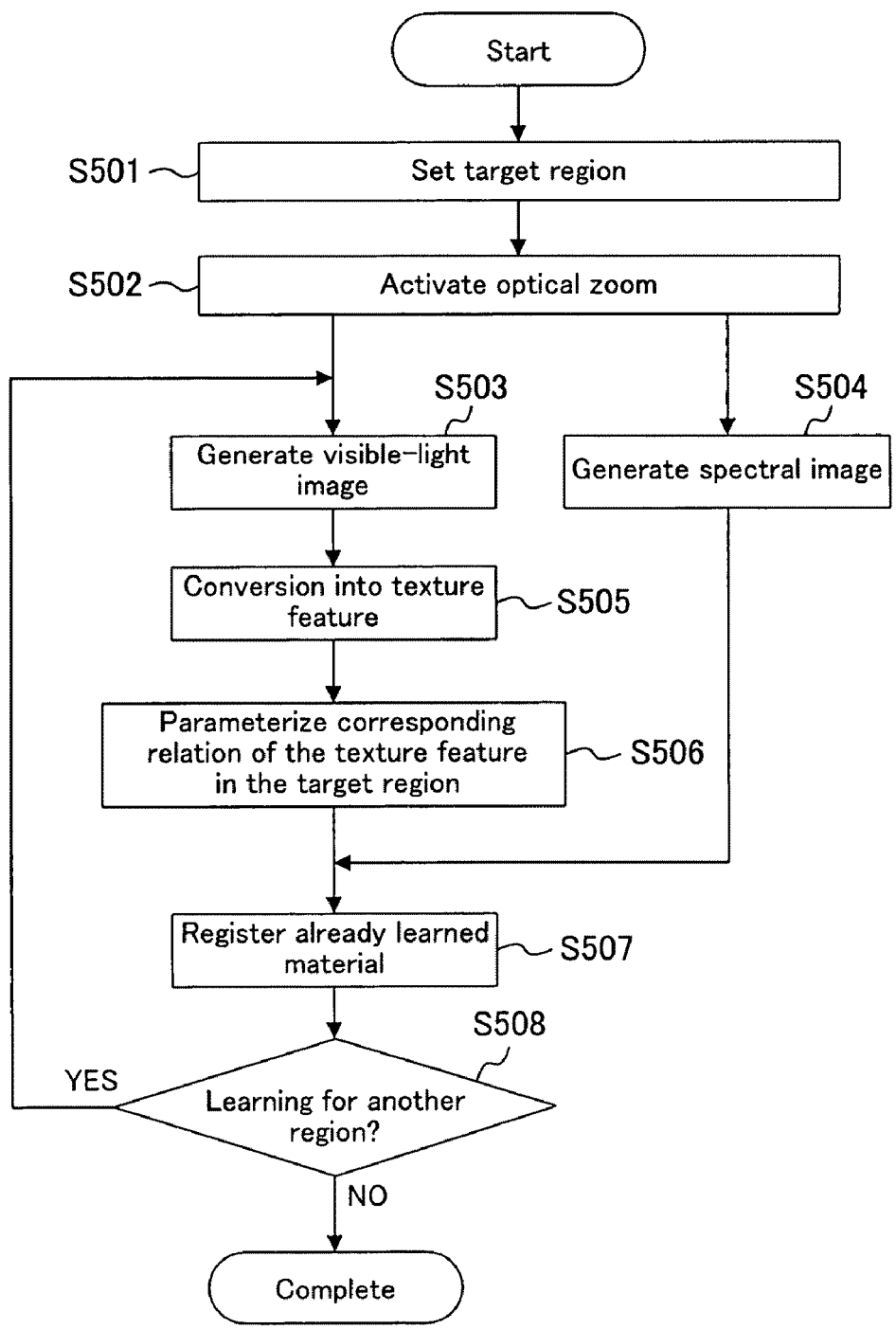
FIG. 5 is a flowchart showing a learning process of an image processing method according to a second embodiment of the present invention.

FIG. 5 is a flowchart showing a learning process of an image processing method according to this embodiment. In FIG. 5, a shooting person sets the target region (S501), and the optical zoom of the camera CA synchronously operates by an instruction of the shooting person (S502). With this, the high-resolution image and the low-resolution image of the target regions are obtained. Specifically, a visible-light image and a spectral image are generated (S503, S504). The visible-light image is a color image or a monochrome image that matches with the eyesight characteristic of human beings, and the spectral image is the information obtained by separating the color components with a filter having a narrow band characteristic, which is used for identifying the material that is the characteristic of the subject in a better way. Then, the visible-light image is converted into a texture feature, and the corresponding relation between the high-resolution texture feature and the low-resolution texture feature in the target region is parameterized (S506). This parameter is also referred to as learning in this specification of the present invention.

Figure 6:
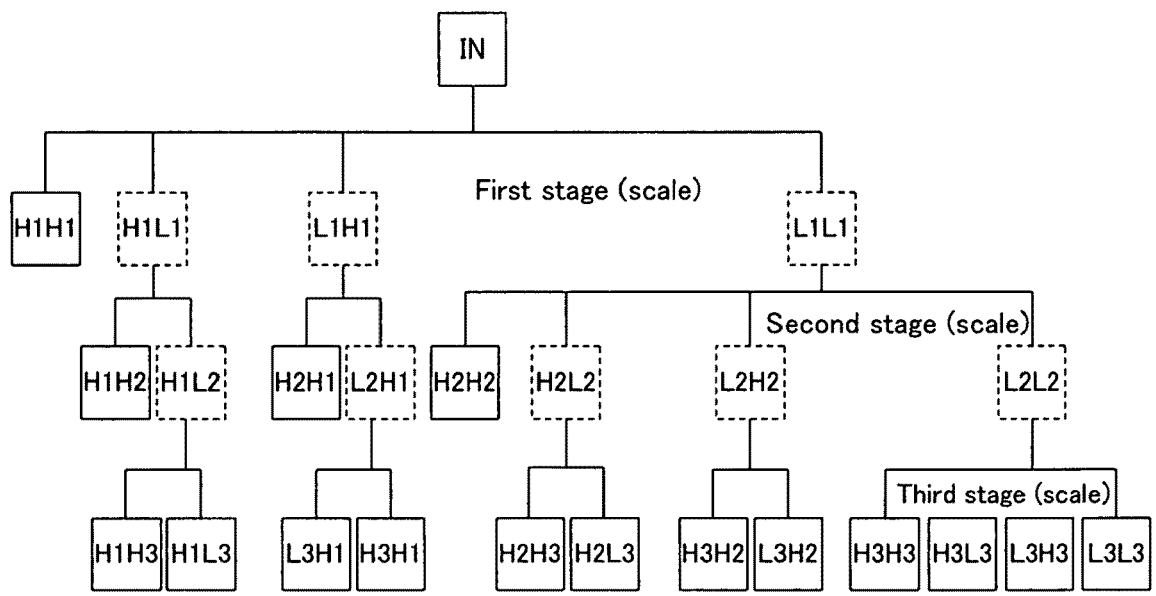
FIG. 6 is an illustration showing an example of a method for converting an image to a texture feature.
Figure 7:
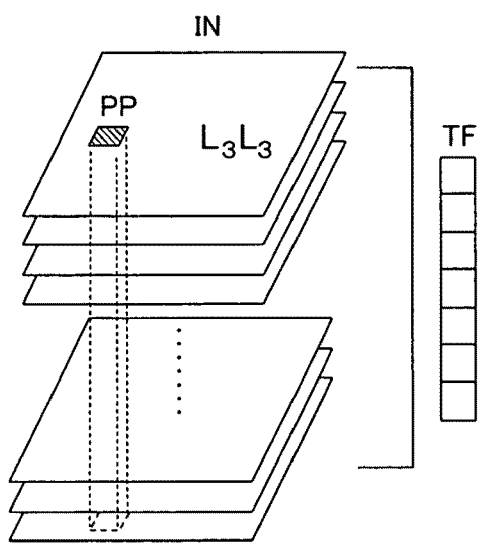
FIG. 7 is an illustration showing a texture feature after conversion.

FIG. 6 is an illustration showing a method using a multi-resolution analysis by wavelet conversion as an example of a method for converting the image to a texture feature vector. In FIG. 6, used is the wavelet conversion performed by three-stage scheduling. In a first stage (scale), an input image IN is broken down into four components of images H1H1, H1L1, L1H1, L1L1 in the same size as that of the input image IN by the wavelet conversion of X, Y directions. In a second stage (scale), among the four components that are being broken down, the components except the high-frequency component, H1H1, both in the X and Y directions are broken down further. Only the component L1L1 is broken down again in both the X and Y directions, while the components H1L1 and L1H1 are broken down only in one direction, thereby generating eight components as a result. Further, in a third stage (scale), the components except the component H2H2 are broken down and, similarly, only the component L2L2 is broken down in both the X and Y directions, while the others are broken down only in one direction, thereby generating twelve components as a result. Those components re-broken into two or four (shown with dotted lines) by increasing the scale can be generated by synthesis performed thereafter. As shown in FIG. 7, each pixel of the input image IN is broken down to the 16-dimensional components by the wavelet conversion described above. The vector having a bundle of such sixteen components is the texture feature TF1 at the pixel position PP.

In the manner described above, the low-resolution image and the high-resolution image are converted into the texture features, respectively, and the relation between those quantities is learned to create an analysis code book and a reproduction code book. Such processing is described in detail in "Edge Enhancement of Image Using Multiresolution Vector Quantization", IEICE Transactions Vol. J79A 1996/5 (pp. 1032-1040) by Yoshito Abe, Hisakazu Kikuchi, Shigenobu Sasaki, Hiromichi Watanabe, and Yoshiaki Saito. Thus, detailed explanations of such processing are omitted herein. In this case, parameterization in the step S506 corresponds to creating the analysis code book and the reproduction code book.

Figure 8:
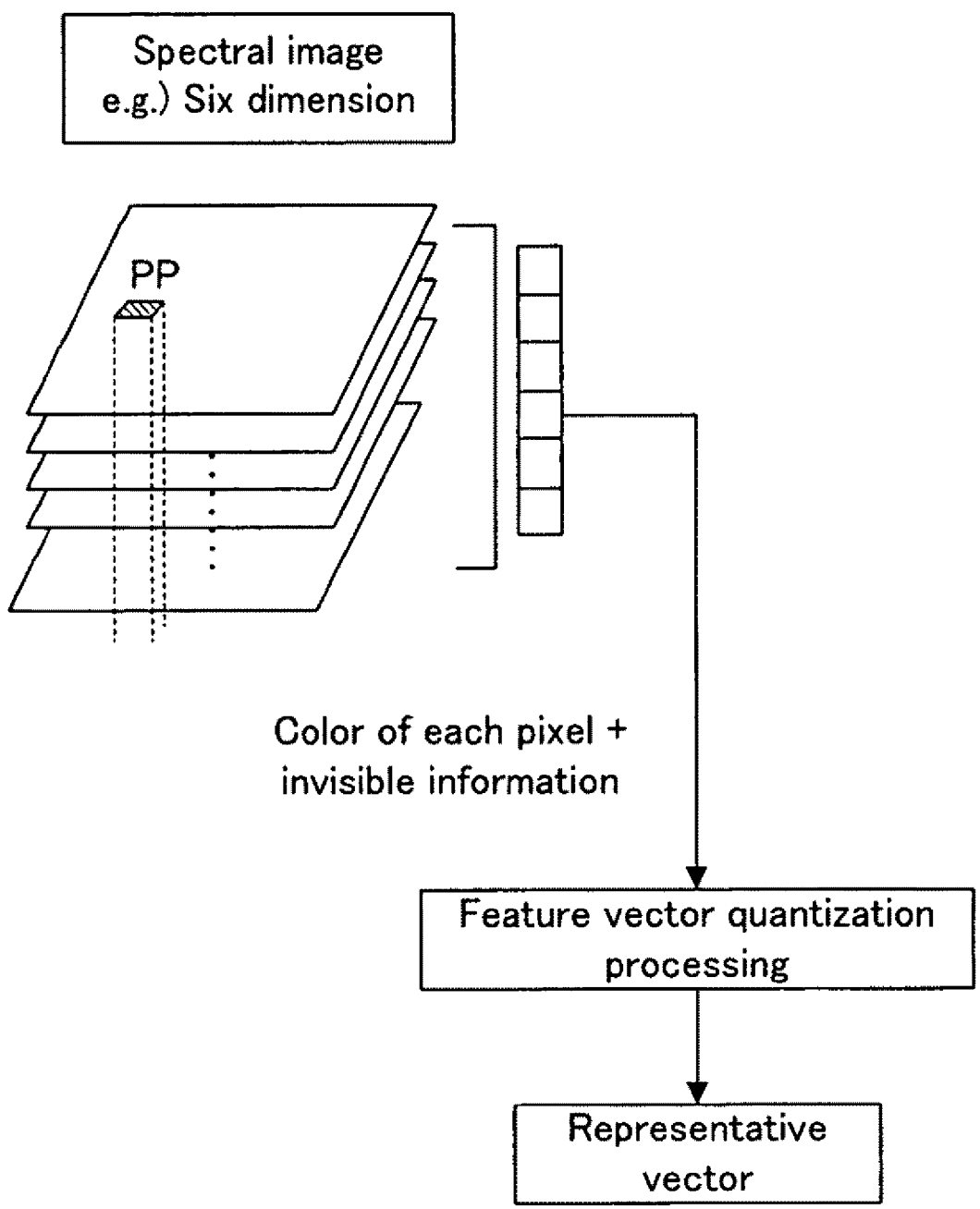
FIG. 8 is an illustration for describing registration of learned materials.

Next, in a step S507, the subject characteristic of the target region is obtained from the spectral image, and it is registered as the learned material. Specifically, as shown in FIG. 8, the color information of the spectral image obtained with low resolution is generated into a single feature by the feature vector quantization processing, and it is registered as a representative vector that expresses a single intrinsic material.

In a step S508, a target region is set again for carrying out learning of another target region, and the steps S503-S507 are repeated. If not, the image obtaining action (learning process) is ended.

Figure 9:
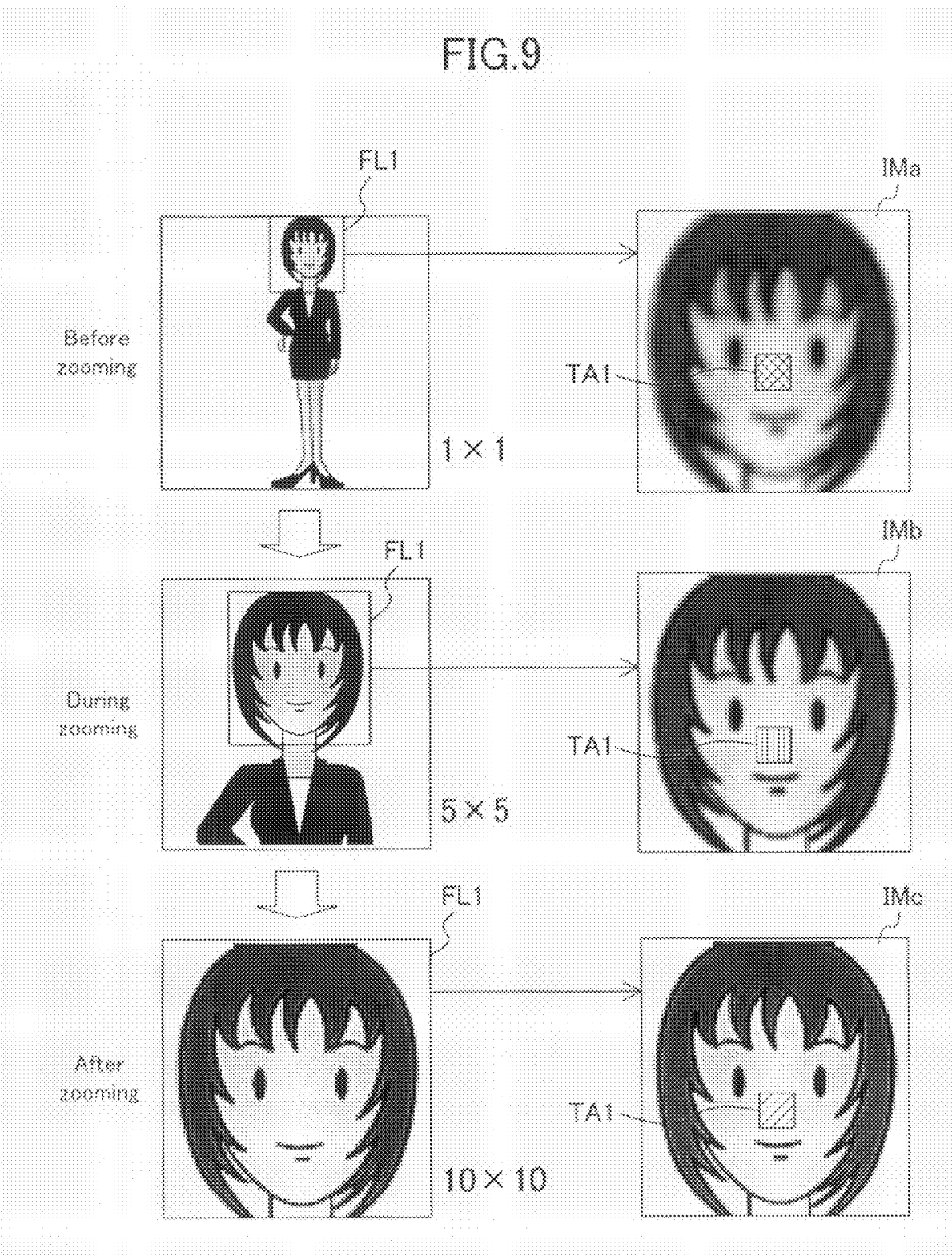
FIG. 9 is an illustration for describing the relations between the target regions and the optical zoom.

Now, the relation between the target region and the optical zoom will be described by referring to FIG. 9.

FIG. 9A shows the state before zooming, where it is about to shoot a character to be the subject with a wide view angle. At this time, when the target region is set at the face of the character as in FIG. 4A, there is set a reference frame FL1 centering on the target region. This reference frame FL1 corresponds to a narrow view angle range that is shot over the entire screen with the maximum magnification of the optical zoom. The image processing of the texture feature and the like is executed after normalizing the reference frame FL1 to an image size with the maximum magnification of the optical zoom.

Thus, the shooting person starts the high-resolution image obtaining process towards the target region, i.e. the reference frame FL1, and the optical zooming is performed synchronously. FIG. 9B is an illustration showing the middle of the procedure of the optical zooming, and zooming is continued further to the reference-frame FL1. At last, a narrow view angle image with high resolution can be obtained by filling entire reference frame FL1 that is optically zoomed by the maximum magnification, as shown in FIG. 9C.

IMa, IMb, and IMc respectively show the images within the reference frame FL1 in the states of FIG. 9A-FIG. 9C, whose sizes are normalized. In the image IMa, the insufficient pixel size is digital-interpolated to align the image size only, thereby generating an extensive blur. Similarly, even though the image IMb in the middle of the optical zooming has higher resolution than the image IMa, it is inevitable to have a little blur due to the influence of interpolation. The image IMc by the maximum optical zooming magnification becomes a clear high-resolution image. Thus, regarding the target region TA1 as the center portion of the reference frame FL1, it provides an extremely blur texture in the image IMa, a moderately blur texture in the image IMb, and an extremely clear texture in the image IMc. In the step S506 of FIG. 5, the corresponding relation between those texture features is parameterized as the relation between the multiresolution vectors using the wavelet conversion.

Next, the parameterization will be described. The parameterization herein is achieved by vector quantization and by generating two kinds of corresponding tables such as an analysis code book and a reproduction code book.

The blur image and the sharpened image are converted into multiresolution vectors by every 100-pixel positions. These portions are referred to as U1-U100, and V1-V100. The vectors U1-U100 and V1-V100 are at the same pixel position, so that the code book may be formed to output a corresponding V when a U is inputted. In practice, however, the multiresolution vectors are classified into representative vectors by the vector quantization.

Figure 10:
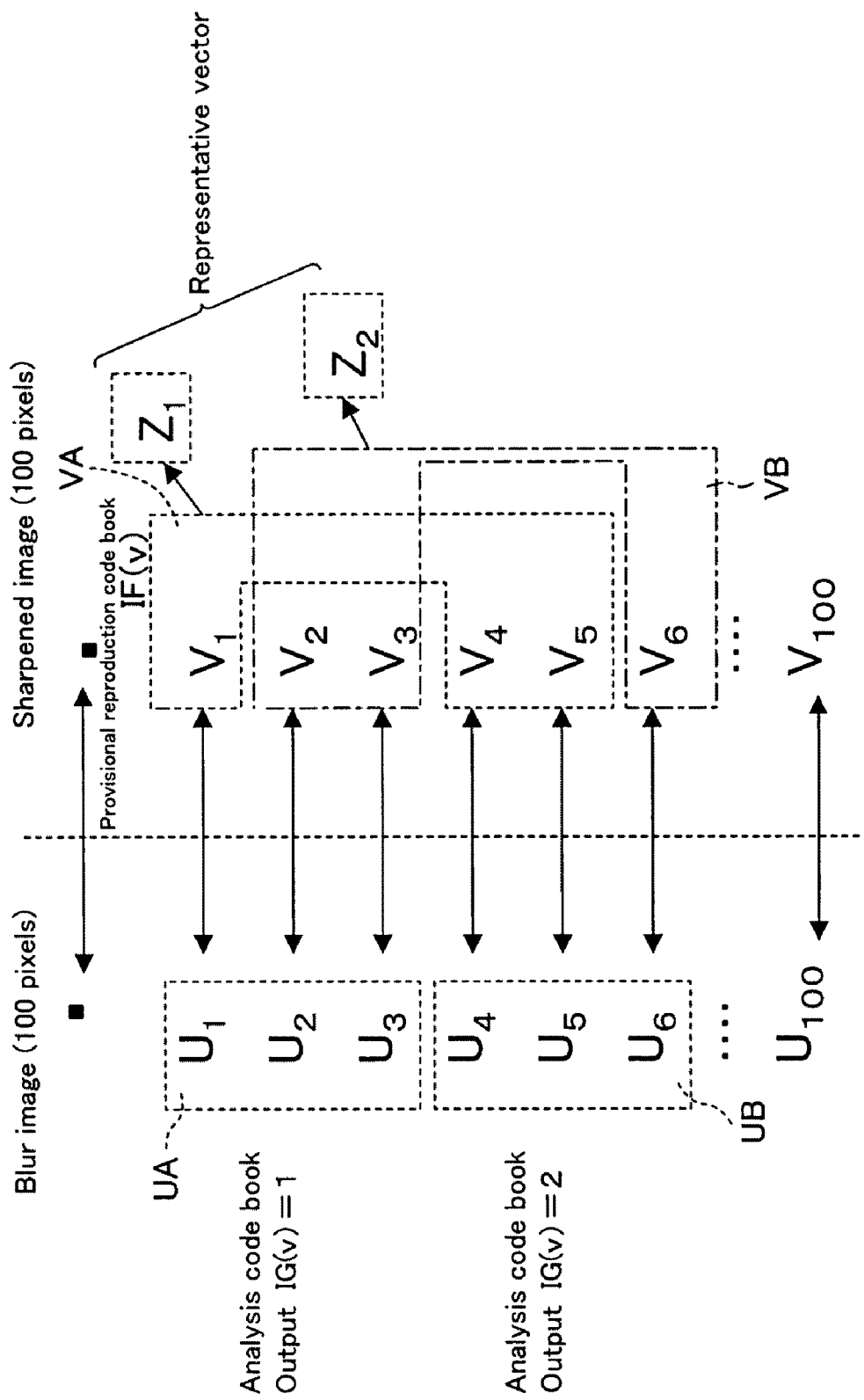
FIG. 10 is an illustration for specifically describing creation of a code book.

In the case of FIG. 10, the vector U is quantized to two kinds, UA and UB, and the vector V is quantized to two kinds, VA and VB. The quantization indexes of the analysis code book and the reproduction code book mean the numbers added to those quantized vector sets. To look up the code book means no other than obtaining the numbers such as 1, 2, which are the numbers added to the quantized vector sets by inputting the vector number V. Further, a representative vector Z1 is annexed to the quantized set VA, and a representative vector Z2 to the quantized set VB. These representative vectors are calculated by a method such as finding an average value or a typical value of the vectors that belongs to the quantized set.

Figure 11:
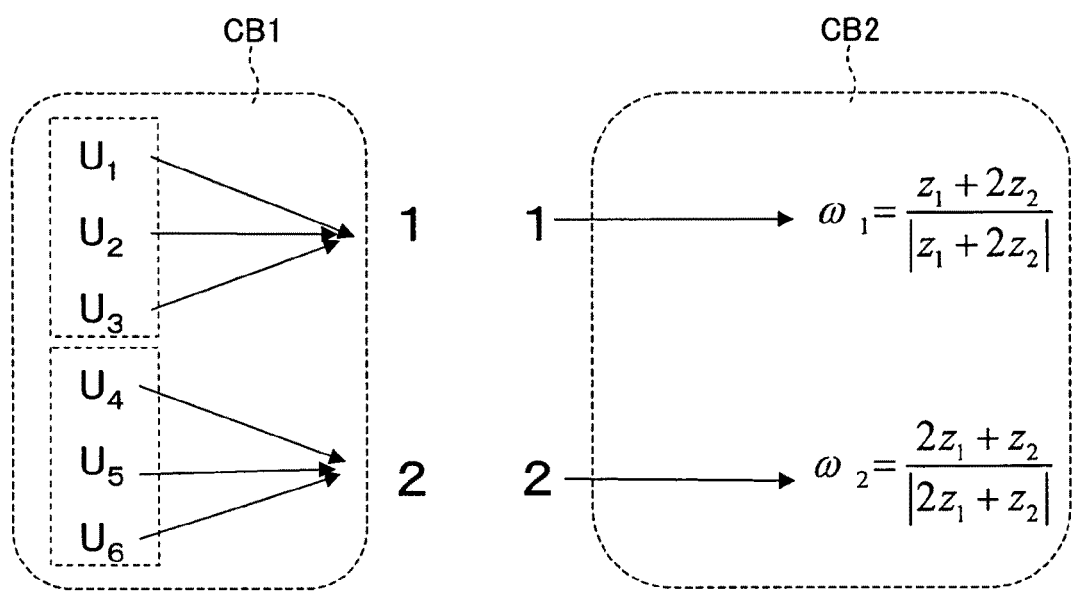
FIG. 11 is an illustration for specifically describing creation of a code book.

Next, as shown in FIG. 11, there are generated an analysis code book CB1 which outputs an quantization index (1 or 2) form the vector number, and a reproduction code book CB2 which outputs a reproduction vector in accordance with an input of the quantization index (1 or 2). By using the analysis code book and the reproduction code book generated in this manner in combination, the multiresolution vector of the blurred image can be converted to the multiresolution vector of the sharp image.

In the above described case, learning is performed by separately quantizing a pair of low-resolution image and high-resolution image. Described in the following is a case of performing learning by using a plurality of image sample sets constituted with the low-resolution images and the high-resolution images.

For example, in the case where smooth optical zooming is performed in the recording process that is described later, it is necessary to perform resolution increasing processing on the entire images in the course of zooming from 1×1 to 2×2, 3×3, 4×4, and so on. For example, in order to display such image with high resolution on a display device having double pixel numbers, it is necessary to execute resolution increasing processing of 2×2 on the entire images in the course of zooming.

Figure 12:
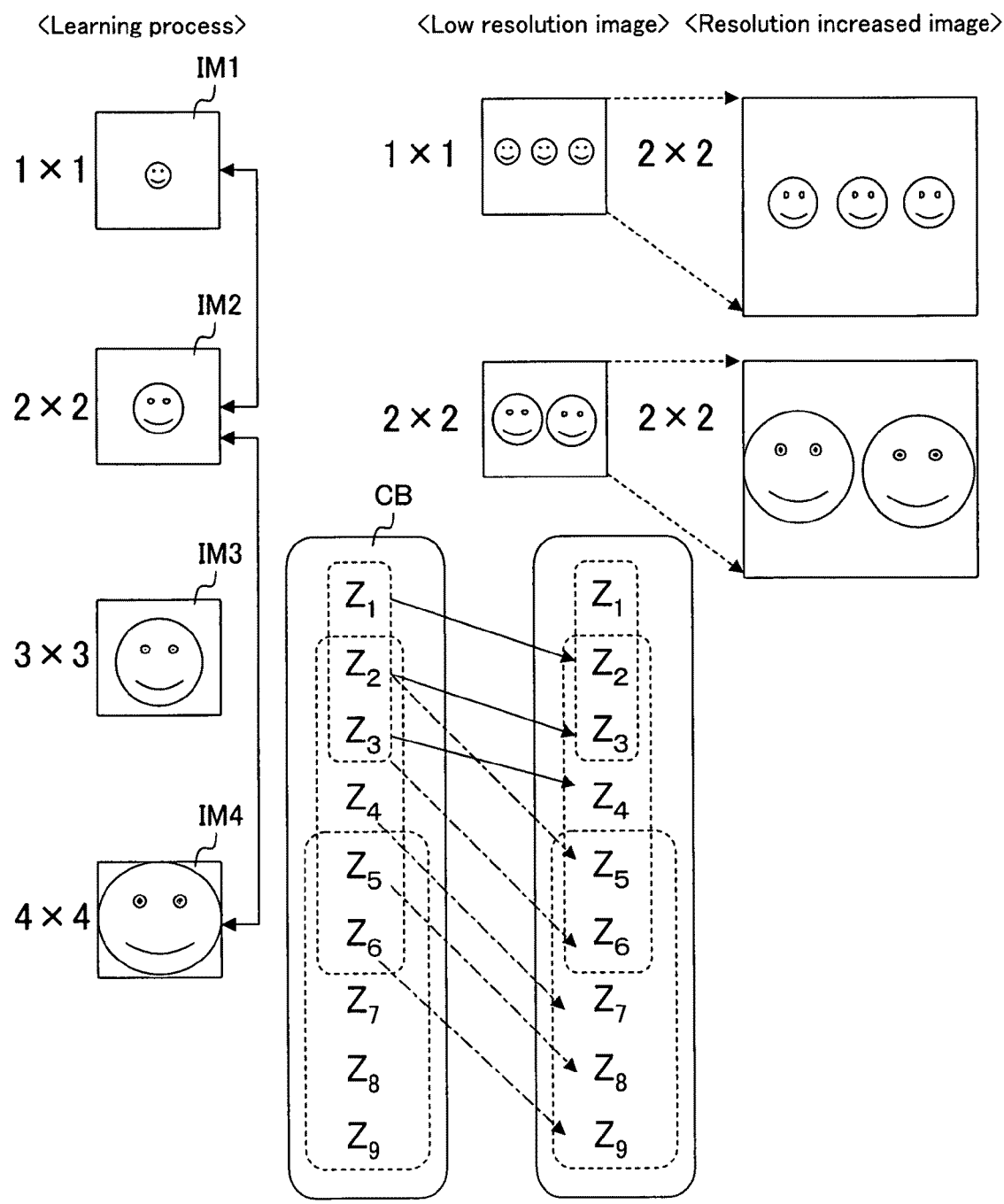
FIG. 12 is an illustration showing the relations between the zoom images and the code book.

As shown in FIG. 12, for pairs of images to be learned for performing the above-described resolution increasing processing of 2×2, it is the image IM2 with the optical zooming ratio of 2×2 to be in a pair with the image IM1 with the optical zooming ratio of 1×1, and the image IM4 with the optical zooming ratio of 4×4 to be in a pair with the image IM2 with the optical zooming ratio of 2×2. In general, as the learning sample, required is an optical zoom image of up to M×N, that is the product of the magnification M of the resolution and the optical zooming magnification N of the picked-up image itself. However, it is a great burden for executing such learning separately. In addition, separate resolution increasing parameters are to be used in the display process, so that it is possible that the originally smooth optical zoom video becomes fluctuated for each frame.

Thus, optical zooming of up to M×N times is performed in the learning process, and the images of those sizes are normalized to find the sets of the multiresolution vectors so as to form a common analysis code book CB. In the code book CB, it is assumed that Z1-Z3 are the quantized vectors of the image IM1, Z2-Z6 are the quantized vectors of the image IM2, and Z5-Z9 are the quantized vectors of the image IM4. The correspondence within the analysis code book CB is determined based on the correspondence of each of the pixels to be in pairs, in order to create a reproduction code book. By learning of the pairs, the correspondences such as Z1 to Z2, Z2 to Z3, and Z3 to Z4 are generated, for example, for the case of the image IM1 so as to form the reproduction code book.

As described above, the feature vectors for achieving the high resolution are generated at once from a series of optical zoom image groups IM1-IM4. Therefore, while it is possible to restrict the variations of the quantized vectors to be used, the community of the vectors to be used is increased. Thus, it is possible to achieve high resolution while maintaining the smooth optical zooming as the moving picture. In order to achieve still smoother high resolution in a zoom moving picture, it is possible to employ a method which interpolates the discrete reproduction code book in terms of time.

Figure 13:
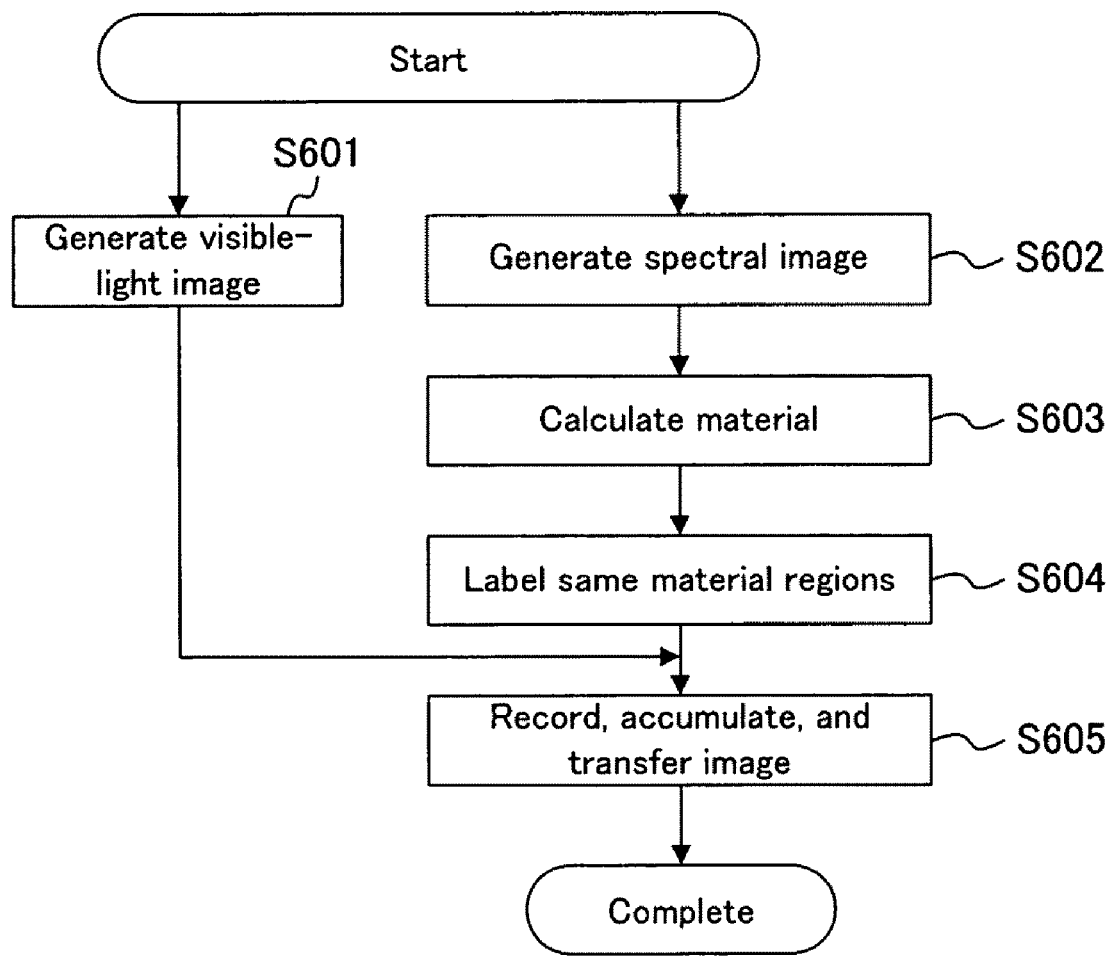
FIG. 13 is a flowchart showing the recording process of the image processing method according to the second embodiment of the present invention.

FIG. 13 is a flowchart showing a recording process of the image processing method according to the embodiment. In the recording process, shooting of a moving picture such as a moving character is performed as in FIG. 4B. The view angle at this time varies from the wide view angle state to the optical zooming state. When an image is obtained, in the same manner as that of the learning process shown in FIG. 5, generation of the visible-light image (S601), generation of the spectral image (S602), and conversion of the images to the texture feature are executed with the frame rate of the moving picture. Then, the spectral information is quantized from the spectral image to calculate the subject characteristic that expresses the material (S603). Then, the image is divided into regions by referring to the registered material that has been learned, and a material image is generated by labeling the same material regions (S604). Thereafter, the material image and the recorded moving picture that is the recorded visible-light image are recorded, accumulated, and transferred (S605).

Figure 14A:
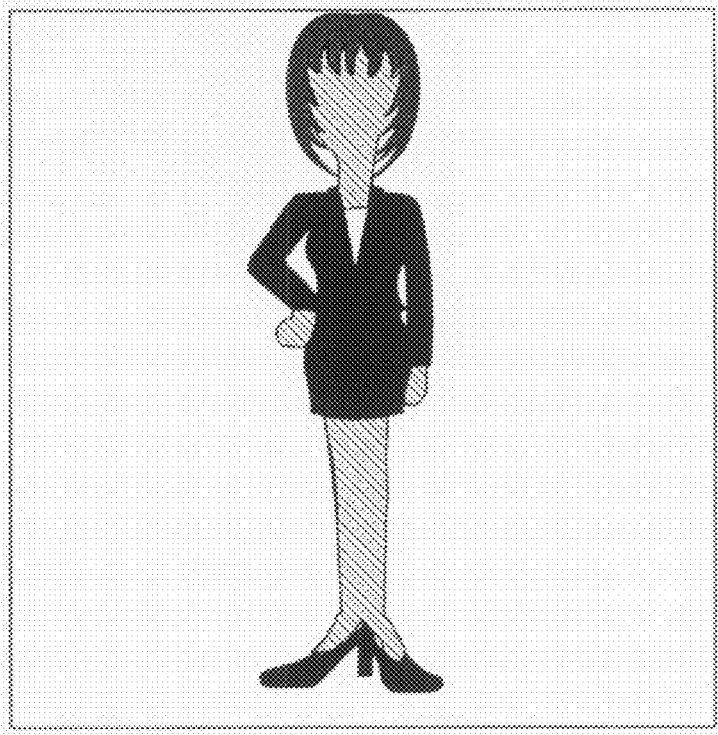
FIG. 14 is a schematic illustration showing examples of the image divided on the basis of materials.
Figure 14B:
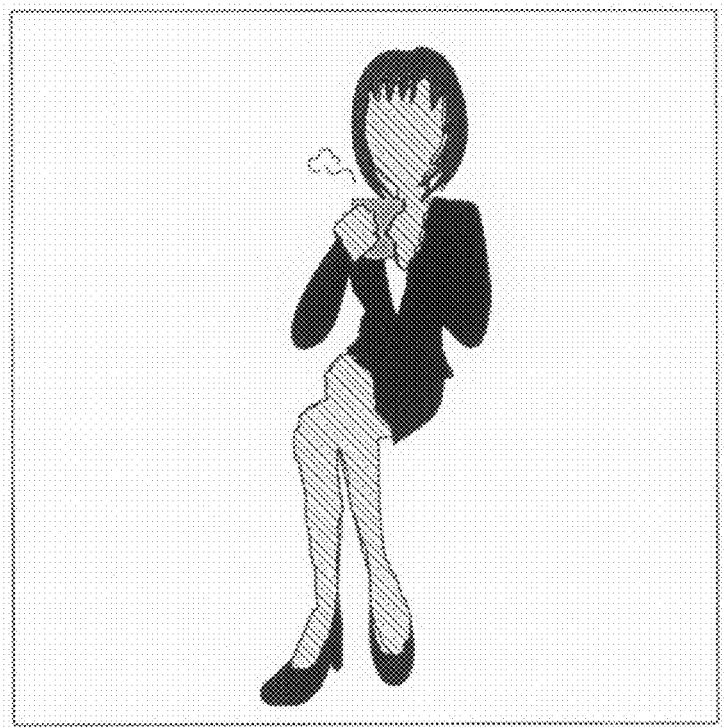

FIG. 14 is a schematic illustration showing examples of the material image, which provides examples of the material image where the skin portion of the face of the character in the state of FIG. 4 is learned and registered as the target region. In the image of FIG. 14, the portions with oblique lines are identified as the material regions having the same material as the skin.

FIG. 15 is a schematic illustration showing an image file format that is accumulated and transferred in the embodiment. In FIG. 15, reference numeral 1501 is the image data showing the original image that is recorded in the recording process. In this case, it is a moving picture of a luminance image or an RGB image, which is expressed as I (x, y, t) as a function of two-dimensional position and the time. It is not specifically different from those obtained by a conventional video camera function, and any compressed moving image file such as DV or MPEG may be used, for example. Reference numeral 1502 is the regionally divided image data showing the regions divided based on the subject characteristics of the original image, which is generated in the recording process. This data is also expressed as Mi (x, y, t) as the moving picture. The image data 1502 of FIG. 15 shows only the region of the same materials as the skin of the character. However, in the case where a plurality of materials are recorded, it becomes the image showing the regions of each of the materials that are learned and registered, and the unlearned regions. Reference numeral 1503 indicates the data of the resolution increasing parameters that are learned by each subject characteristic in the image learning process, which includes the analysis code book AC (Mi) and the reproduction code book SC (Mi) described above.

The information shown in FIG. 15 may be recorded together in a memory card or the like in the camera device, or may be transferred via a network. Alternatively, it is possible to define an image file in which all the information shown in FIG. 15 is collected and transfer it to a display system. This makes it possible to obtain high resolution freely on the display side without sending the high resolution moving picture of an extremely large data amount in that state.

Figure 16:
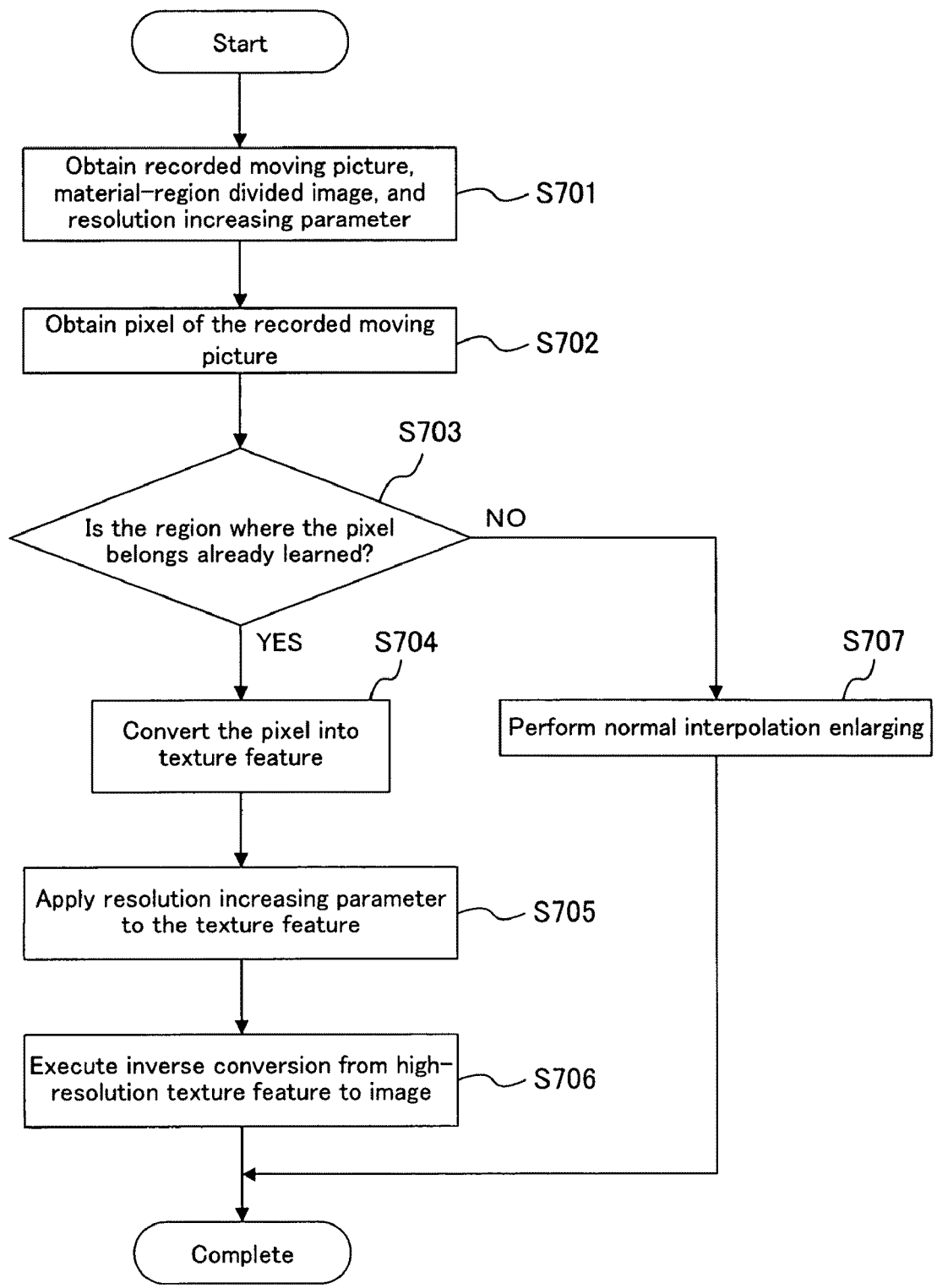
FIG. 16 is a flowchart showing a resolution increasing process of the image processing method according to the second embodiment of the present invention.

FIG. 16 is a flowchart showing a resolution increasing process of the image processing method according to the embodiment, i.e. the processing on the display side. First, upon receiving the accumulated/transferred data as shown in FIG. 15, there are obtained (S701) the recorded moving picture (moving image 1501), the material-region divided image 1502, and the resolution increasing parameters (parameter file 1503). Then, each pixel in a frame of the recorded moving picture is obtained for performing processing thereof in order (S702). It is judged which of the learned materials the pixel corresponds to by referring to the material-region divided image (S703). When judged that the pixel corresponds to the learned material, the pixel is converted to the texture feature (S704), and a high-resolution texture feature is generated by applying the resolution increasing parameter regarding the corresponding material (S705). Then, inverse conversion is executed from the high-resolution texture feature to the image (S706). For this, the inverse conversion processing described in FIG. 6 and FIG. 7 may be performed. In the meantime, for the pixels that are judged as not corresponding to the learned material, conventional interpolation enlarging is carried out (S707). As a result of carrying out the processing described above, a high-resolution moving picture is displayed.

Third Embodiment

Figure 17:
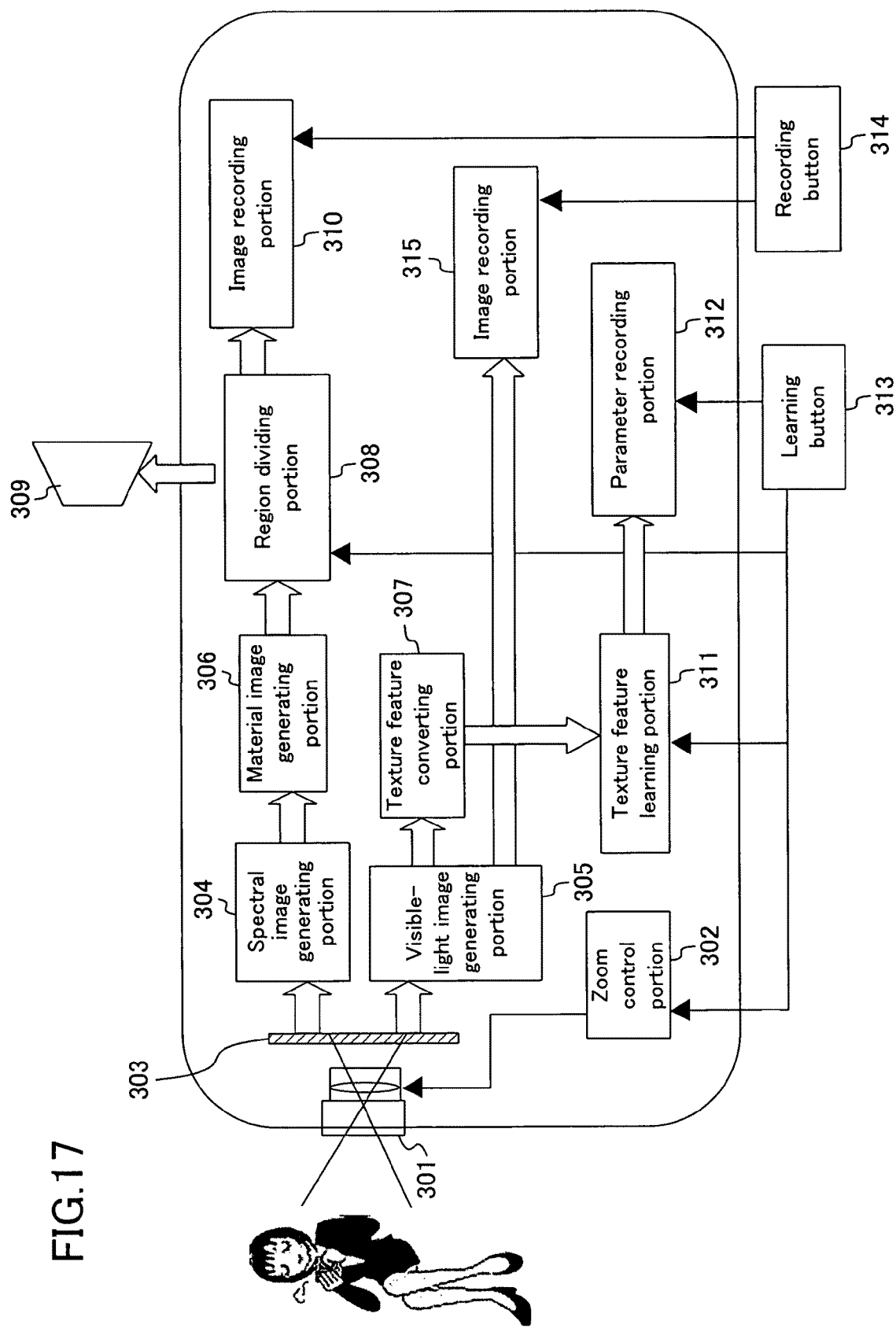
FIG. 17 is a block diagram showing an image processing apparatus according to a third embodiment of the present invention.

FIG. 17 is a block diagram showing an image processing apparatus according to a third embodiment of the present invention, which illustrates an example where the present invention is applied to a video movie camera. The image processing apparatus of FIG. 17 includes: a zoom lens 301; a zoom control portion 302; a visible light/spectral pickup portion 303; a spectral image generating portion 304 for generating a spectral image as a third image that is generated from the spectral information of the subject; a visible-light image generating portion 305; a material image generating portion 306; a texture feature converting portion 307; a learned region dividing portion 308; a learned region display portion 309 as a display such as a display; a material-region divided image recording portion 310; a texture feature learning portion 311; a resolution increasing parameter recording portion 312; a learning button 313; a recording button 314; and an image recording portion 315.

The obtaining portion formed to be capable of obtaining the spectral image, which is the third image that shows the first and second images having different resolutions and the subject characteristics regarding the target regions of the subject, is constituted with the zoom lens 301, the zoom control portion 302, the visible light/spectral pickup portion 303, the spectral image generating portion 304, and the visible-light image generating portion 305. The texture feature converting portion 307 and the texture feature learning portion 311 constitute a rule generating portion for generating the resolution conversion rules which relate the first and second images to each other from the first and second images obtained by the obtaining portion. The material image generating portion 306 and the learned region dividing portion 308 constitute a regionally divided image generating portion for generating, from the spectral image, a regionally divided image that is divided into regions based on the subject characteristic.

The shooting person executes the image learning process prior to the moving picture recording process. First, the shooting person determines the target region of the subject, and pushes the learning button 313 by directing the camera towards the corresponding portion. Upon receiving a signal thereof, the zoom control portion 302 operates the zoom lens 301, and the visible-light/spectral pickup portion 303 obtains the low-resolution image and the high-resolution image of the target region. The obtained image is separated into the spectral image and the visible-light images as the first and second images having the different resolutions by the spectral image generating portion 304 and the visible-light image generating portion 305. The texture feature converting portion 307 converts the visible-light images into the texture features, and the material image generating portion 306 generates a material image from the spectral image. The material image herein means an image that is quantized and discriminated based on the basis of material. Then, the learned region dividing portion 308 divides the material image into regions to generate the material-region divided image. The generated material-region divided image is displayed on the learned region display portion 309.

Figure 18:
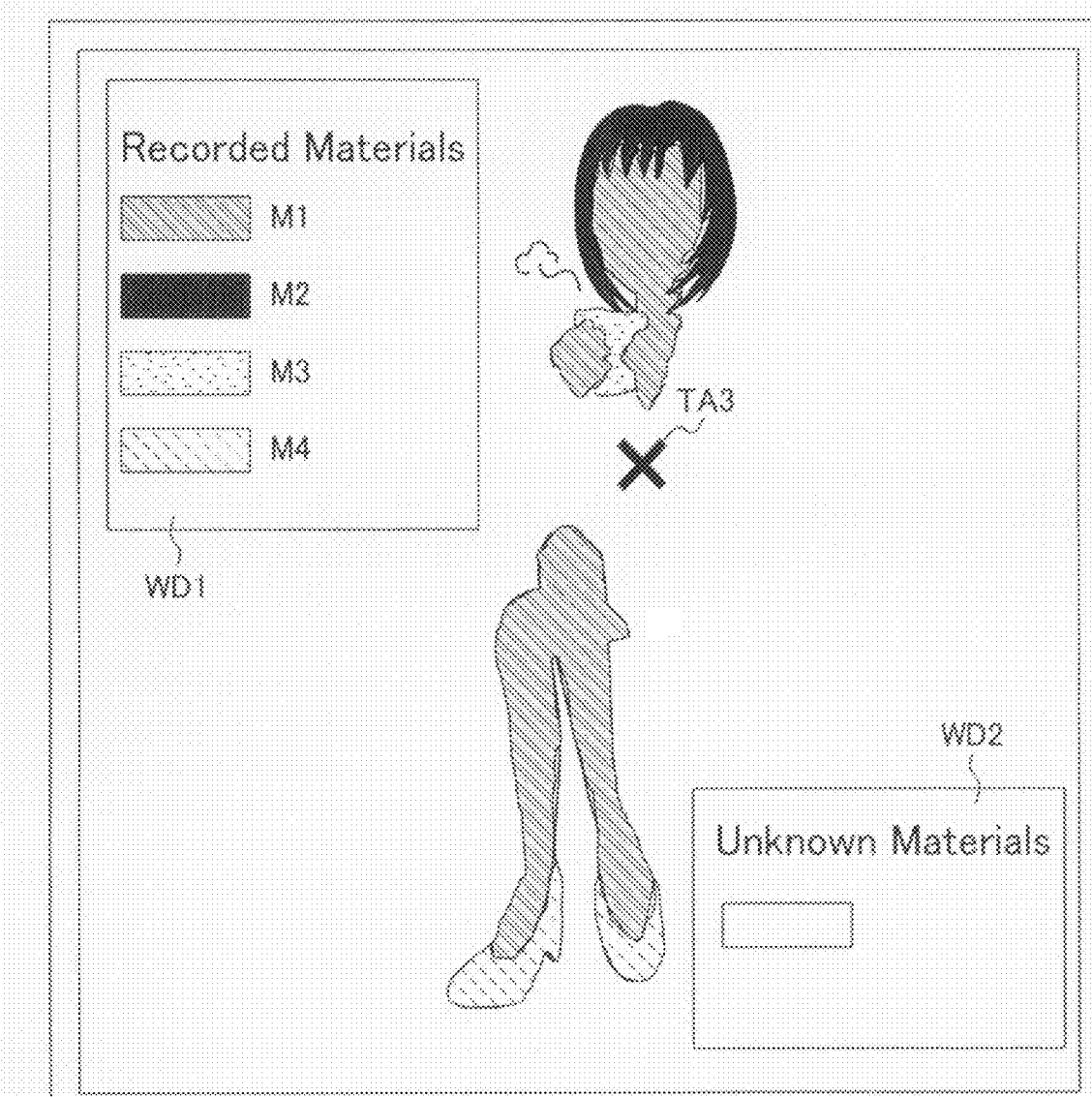
FIG. 18 is a display example of a learned region display portion.

FIG. 18 is a display example of the learned region display portion. As shown in FIG. 18, the material-region divided image obtained by dividing the subject image on the basis of the material is displayed in the center of the screen. Further, a window WD1 showing an introduction of the learned regions is displayed on the upper-left side of the screen, and a window WD2 showing an introduction of the unlearned material is displayed on the lower-right side of the screen. It can be seen from the window WD1 that M1 (skin), M2 (hair portion), M3 (cup), and M4 (leather shoes) have already been learned. Further, the white region is the unlearned region.

Figure 19:
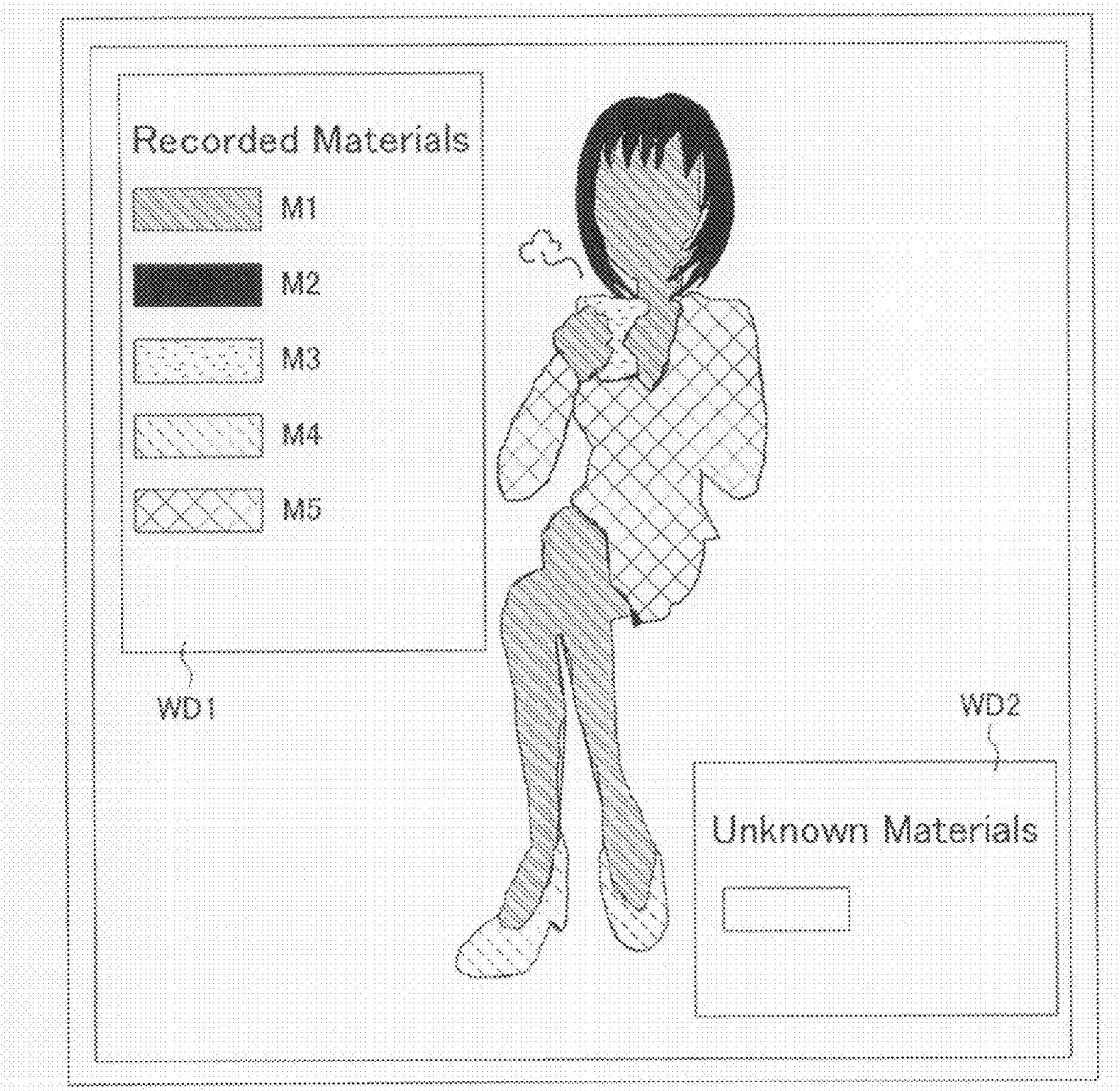
FIG. 19 is a display example of the learned region display portion after execution of learning process.

Upon looking at such display, the shooting person operates the learning button 313 to set the target region TA3 on the clothes of the subject that is the unlearned region, for example, to execute learning. That is, the learned region display portion 309 has a role of assisting the shooting person to check the unlearned region and set another target region. The signal from the learning start button 313 is also sent to the texture feature learning portion 311 and the resolution increasing parameter recording portion 312, and the resolution increasing parameter between the texture features is generated and recorded in the manner described in the embodiments above. FIG. 19 is a display example of the learned region display portion 309 after execution of learning process. That is, M5 (clothes portion) is learned, and there is only the background portion remained as the unlearned region.

Further, the shooting person may check which regions of the image the learned material is distributed from the display on the learned region display portion 309, and may perform relearning by setting the target region again if a wrong region is labeled as having the same material. For example, when the skin portion of the face of the character is set as the target region, and if the skin portions in hands and feet are identified as having the same material as shown in FIG. 18, the shooting person may adjust the identification threshold value and the like such that the face and the hands/feet are identified as different regions, when the shooting person judges that the skin of the face and the skin of the hands and feet have different textures.

After the learning process, the shooting person presses the recording button 314 for executing the recording process. With this, the moving picture from the visible-light image generating portion 305 is recorded to the image recording portion 315. In this case, it is desirable to perform proper image compression.

Figure 20:
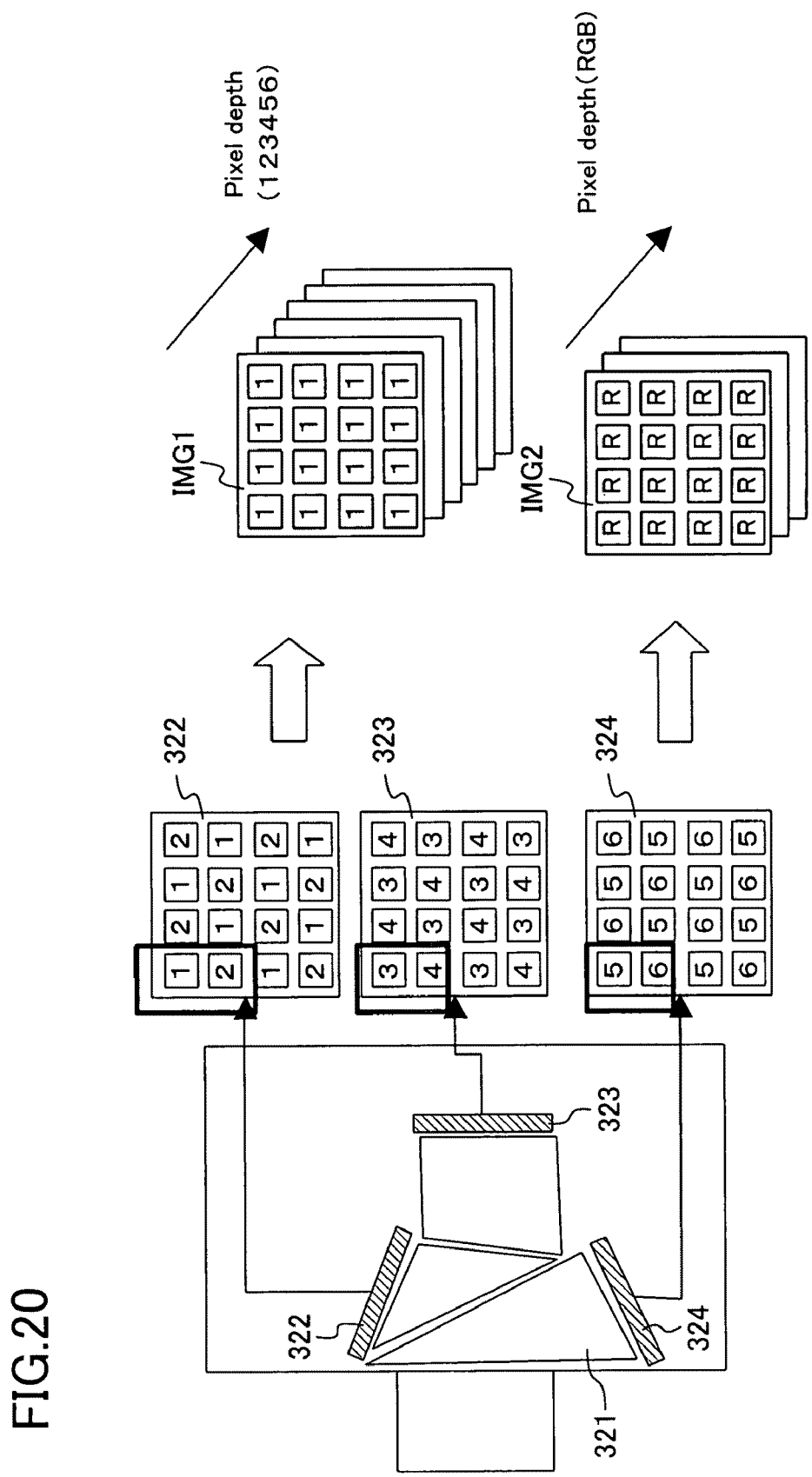
FIG. 20 is an illustration showing a structural example of a visible light/spectrogram pickup portion.

FIG. 20 is an illustration showing a structural example of a visible light/spectral pickup portion 303. The structure of FIG. 20 uses an optical system used for picking up a color image in a regular 3CCD-type video movie, and an element capable of picking up six-band spectral images, which is obtained by modifying an imaging element. In the 3CCD system, the wavelength band is separated into red, green, and blue by a dichroic prism 321, and a CCD element is allotted to each color band. This is the same in the structure of FIG. 20. The difference in the structure of FIG. 20 is that there are two different kinds of transmission-band CCD elements arranged within each CCD element. That is, a CCD element expressing with the wavelength band 1 and wavelength band 2 is arranged in a CCD 322 of a red wavelength band, a CCD element expressing with the wavelength band 3 and wavelength band 4 is arranged in a CCD 323 of a green wavelength band, and a CCD element expressing with the wavelength band 5 and wavelength band 6 is arranged in a CCD 324 of a blue wavelength band. With the interpolation signal processing of the outputs from those CCDs 322, 323, and 324, the spectral image IMG1 of the pixel depth of six bands and the visible-light image IMG2 constituted with three bands of the pixel depth of RGB are generated in the same image size as the element pixel numbers.

Figure 21:
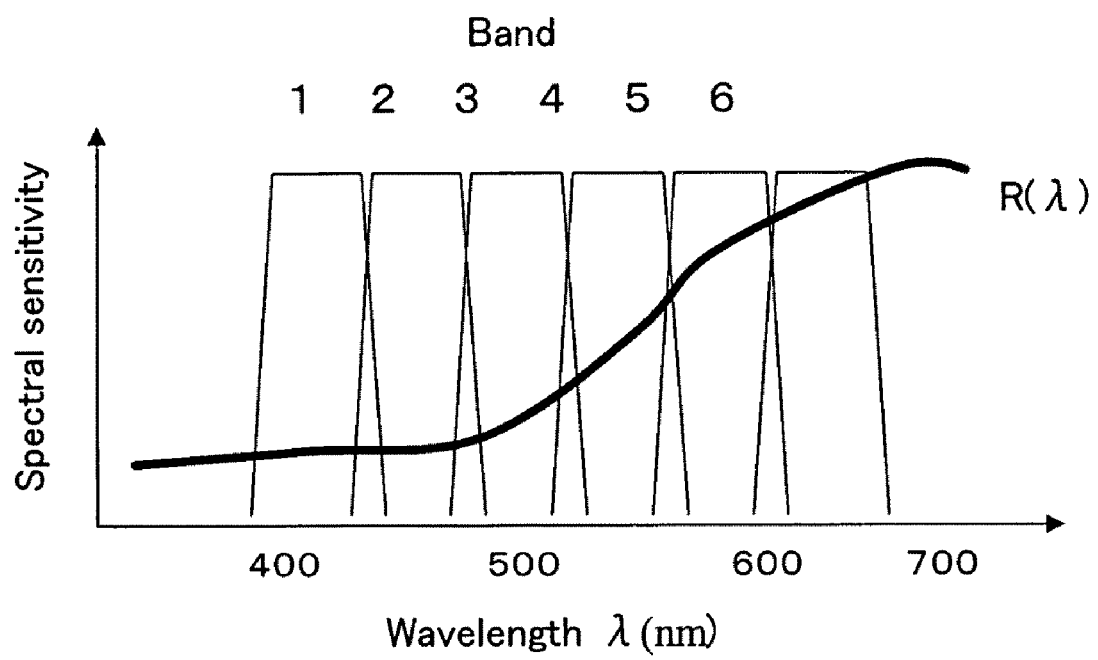
FIG. 21 is a graph showing wavelength sensitivities at each band in a spectral image.

FIG. 21 is a graph showing wavelength sensitivities at each band of a spectral image. Each of the six bands has a narrow wavelength band as shown in FIG. 21 in the visible regions of about 380 nm-780 nm. With this, it is possible to obtain the spectral information such as R ($\lambda$) more accurately compared to the case with the three bands. Therefore, the spectral reflection ratio intrinsic to the subject, which does not depend on the lighting, can be obtained more accurately. In addition, for the case of the subjects that are observed as being the same green in the color image of three bands, it is possible to identify the difference in the materials, such as a plant or green paper, in a more delicate manner. In order to identify the materials, it is not essential to limit the wavelength band position to be in the visible region. It is also very effective to set the bands to be in the infrared region. Further, the visible light image can be generated from the six-band image easily as in the following expressions, for example.

$$R = \text{band}(1) + \text{band}(2)$$
$$G = \text{band}(3) + \text{band}(4)$$
$$R = \text{band}(5) + \text{band}(6)$$

[Expressions 1]

Fourth Embodiment

Figure 22:
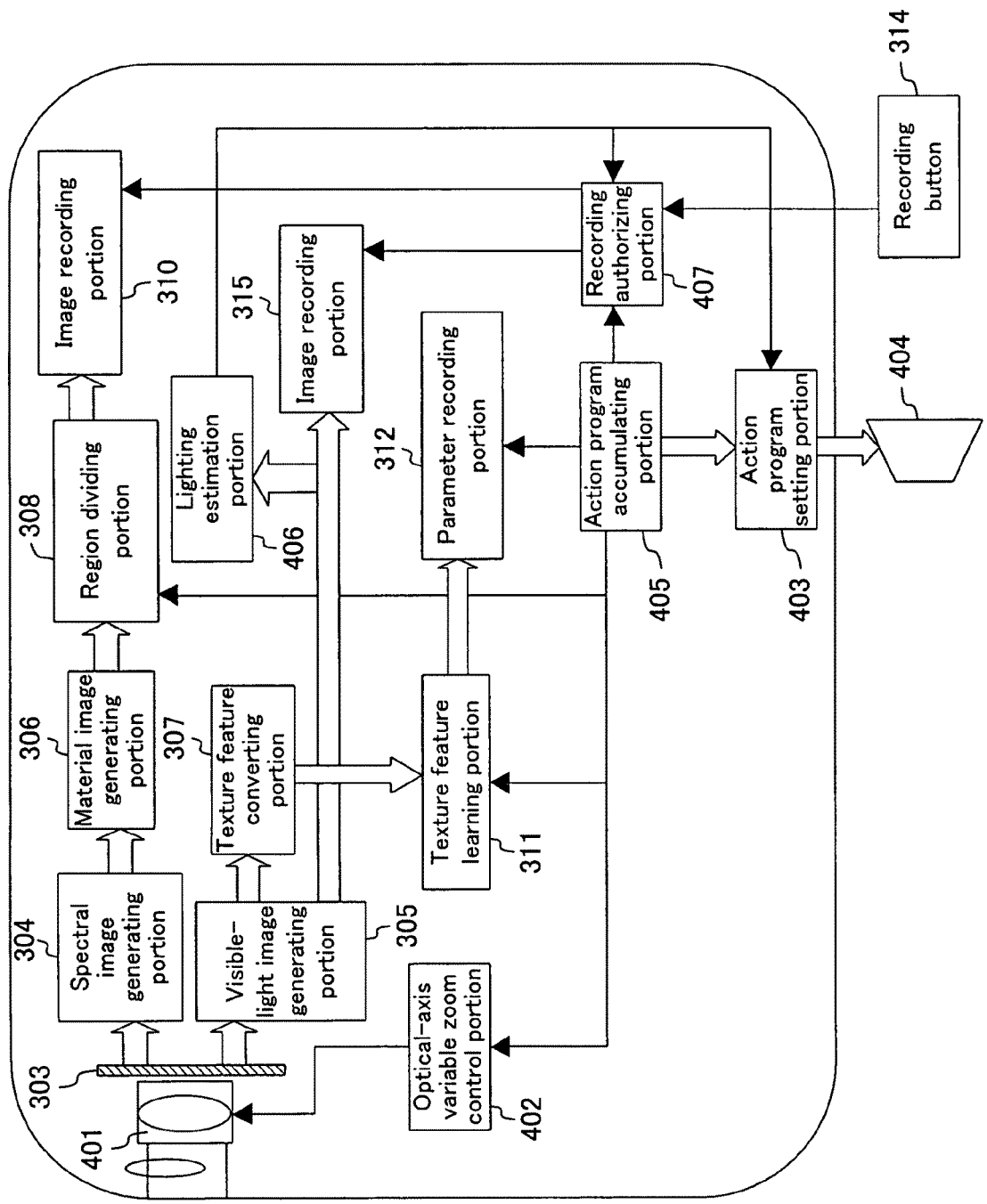
FIG. 22 is a block diagram showing an image processing apparatus according to a fourth embodiment of the present invention.

FIG. 22 is a block diagram showing an image processing apparatus according to a fourth embodiment of the present invention, which illustrates the structure of a camera for shooting an image by automatically learning each target region of the subject without an operation of the shooting person. In FIG. 22, the same reference numerals are applied to the structural elements that are in common to those of FIG. 17, and the detailed explanations thereof are omitted herein. This structure is different from that of FIG. 17 in respect that it includes an optical-axis variable zooming mechanism 401, an optical-axis variable zoom control portion 402, a camera action program setting portion 403, a camera action display portion 404, a camera action program accumulating portion 405, a lighting estimation portion 406, and a recording authorizing portion 407. The obtaining portion is constituted with the optical-axis variable zooming mechanism 401, the optical-axis variable zoom control portion 402, the visible-light/spectral pickup pat 303, the spectral image generating portion 304, and the visible-light image generating portion 305.

Figure 23:
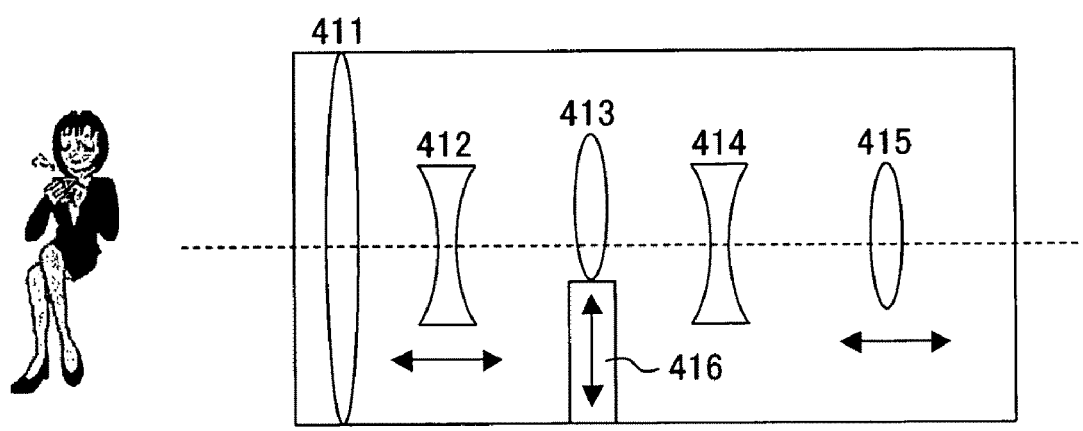
FIG. 23 is a conceptual diagram showing an example of an optical-axis variable zooming mechanism.

FIG. 23 is a conceptual diagram showing an example of the optical-axis variable zooming mechanism. The structure of FIG. 23 uses a lens shift mechanism that is a technique for compensating optical shakes (for example, see Japanese Unexamined Patent Publication H11-344669, etc). This structure includes, from the object side: a first lens group 411 having positive refractive power, which is fixed on an image surface; a second lens group 412 having negative refractive power, which exhibits a variable magnification effect by moving on the optical axis; a third lens group 413 having a positive refractive power, which is fixed on the image surface; a fourth lens group 414 having a negative refractive power, which is fixed on the image surface; a fifth lens group 415 having a positive refractive power, which moves on the optical axis on the image surface that fluctuates by the move of the second lens group 412 and the move of the object, while keeping a certain position with respect to the reference surface; and a lens shift mechanism 416 that is constituted with an electromagnet or the like. The optical axis is changed by shifting the third lens group 413 in the direction perpendicular to the optical axis by the use of the lens shift mechanism 416, and the zooming mechanism is executed by moving the second lens group 412 and the fifth lens group 415. With this mechanism, the target region that is a specific portion within the shooting view angle can be moved to the center of the optical axis, and the optical zooming can be performed at the same time. In this manner, optical zooming can be executed automatically for all the target regions within the screen without moving the camera itself.

The camera action display portion 404 is provided with an operation device such as a touch panel for enabling operations such as designating the target region.

The shooting person determines the recording view angle of the camera while looking at the display of the camera action display portion 404. In the embodiment, the camera automatically learns the target by using the lens mechanism in the learning process, so that it is necessary to fix the camera position during the learning period. In this sense, it is desirable to fix the view angle and the facing direction of the camera also in the recording process.

First, in the learning process, the shooting range and a plurality of different-material target regions in the subject are designated by the coordinates on the image. Designation of the different-material target regions herein means to designate the material of the subject to be learned by designating the image regions of the subject displayed on the screen. The designated contents are put into a program by the camera action program setting portion 403, and accumulated in the camera action program accumulating portion 405 as a control program for both the image learning process and the recording process where zooming and panning action by changing the optical axis are combined.

In the image learning process, the optical-axis variable zoom control portion 402 automatically controls the optical-axis variable zooming mechanism 401 according to the program accumulated in the camera action program accumulating portion 405. Then, the high-resolution images are obtained and the materials are learned for a plurality of target regions, while executing the optical zooming by aligning the optical axis with an arbitrary position of the subject.

In the recording process, a moving picture is filmed-automatically for a certain time according to the program accumulated in the camera action program accumulating portion 405. In this state, the camera is basically fixed on a stand regarding the view angle and the facing direction.

The lighting estimation portion 406 detects the lighting environment of the subject by performing the image processing on the entire image, and judges the necessity of re-executing the learning. The learning herein includes generation of the resolution conversion rule. When judged that it is necessary to re-execute the learning, the camera notifies it to the shooting person via the camera action display portion 404, for example.

Further, when recording or shooting is to be started without completing the learning or when re-leaning is not executed even though it is required due to a change in the lighting condition, the recording authorizing portion 407 does not permit recording or shooting, and it has a mechanism for restricting operations of the recording button and the shutter. That is, the camera according to the embodiment has a function of prohibiting shooting, when it is necessary to generate the resolution conversion rule. This makes it possible to prevent failures in achieving high resolution in advance.

Figure 24A:
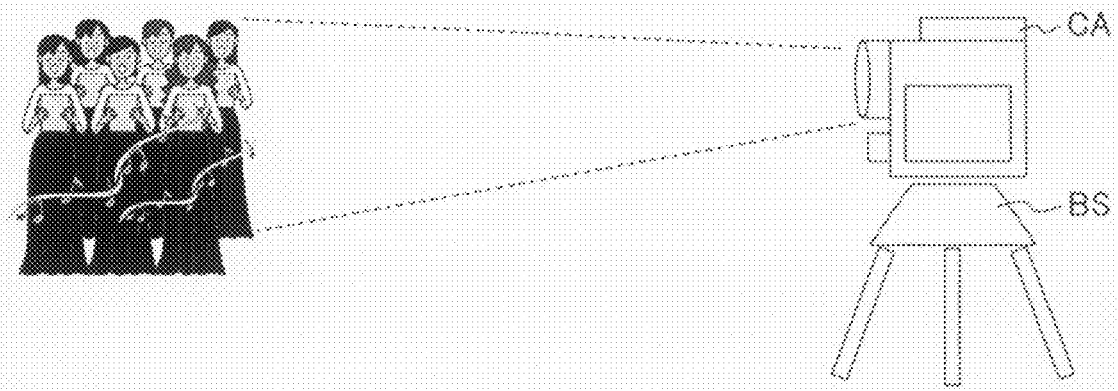
FIG. 24 is an illustration showing an example of using a camera according to the fourth embodiment of the present invention and an example of setting the target region.

As the typical usage of the camera according to the embodiment, considered may be a case of recording a scene of a chorus group with a large number of members singing on a stage, as shown in FIG. 24A. In such case, conventionally, close-up of the faces of each member is shot by the camera work of the shooting person in his/her own way. In that case, however, it is highly possible that the favorite person of the shooting person or the key person of the group is picked up in close-up more frequently. Thus, it is possible to have complaints from other members. Furthermore, it requires a skilled cameraman to shoot the complete view and close-ups of individuals adequately. Moreover, a considerable amount of concentration is required for shooting. On the contrary, the use of the camera according to the embodiment can provide a large effect as follows. That is, the shooting person only needs to shoot the complete view without minding the camera work. Then, the resolution of the image can be freely improved to high resolution by compilation work after the shooting, and close-ups of the whole members can be easily obtained.

Figure 25:
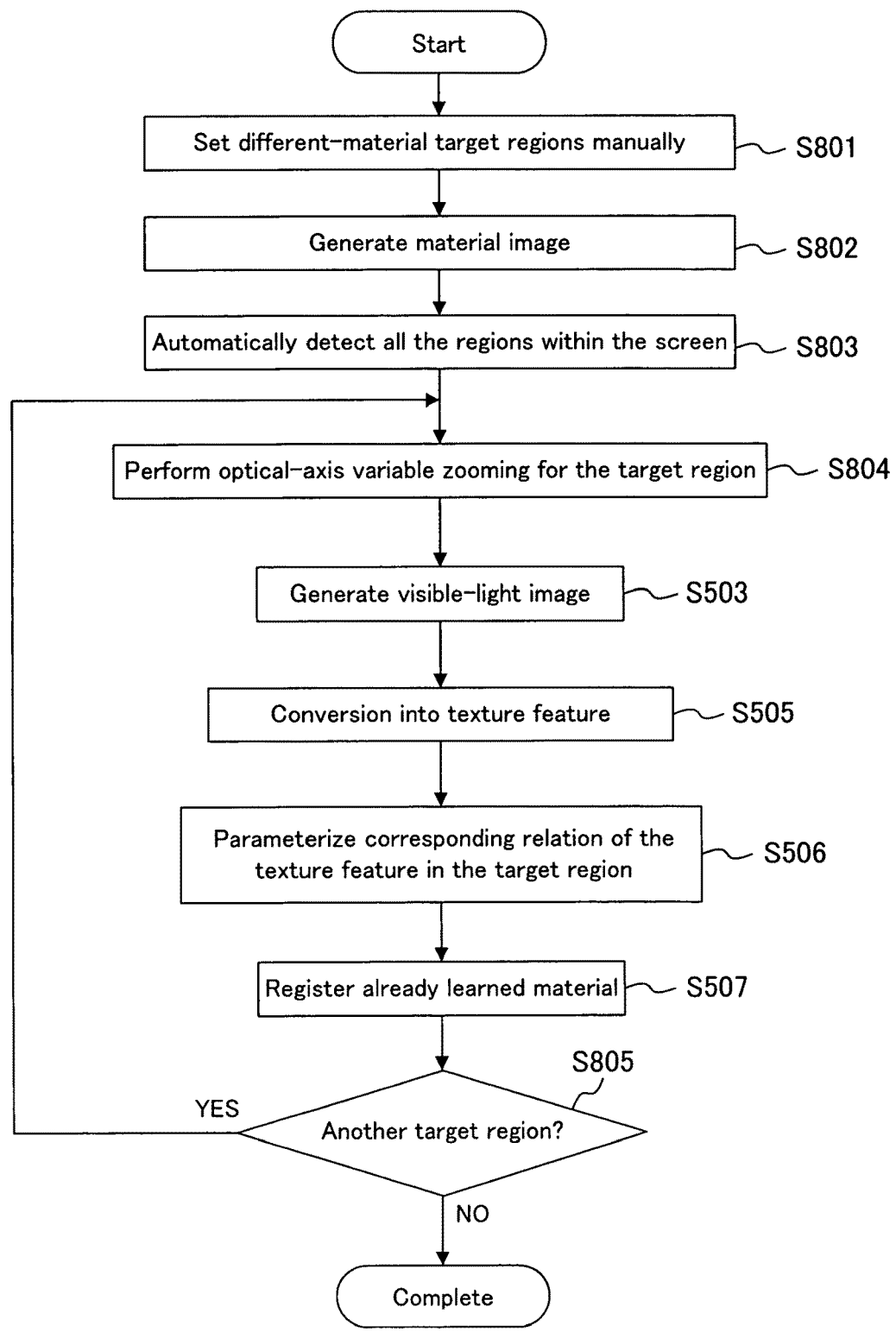
FIG. 25 is a flowchart showing a learning process according to the fourth embodiment of the present invention.

In FIG. 24A, the camera CA and the camera stand BS are placed at an audience seat, for example, for shooting the chorus group on the stage as the subject. The learning process of this case will be described by referring to a flowchart of FIG. 25.

Figure 24B:
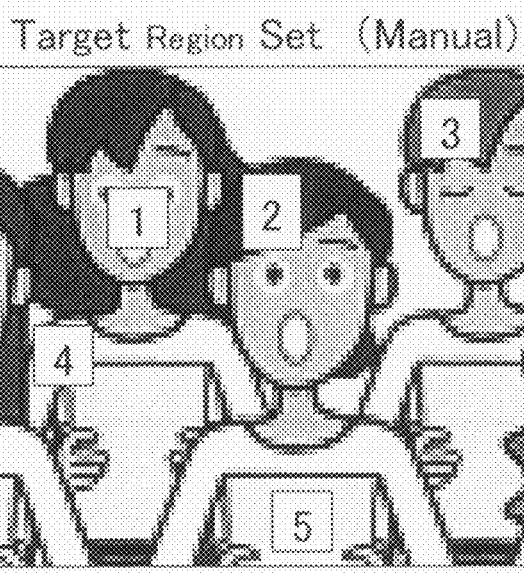

First, the shooting person gives an instruction to perform optical zooming at a specific portion of the video of the entire chorus group, and designates the different-material target regions manually while looking at the display on the camera action display portion 404 (S801). FIG. 24B is an example of the display in that state and designation of the different-material target regions. In FIG. 24B, the face region (1) of an individual, dark hair (2), brown hair (3), data (4), and a paper (5) of the surface of the music score are designated as the different-material target regions. Those regions are designated for learning the different materials, so that the positional information is not required.

Thereafter, the camera generates a material image (S802), and automatically detects all the regions of the same subject characteristic (material) as that of the designate different-material target region from the screen (S803). The, the optical-axis variable zooming mechanism is used to perform optical zooming for the different-material target regions (S804), and the different-material target regions are automatically learned thereafter (S503-S507). The processing herein is the same as that of the second embodiment, so that the detailed explanation thereof is omitted. When learning for all the different-material targets is completed (NO in S805), the learning process is ended.

Figure 26A:
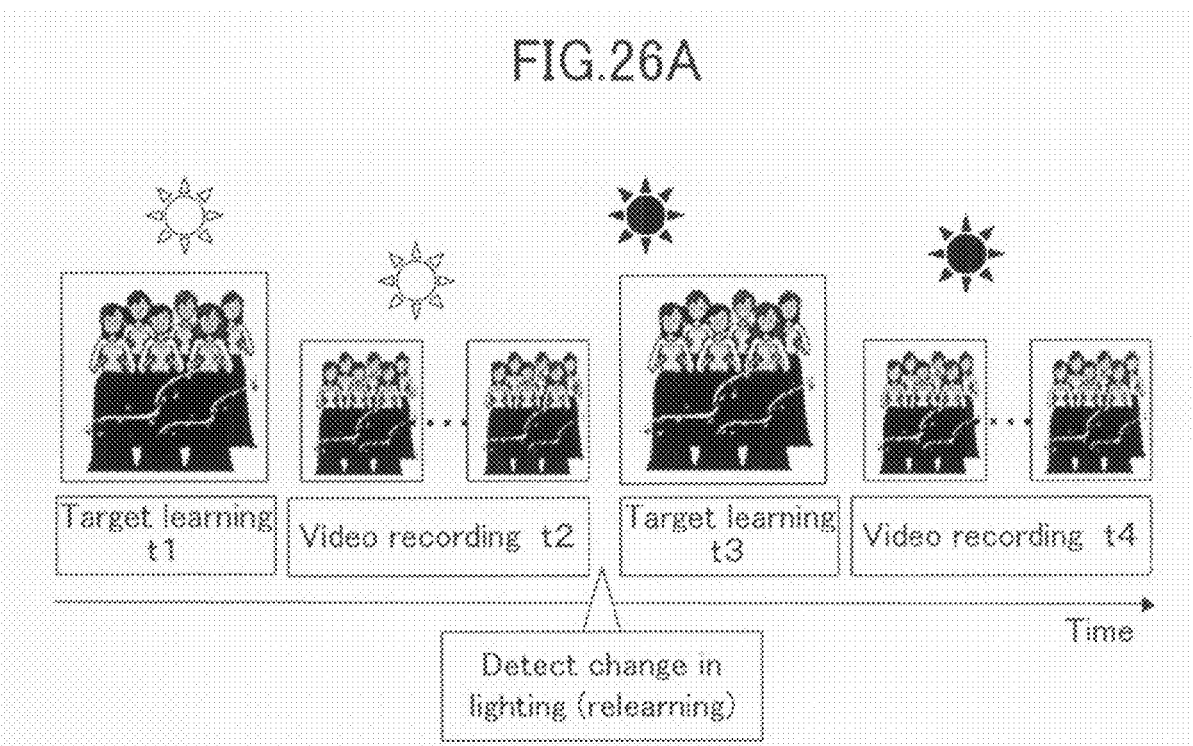
FIG. 26 is a timing chart showing the relation in terms of time between the learning process and the recording process according to the fourth embodiment of the present invention.

FIG. 26 is a timing chart showing the relation in terms of time between the learning process and the recording process. FIG. 26A shows the case of recording a moving picture. The target learning (period t1) is completed right before the singing is started, and the singing by the chorus group is video-recorded (period t2). During the recording, no special camera work is required, and the complete view may simply be shot. Further, when the lighting on the stage is changed, for example, the learned contents by the spectral information become inappropriate. Thus, there may require relearning (period t3). Furthermore, learning may be performed at an elapse of a prescribed time. In such case, the camera detects changes in the condition by the lighting estimation portion 406, and givens an instruction to the shooting person indicating that relearning is necessary. In that case, it is preferable to perform learning of the target while executing recording. However, the image shot for learning the target may be used as it is as the recorded image.

Figure 26B:
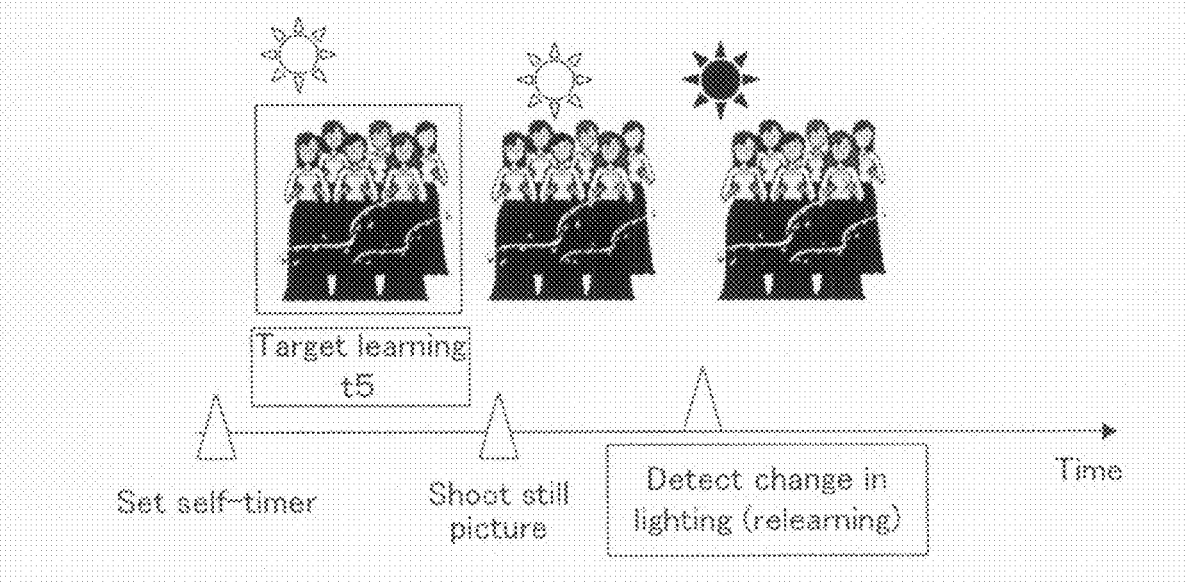

Further, FIG. 26B shows the case of shooting a picture of the complete chorus group. In this case, a self-timer mechanism is used to perform optical zooming sequentially in the timer operating period for the faces of the characters detected as the targets while the gathered whole members are at stand-still state, in order to obtain high resolution and perform parameterization (period t5). Thereafter, the picture of the complete members together is shot. With this, it is possible to achieve high resolution for the faces of each member from a single still picture by performing compilation work afterwards. Further, when there is a change in the lighting, a still picture is shot after performing relearning. In this case, the recording authorizing portion 407 may execute a control for restricting shooting during the period where learning is not performed yet.

In this case, the faces of each member are considered as the same material (skin), so that it is not possible to achieve high resolution thereon by separate methods. If it is desired to achieve high resolution on the faces of each member by separate methods, some devising is required, such as a method for differentiating the individual subject characteristics (for example, each member uses cosmetics of different characteristics).

Fifth Embodiment

Figure 27:
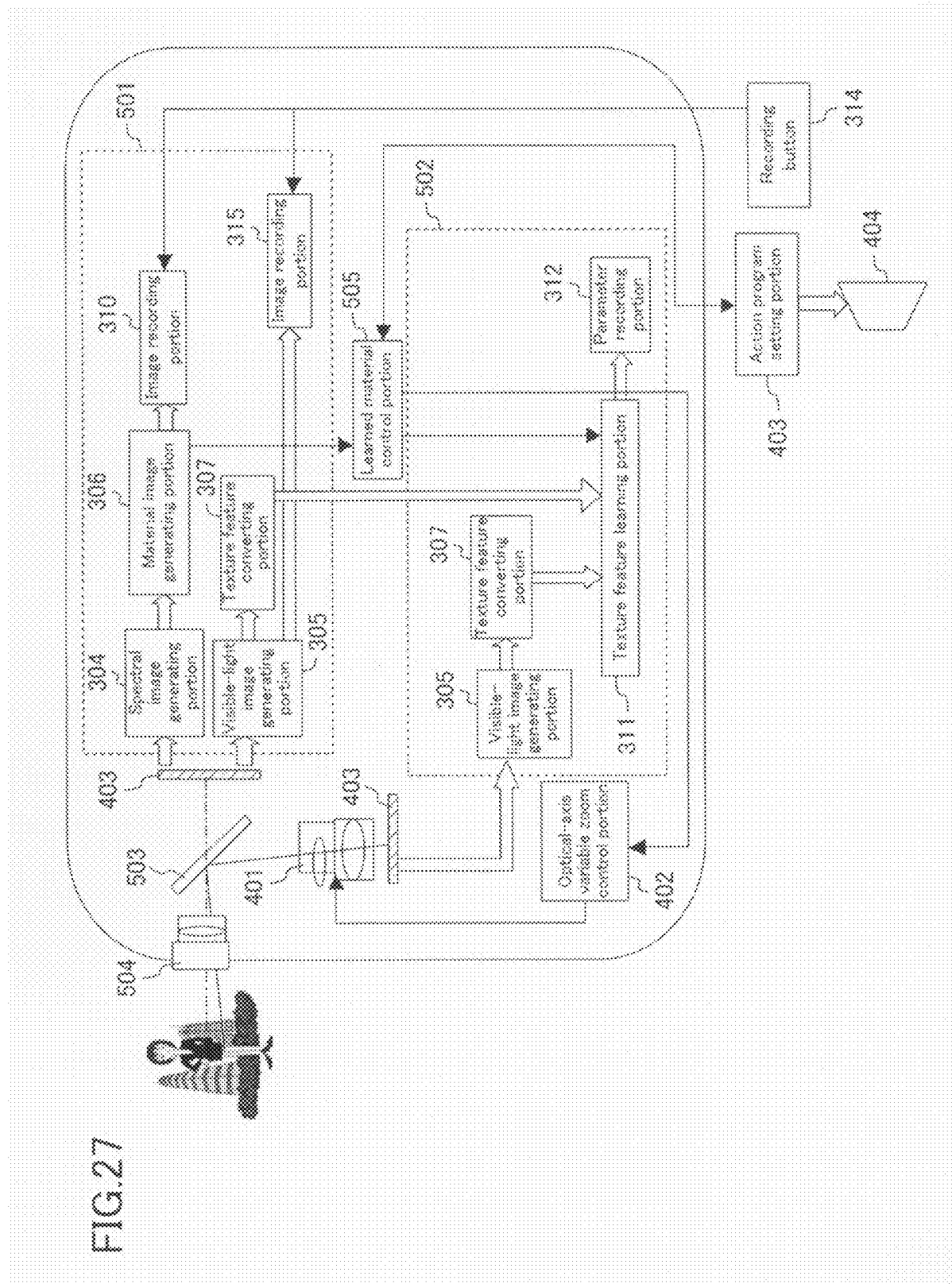
FIG. 27 is a block diagram showing an image processing apparatus according to a fifth embodiment of the present invention.

FIG. 27 is a block diagram showing an image processing apparatus according to a fifth embodiment of the present invention, which illustrates the structure of a camera for shooting an image by automatically learning each target region of the subject without an operation of the shooting person. In FIG. 27, the same reference numerals are applied to the structural elements that are in common to those of FIG. 17 and FIG. 22.

This structure is different from that of the fourth embodiment in respect that there is no distinction between the image learning process and the recording process. That is, when a shooting person starts recording of the subject by an operation in the same manner as that of a regular camera, learning is executed in parallel as necessary by using the optical-axis variable zooming mechanism. Thus, even though it is essential in the fourth embodiment to fix the camera on the stand during the period of the learning process, it is possible with the fifth embodiment to freely execute learning and recording by the camera on hands. Further, the shooting person in the third embodiment intentionally executes the special learning process. However, it is unnecessary to do so in the fifth embodiment, so that the shooting person can concentrate only on recording.

In FIG. 27, a recording portion 501 and a learning portion 502 are placed in parallel, and light is divided by a half mirror 503. The light transmitted through a lens 504 is inputted to the recording portion 501 via a visible-light/spectral pickup portion 403. A material image is recorded to the material-region divided image recording portion 310, and a visible-light image is recorded to the image recording portion 315 by the same operation as that of the third embodiment. The lens 504 has a zooming mechanism. However, an optical-axis variable zooming mechanism 401 and an optical-axis variable zoom control portion 402 are provided on the input side of the learning portion 502, so that zooming for the learning can be separately performed during the recording process. The obtaining portion is constituted with the leans 504, the half mirror 503, the optical-axis variable zooming mechanism 401, the optical-axis variable zoom control portion 402, the visible-light/spectral pickup portion 403, the spectral image generating portion 304, and the visible-light image generating portion 305.

A learned material control portion 505 controls the optical-axis variable control portion 402 and the texture feature learning portion 311 based on the learning plan (stored in the action program setting portion 403) which is programmed in advance. That is, upon judging that recording of a specific material is started from the output of the material image generating portion 306, the learned material control portion 505 sends a signal to the optical-axis variable zooming portion 402 to start the operation of the optical-axis variable zooming mechanism 401, while sending a signal to the texture feature learning portion 311 to generate the resolution increasing parameter. The generated parameter is recorded in the resolution increasing parameter recording portion 312.

Figure 28:
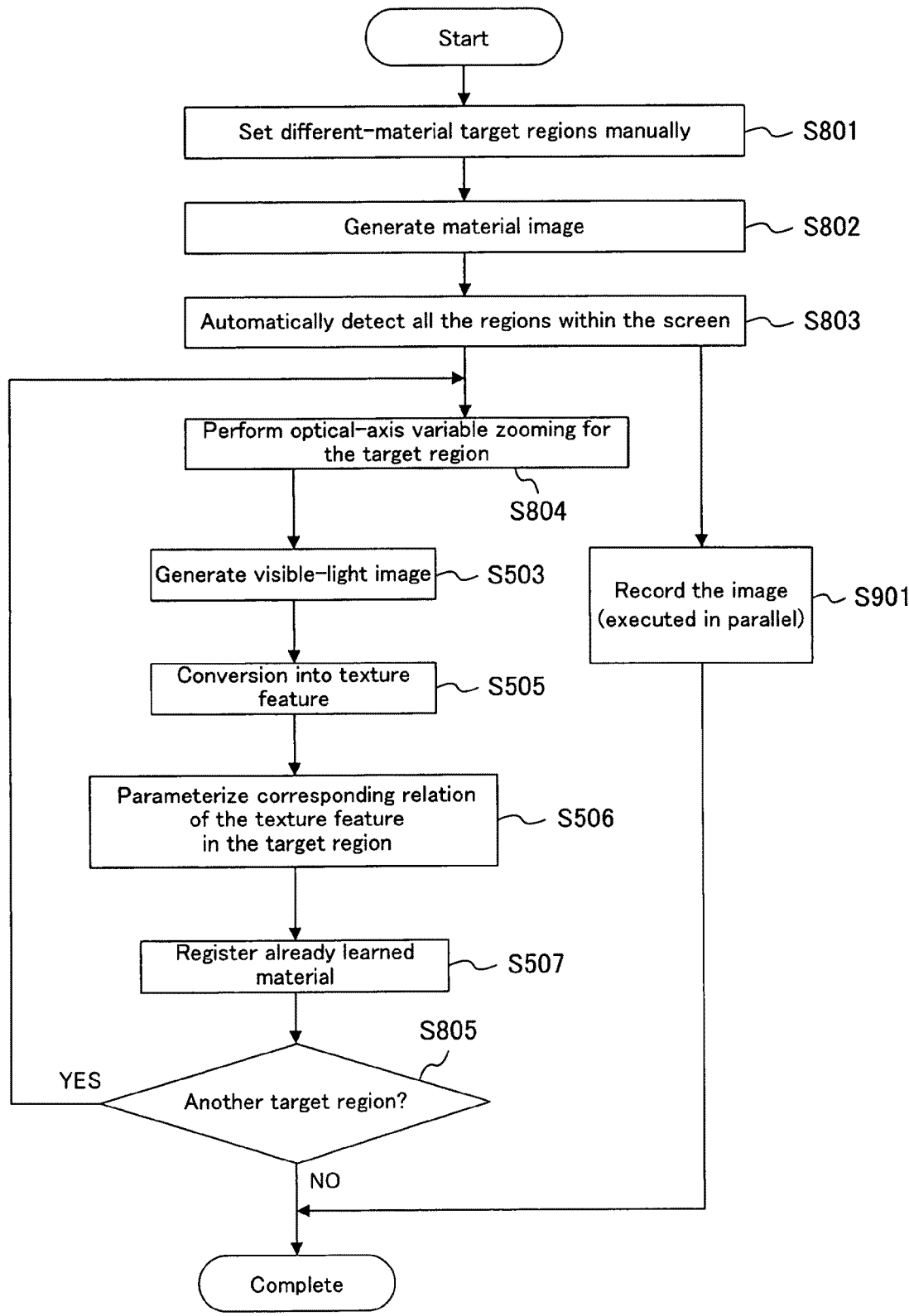
FIG. 28 is a flowchart showing an image recording process according to the fifth embodiment of the present invention.

FIG. 28 is a flowchart showing the image recording process according to the fifth embodiment. It is only different from that of the fourth embodiment shown in FIG. 25 in respect that the image recording process is executed in parallel with the learning process (S901). The processing of other steps are the same as those of the fourth embodiment. In the step S801, the shooting person selects a plurality of target regions within the recording range of the camera and inside thereof with the coordinates on the image while looking at the camera action display portion 404. With this, the camera action program is being set.

Figure 29:
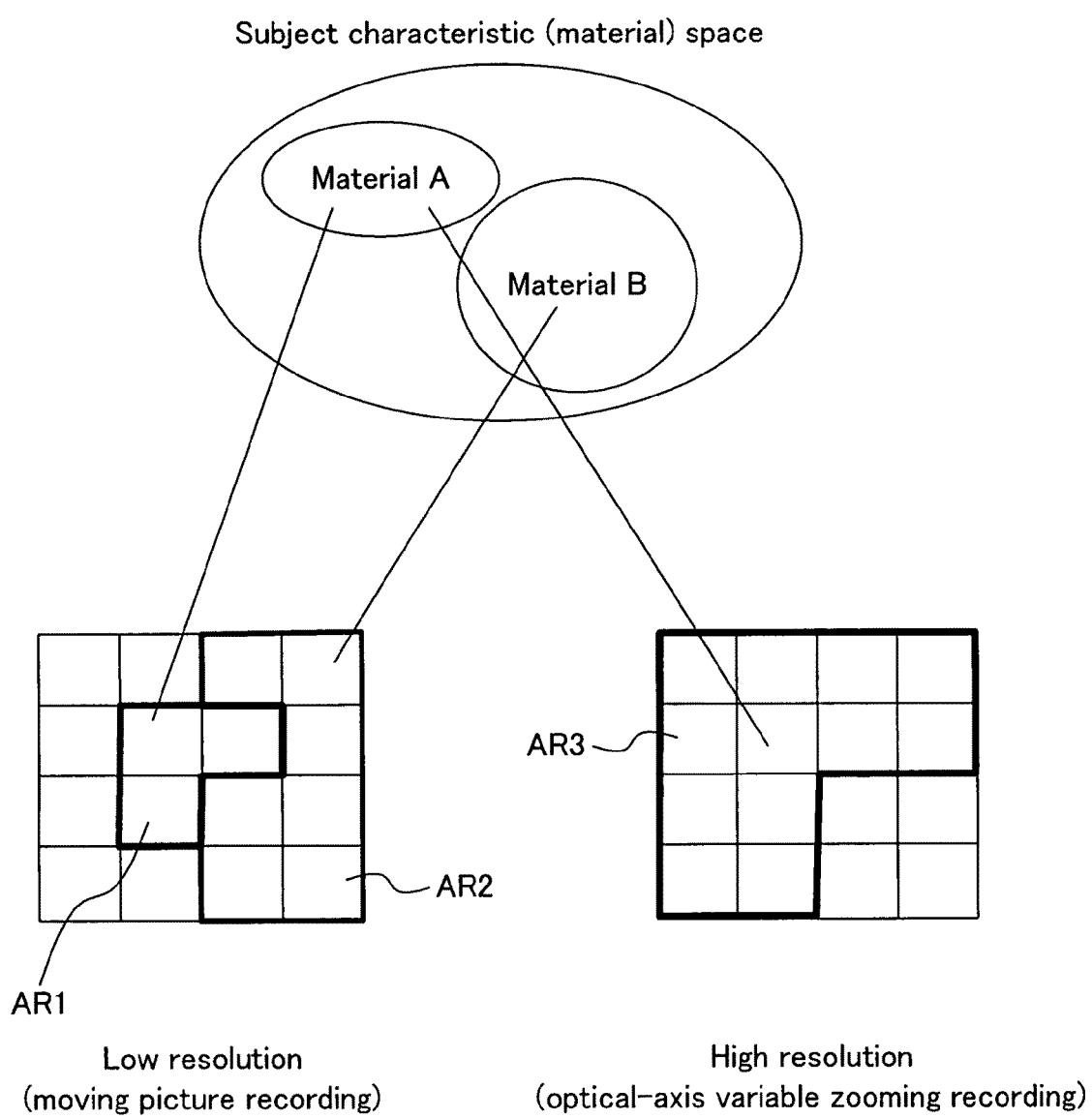
FIG. 29 is a conceptual diagram showing the relations regarding the low resolution and the high resolution with respect to the subject characteristic space according to the fifth embodiment.

FIG. 29 is a conceptual diagram showing the relations regarding the low resolution and the high resolution with respect to the subject characteristic (material) space according to the fifth embodiment. In FIG. 29, it is assumed that the image is picked up in 4×4 pixels for the sake of simplification. In the embodiment, first, the low-resolution moving picture recorded image is obtained. Then, the image is divided into a region AR1 (corresponds to the material A) and a region AR2 (corresponds to the material B) on the subject characteristic space. Assuming that there is a program of "to learn material A" set in advance, optical-axis variable zooming is performed targeted at the center of the position of the region AR1 to obtain a narrow view angle image at the same position with higher resolution. Then, learning (relating the texture features) is performed between the region AR1 of the low-resolution image and the region AR3 of the high-resolution image at the same position with each other. In this manner, as in the cases of each embodiment described above, learning between two pieces of images is executed not simply between the regions of the same material but also at the same positions of the same subject essentially. With this, highly accurate resolution increasing processing can be achieved.

Sixth Embodiment

Figure 30:
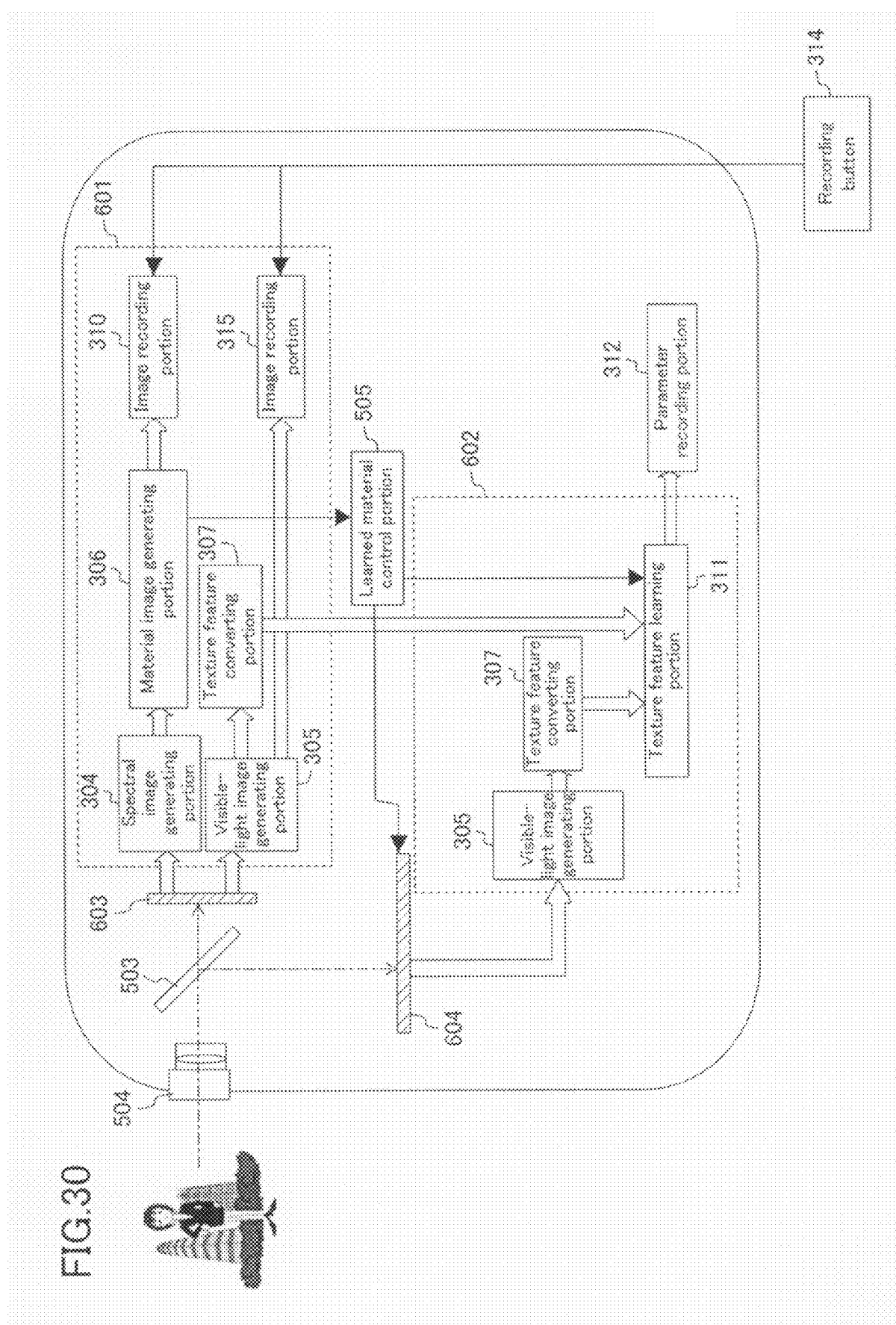
FIG. 30 is a block diagram showing the structure of an image processing apparatus according to a sixth embodiment of the present invention.

FIG. 30 is a block diagram showing an image processing apparatus according to a sixth embodiment of the present invention, which illustrates the structure of a camera capable of shooting an image by automatically learning each target region of the subject without operation of the shooting person, as in the case of the fifth embodiment. In FIG. 30, the same reference numerals are applied to the structural elements that are in common to those of FIG. 17 and FIG. 27.

This embodiment is different from the fifth embodiment in respect that it uses a low-resolution imaging device 603 and a high-resolution imaging device 604 to shoot the subject simultaneously with the same view angle, without using an optical zooming mechanism, an optical-axis variable zooming mechanism, and the like. Normally, the high-resolution imaging devices are used for picking up still pictures and are not capable of dealing with the frame rate of moving pictures in many cases. Therefore, in the embodiment, learning performed by using the high-resolution imaging device is executed at a prescribed timing in the middle of recording a moving picture. Further, the high-resolution imaging device does not need to obtain the spectral information but only needs to obtain the visible-light image.

In FIG. 30, a recording portion 601 and a learning portion 602 are placed in parallel, and light is divided by a half mirror 503. The light transmitted through a lens 504 is inputted to the recording portion 601 via the low-resolution imaging device 403. A material image is recorded to a material-region divided image recording portion 310, and a visible-light image is recorded to an image recording portion 315 by the same operation as that of the fifth embodiment.

A learned material control portion 505 controls the high-resolution imaging device 604 and the texture feature learning portion 311 based on the learning plan that is programmed in advance. That is, upon judging that recording of a specific material is started from the output of the material image generating portion 306, the learned material control portion 505 operates the high-resolution imaging device 604 to shoot a still picture with the same view angle as that of the moving picture, while sending a signal to the texture feature learning portion 311 to generate the resolution increasing parameter. The generated resolution increasing parameter is recorded in the resolution increasing parameter recording portion 312.

Figure 31:
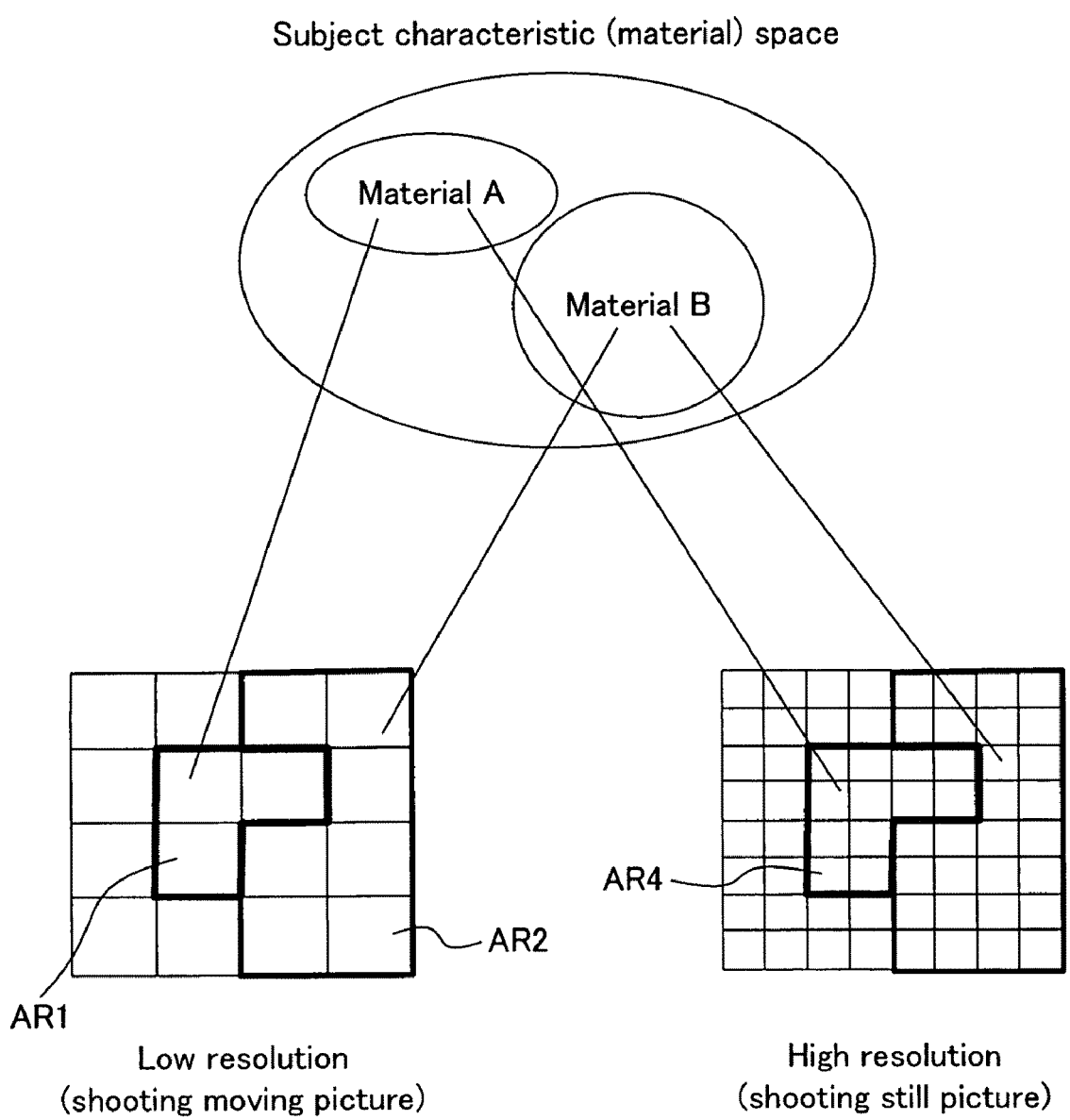
FIG. 31 is a conceptual diagram showing the relations regarding the low resolution and the high resolution with respect to the subject characteristic space according to the sixth embodiment.

FIG. 31 is a conceptual diagram showing the relations regarding the low resolution and the high resolution with respect to the subject characteristic (material) space according to the embodiment. In FIG. 31, it is assumed that the low-resolution image is picked up in 4×4 pixels and the high-resolution image is picked up in 8×8 pixels for the sake of simplification. In the embodiment, first, the low-resolution image of wide view angle is obtained by filming a moving picture. Then, the image is divided into a region AR1 (corresponds to the material A) and a region AR2 (corresponds to the material B) on the subject characteristic space. Assuming that there is a program of "to learn material A" set in advance, a high-resolution still image with the same view angle and at the same position as that of the low-resolution image is obtained by the high-resolution imaging device 604. Then, learning (relating the texture features) is performed between the region AR1 of the low-resolution image and the region AR4 of the high-resolution image at the same position with each other. In this manner, as in the cases of each embodiment described above, learning between two pieces of images is executed not simply between the regions of the same material but also at the same positions of the same subject essentially. With this, highly accurate resolution increasing processing can be achieved.

Figure 32:
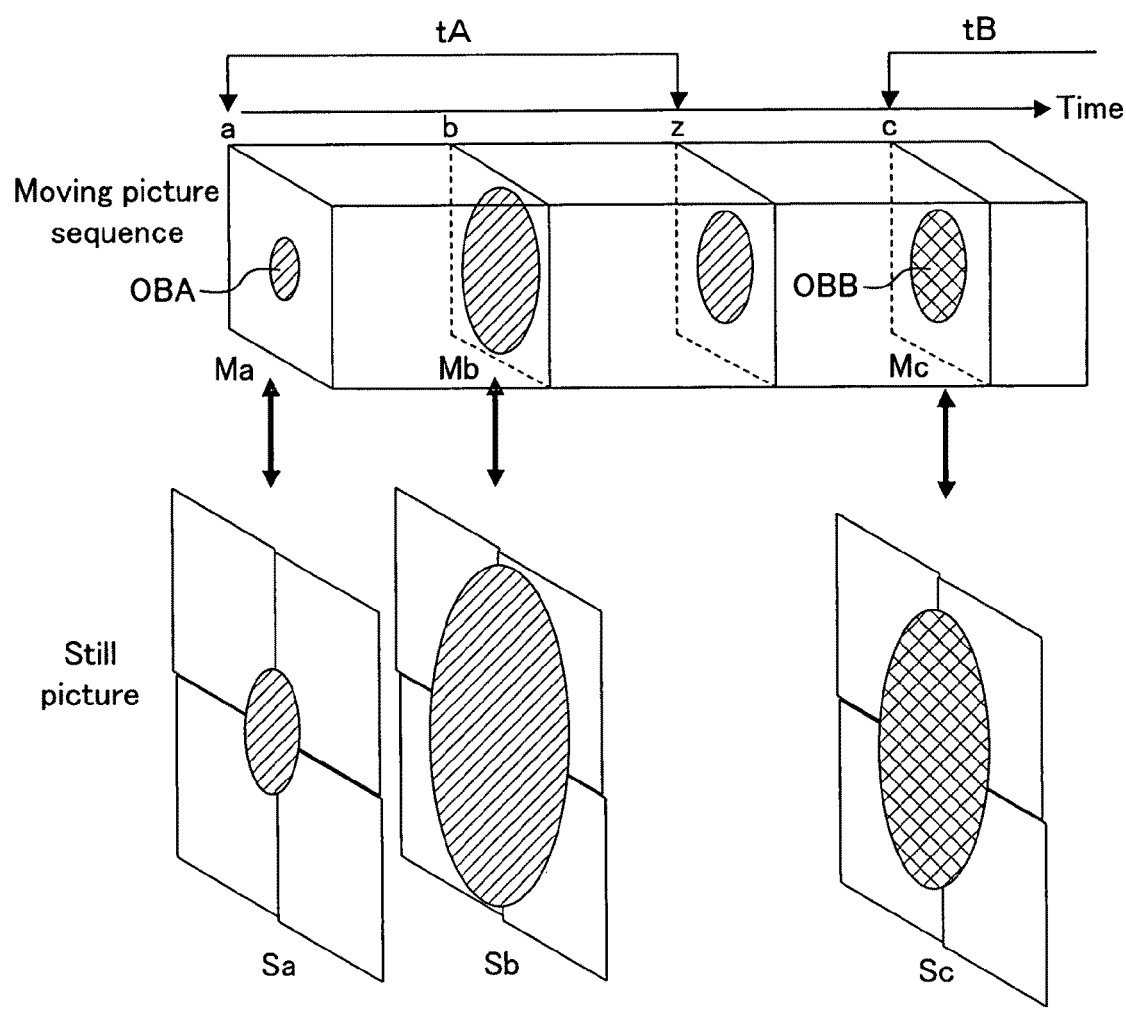
FIG. 32 is an illustration showing an example of the timing of shooting a high-resolution image according to the sixth embodiment of the present invention.

FIG. 32 is an illustration showing an example of the timing of shooting a high-resolution image according to the embodiment. It is assumed herein that the resolution of the high-resolution image (still picture) is 2×2 times that of the low-resolution image (moving picture). In the moving picture sequence, the object OBA of the material A is recorded in the period tA. Assuming that the material A is to be learned, first, a high-resolution still picture Sa is obtained with twice the resolution of the frame image Ma at the timing of the moving picture frame a. At the next timing b, a high-resolution still picture Sb is shot again, while the object OBA is shot by being enlarged through the optical zooming. Learning is performed to relate the texture features between the image Ma and the image Sa and between the image Mb and the image Sb, and parameterization is performed therebetween.

Next, although the same object OBA appears at the timing z, it is unnecessary to perform high-resolution shooting since the same material A has already been learned. In the period tB, an object OBB with the different material B has come to appear on the camera. Thus, at the timing c, the high-resolution still picture Sc is shot again for learning the material B. Whether a certain subject characteristic is unlearned or not can be recognized from the spectral image.

As described above, the embodiment has such an advantage that parameterization can be advanced by performing learning on new materials that appear one after another in accordance with the recording process of the subject.

In the embodiment, used are two kinds of imaging devices having different resolutions. However, the effects thereof can also be achieved with a method that uses a single high-resolution imaging sensor, by lowering the resolution also for picking up the moving picture, for example.

Figure 33:
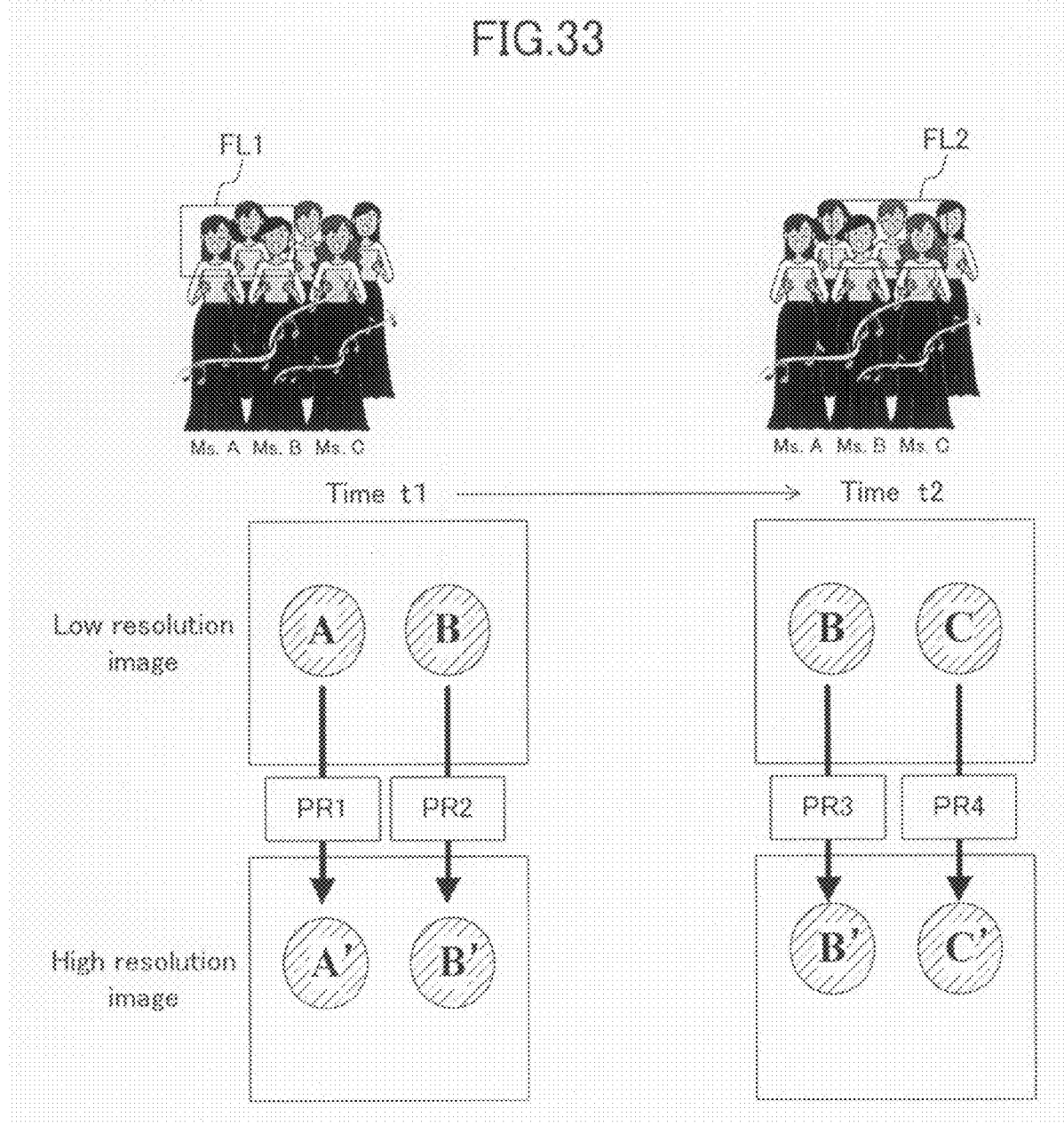
FIG. 33 is an illustration showing the corresponding relations between the low-resolution image and the high-resolution image according to the sixth embodiment of the present invention.

There is no optical zoom used in this embodiment, so that the embodiment exhibits such a character that the view angles and the positional coordinates of the low-resolution image and the high-resolution image are consistent with each other at all times. By utilizing this character, different high resolution can be achieved separately even on the regions judged as having the same material, based on a difference in the positions within the image or a difference in the shot time. This will be described using FIG. 33 by referring to the case of the chorus group described above.

It is assumed herein that the chorus group is video-recorded in a framing FL1 at the time t1 and in framing FL2 at the time t2. Among the three members on the front row, the members A and B are zoomed in the framing FL1, and the members B and C are zoomed in the framing FL2. The low-resolution image and the high-resolution image always keep the corresponding relation.

Even if the members A and B are judged as being in the same material, it is possible to discriminate one from another since the resolution increasing parameter PR1 of the image of the member A and the resolution increasing parameter PR2 of the image of the member B are different in terms of the positions on the image. Further, it is possible to discriminate the resolution increasing parameter PR2 at the time t1 from the resolution increasing parameter PR3 at the time t2, even though the images are of the same member B. Therefore, by accumulating the resolution increasing parameters by using the position (x, y) and the time t as the indexes, it is possible to perform resolution increasing processing on the faces of each member of the chorus group by separate resolution conversion rules. As a result, the accuracy can be improved further.

Figure 34:
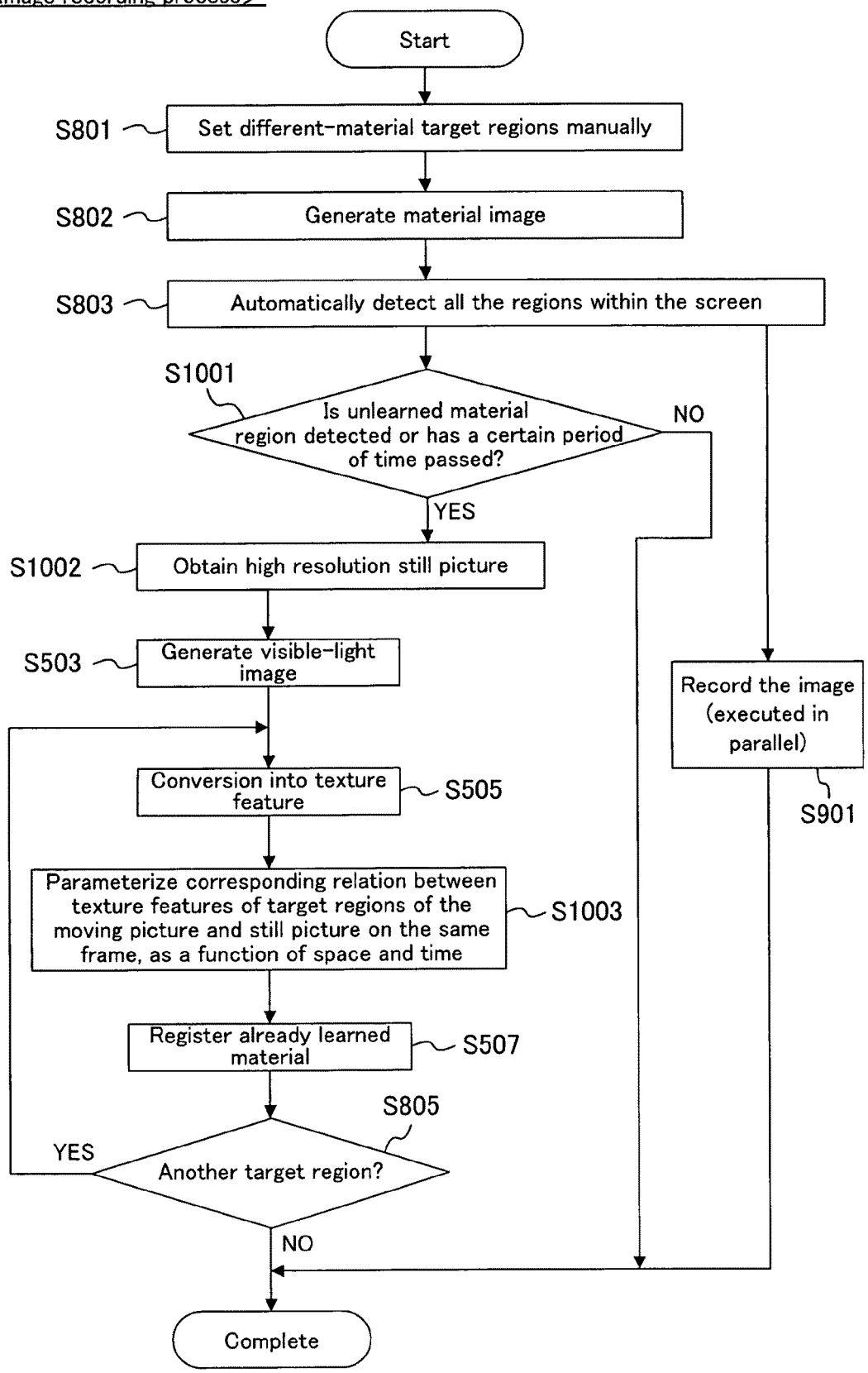
FIG. 34 is a flowchart showing a recording process according to the sixth embodiment of the present invention.

FIG. 34 is a flowchart showing a recording process according to the embodiment. The steps S801-S803 are the same as those of FIG. 25. First, the shooting person designates the target regions manually (S801). In this embodiment, not only the material but also the spatial position within the image is reflected upon the resolution increasing processing. Thus, the target region to be designated is referred to as a different-position target region. Thereafter, the camera generates a material image (S802), and automatically detects all the regions that have the same subject characteristic (material) as that of the designated different-position target region from the screen (S803).

At this time, assuming that the faces of the members A and B are designated as the different-position target regions, for example, it is possible that a large number of regions such as the members C, D, etc. of the same material (skin) are detected. In that case, it needs to determine which of the learned results, i.e. the resolution increasing parameters, to be applied to each of the detected target regions. For example, for the designated target regions, the resolution increasing parameters learned in regards to the corresponding target regions are employed with preference. For the regions detected in the step S803, any of the resolution increasing parameters of the designated regions may be employed, or a plurality of the resolution increasing parameters may be interpolated to be used.

Then, as in FIG. 29, the recording process is executed in parallel with the learning process (S901). In the learning process, a high-resolution still picture is obtained when an unlearned region is detected or video recording has been executed for a certain period of time (S1001, S1002). Thereafter, the resolution increasing parameters are learned from the high-resolution still image and the low-resolution moving image. The resolution increasing parameters are accumulated as a function of the screen space (x, y) and the time t (S1003).

Figure 35:
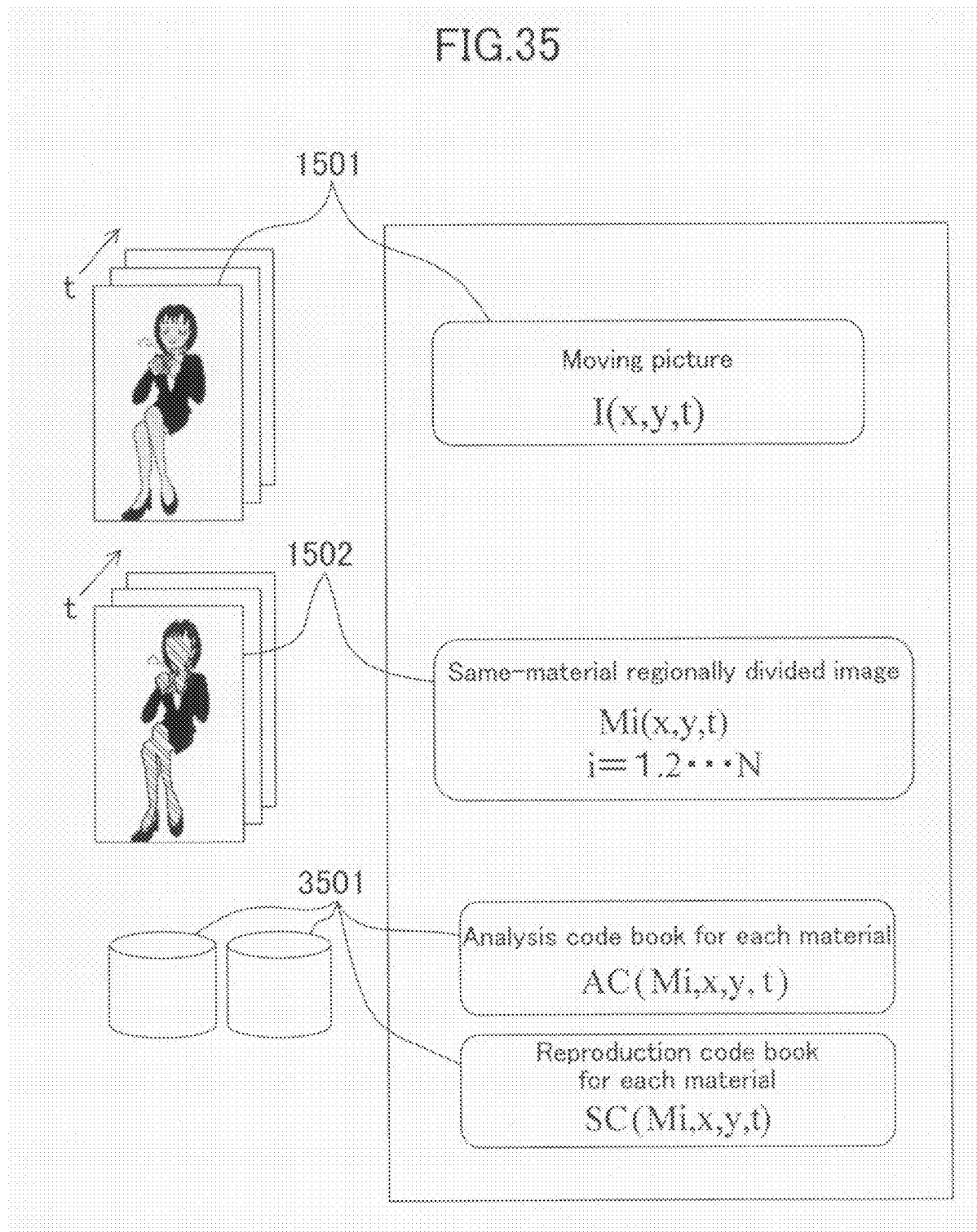
FIG. 35 is an illustration showing an image file format according to the sixth embodiment of the present invention.

FIG. 35 is a schematic illustration of an image file format that is obtained in this embodiment. Compared to the case of FIG. 15, it is different in respect that the resolution increasing parameter data 3501 constituted with the analysis code book AC (Mi, x, y, t) and the reproduction code book SC (Mi, x, y, t) is expressed as a function of the position (x, y) and the time t. The resolution increasing process according to the embodiment using the format shown in FIG. 35 is almost the same as that of FIG. 16, and the resolution increasing parameter obtained when the spatial position (x, y) and the time t come in match may be used in the step S705.

Figure 36:
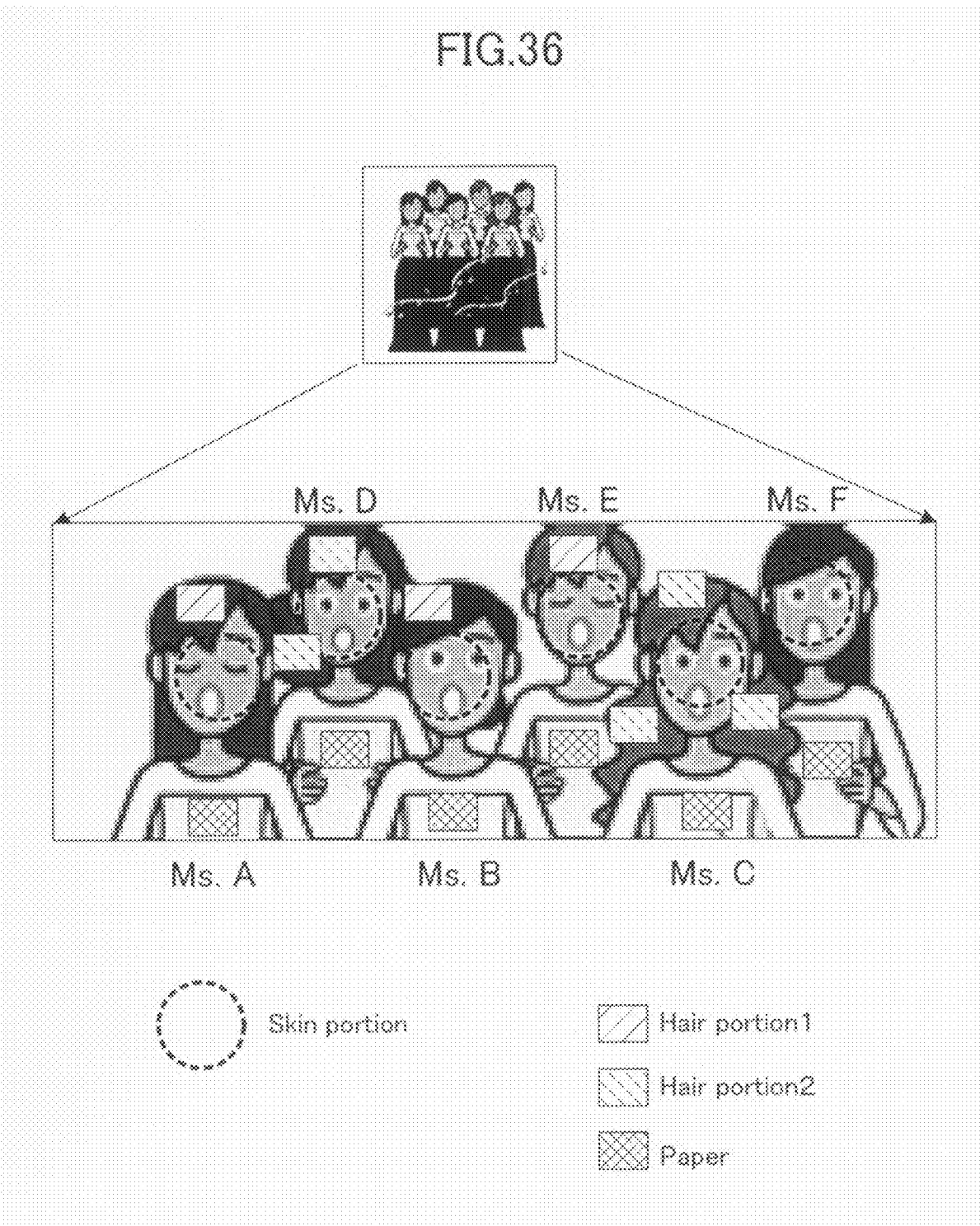
FIG. 36 is schematic illustration showing an example of the resolution increasing processing according to the sixth embodiment of the present invention.

FIG. 36 is schematic illustration showing an example of the resolution increasing processing according to the embodiment. Unlike the case of the fourth embodiment, the positions of the faces of each member are different even though the materials thereof are considered the same (skin portion). Thus, it is possible to perform resolution increasing processing by using the respective resolution increasing parameters. That is, it is possible to achieve high resolution for each of the members from A to F. For example, a face of an individual can be generated as another person with high resolution from the moving picture that is recorded with low resolution in a blurred state. Naturally, it is unnecessary to perform resolution increasing processing individually for those requiring high resolution only on the basis of the material, e.g. the hair portion 1, the hair portion 2, the paper portion of the music score, unless specifically required.

Seventh Embodiment

Figure 37:
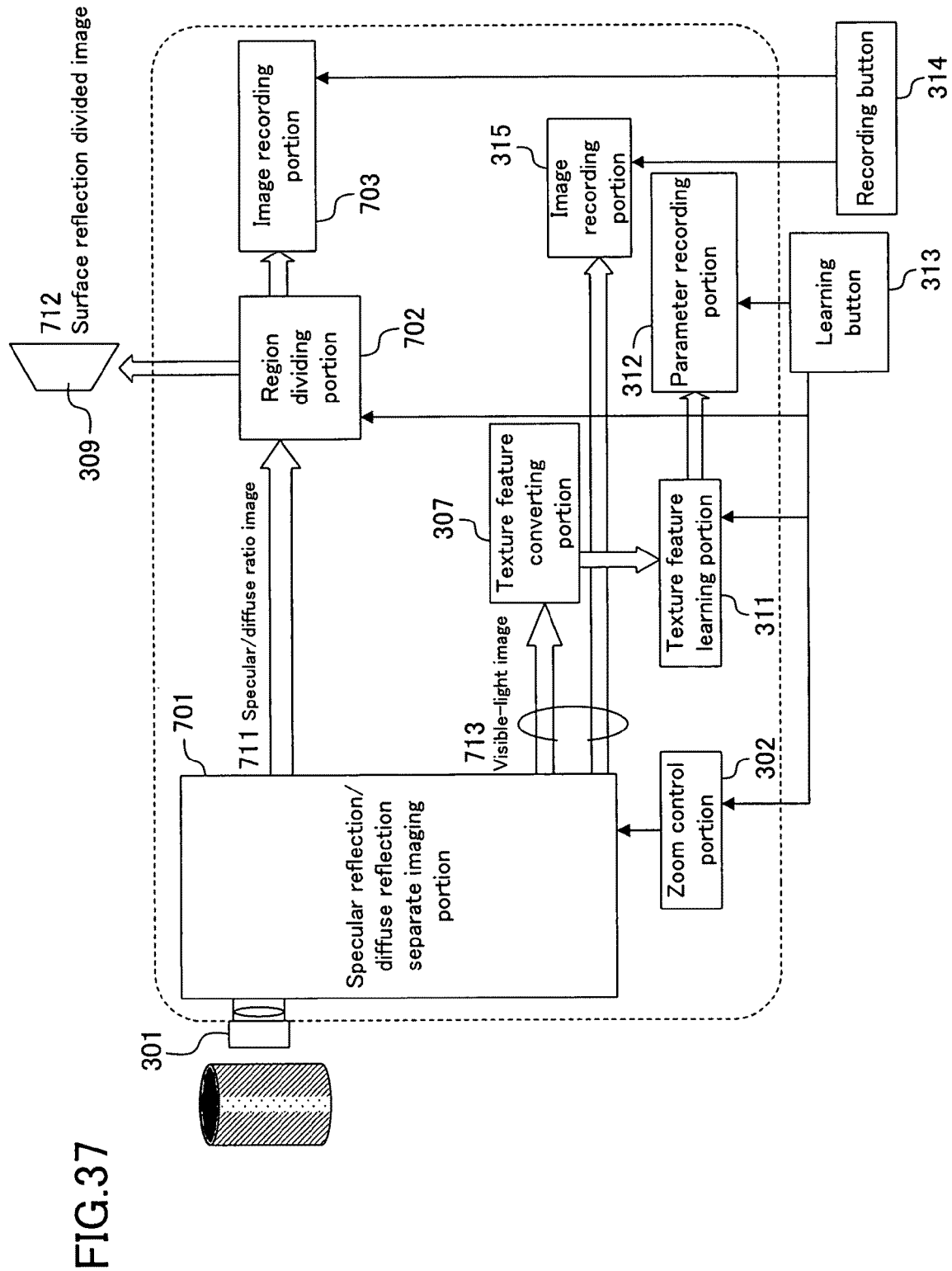
FIG. 37 is a block diagram showing the structure of an image processing apparatus according to a seventh embodiment of the present invention.

FIG. 37 is a block diagram showing an image processing apparatus according to a seventh embodiment of the present invention, which illustrates the case where the present invention is applied to a video movie camera. In this embodiment, the subject reflection state obtained from a specular reflection component and a diffuse reflection component is used as the subject characteristic for dividing the image into regions based upon the surface reflection state, and resolution increasing processing is performed by each region through learning. It is different from the structure of the above-described third embodiment shown in FIG. 17 in respect that there is provided a specular reflection/diffuse reflection separate imaging portion 701 which generates, along with a visible-light image 713, a specular/diffuse ratio image 711 showing the ratio of the specular reflection component to the diffuse reflection component on the subject surface. Further, a learned region dividing portion 702 for generating a surface reflection divided image 712 that is divided into a specular reflective region and a diffuse reflective region by binarization of the specular/diffuse ratio image 711, and a surface reflection divided image recording portion 703 for recording the surface reflection divided image 712 are provided. The surface reflection dividing image 712 is displayed on the learned region display portion 309, which affords convenience of learning for the shooting person. Further, the surface reflection divided image 712 is used as the region discriminating information in the resolution increasing process.

A zoom lens 301, a zoom control portion 302, and the specular reflection/diffuse reflection separate imaging portion 701 constitute the obtaining portion which is formed to be capable of obtaining, from the target regions of the subject, the first and second images having different resolutions and the specular/diffuse ratio image as the third image showing the subject characteristics. The texture feature converting portion 307 and the texture feature learning portion 311 constitute a rule generating portion for generating the resolution conversion rules which relate the first and second images to each other from the first and second images obtained by the obtaining portion. The learned region dividing portion 702 constitutes a regionally divided image generating portion for generating the surface reflection divided image as the regionally divided image that is obtained by dividing the specular/diffuse ratio image into regions based on the subject characteristics.

Up to the sixth embodiment described above, the subject characteristics are assumed to be the characters intrinsic to the substances such as the materials of the subject surfaces. However, there are cases where the reflection state of the light on the surface may differ when viewed from a certain direction under a certain lighting condition, even though the subjects are of the same material. In other words, the texture features required for performing resolution increasing processing, which depend on the roughness of the surface, should become completely different depending on the reflection state of the subject surface. For example, in the case of shooting a fruit having extensive roughness on the surface, the textures generated by the roughness on the surface are different on the highlight areas and shadowed areas even though the material of the surface is the same, and those areas are preferable to be learned as different regions. The surface reflection divided image 712 is the image that is divided into regions based on the reflection characteristic on the appearance determined based on the lighting and observing condition, i.e. based on the differences in the reflection state of the subject surface.

Prior to the moving picture recording process, the shooting person executes the image learning process. First, the shooting person determines the target regions, and presses the learning button 313 by directing the camera towards the corresponding portion. Upon receiving a signal thereof, the zoom control portion 302 operates the zoom lens 301, and the specular reflection/diffuse reflection separate imaging portion 701 obtains the low-resolution image and the high-resolution image (visible-light image 713) of the target region. Further, the specular reflection/diffuse reflection separate pickup portion 701 separates the specular reflection component and the diffuse reflection component to generate the specular/diffuse ratio image 711. The learned region dividing portion 702 performs binarization of the specular/diffuse ratio image 711 to generate the surface reflection divided image 712. The generated surface reflection divided image 712 is displayed on the learned region display portion 309.

Figure 38:
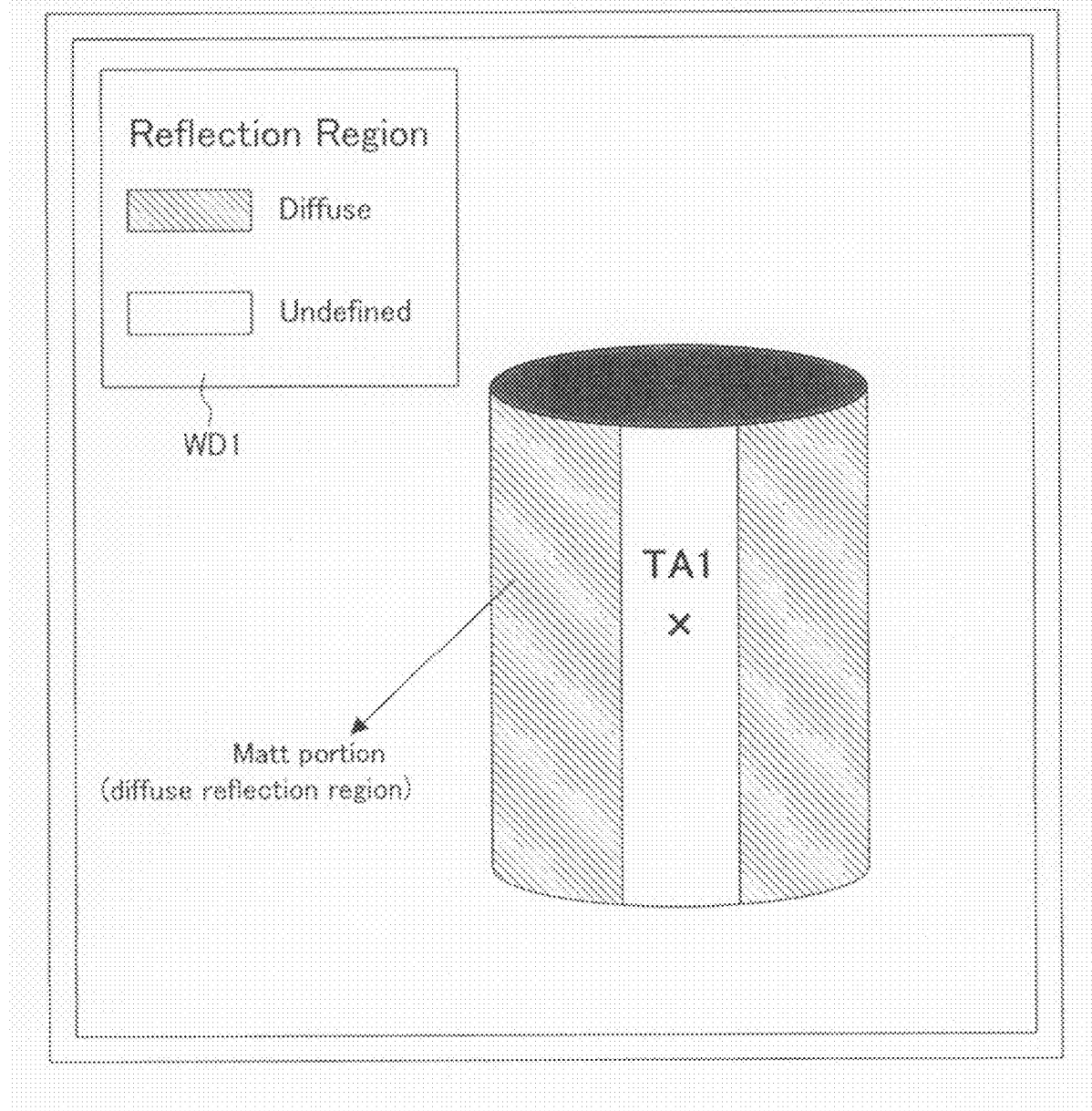
FIG. 38 is a display example of a surface reflection divided image according to the seventh embodiment of the present invention.

FIG. 38 is a display example of the learned region display portion 309. In FIG. 38, the subject is assumed to be a cylinder having a gloss on the surface. In the case of FIG. 38, displayed on the center of the screen is the surface reflection divided image 712 where the subject image is divided into a "glossy portion (specular reflection region)" and a matt portion (diffuse reflection region)". Further, on the upper-left side of the screen, there is displayed a window WD1 showing an introduction of the learned region. It can be seen from the window WD1 that only "Diffuse" (diffuse reflection region) has been learned. Meanwhile, the glossy portion of the cylinder has not been learned yet.

Upon looking at such display, the shooting person operates the learning button 313 to set the target region TA1 in the region (the unlearned region) of the subject to execute learning. That is, the learned region display portion 309 has a role of assisting the shooting person to check the unlearned region and set another target region. The signal from the learning button 313 is also sent to the texture feature learning portion 311 and the resolution increasing parameter recording portion 312, and the resolution increasing parameter between the texture features is generated and recorded.

Further, the shooting person may check which regions of the image the learned material is distributed from the display on the learned region display portion 309, and may perform relearning by setting the target region again if a wrong region is labeled as having the same material.

After the learning process, the shooting person presses the recording button 314 for executing the recording process. With this, the moving picture of the visible-light image 713 is recorded to the image recording portion 315. In this case, it is desirable to perform proper image compression.

Figure 39:
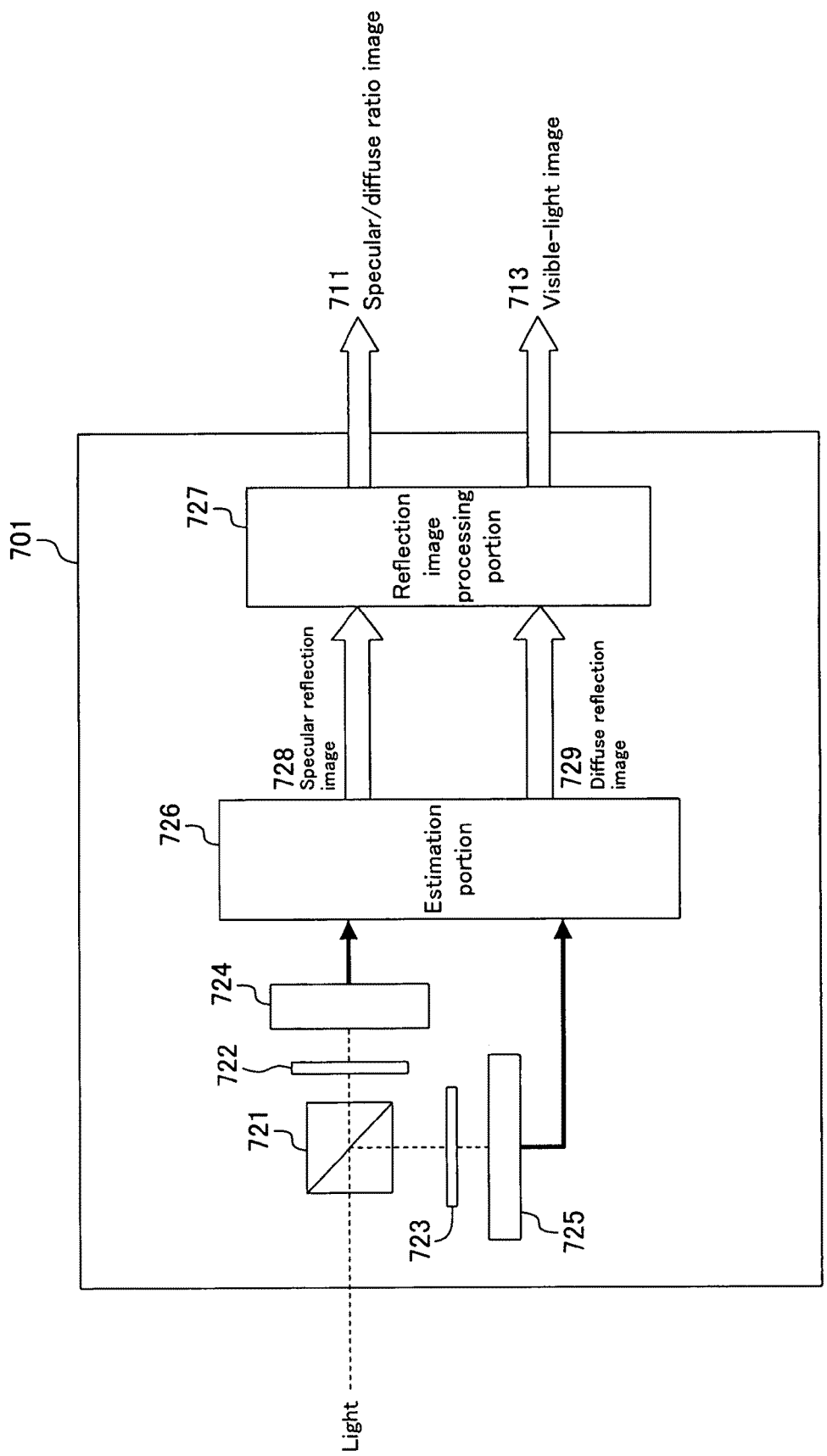
FIG. 39 is an illustration showing a structural example of a specular reflection/diffuse reflection separate imaging portion according to the seventh embodiment of the present invention.

FIG. 39 is an illustration showing a structural example of a specular reflection/diffuse reflection separate imaging portion 701. With this structure, light from the subject transmitted through the zoom lens is separated at a half mirror 721, which then reaches single-plate imaging devices 724 and 725 after transmitting through polarization plates 722 and 723 that have a different polarization axis from each other. As the single-plate imaging devices 724 and 725, used are the wide dynamic range elements capable of shooting specular reflections of extremely bright luminance. An estimation portion 726 uses image signals from each of the imaging devices 724 and 725 to separate the specular reflection component and the diffuse reflection component so as to generate a specular reflection image 728 and a diffuse reflection image 729. The details of this method can be found in "Simultaneous Observation System of Two Images for Diffuse/Specular Reflection Separtaion" (The 9th Symposium on Sensing via Image Information, Transactions, I-1, pp. 537-542), for example. The subjects that can be separated by this method are limited to those of materials that match with a dichroic reflection model such as a non-metallic plastic. A reflection image processing portion 727 generates the specular/diffuse ratio image 711 that shows the ratio of the specular reflection component to the diffuse reflection component at each pixel position and the visible light image 712 before being separated (the sum of the separated specular reflection image 728 and the diffuse reflection image 729) from the specular reflection image 728 and the diffuse reflection image 729.

Figure 40:
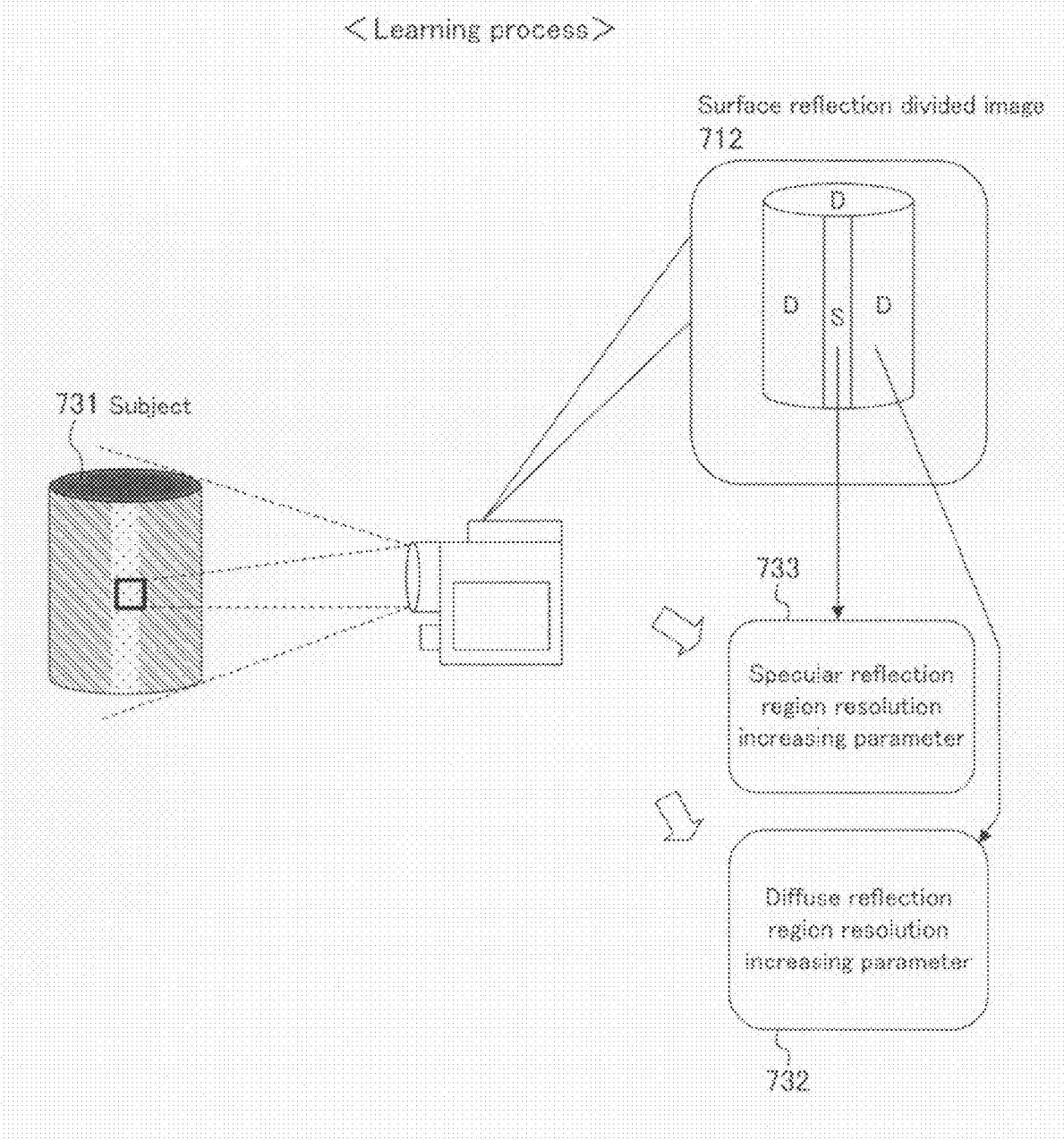
FIG. 40 is a flowchart showing a learning process according to the seventh embodiment of the present invention.
Figure 41:
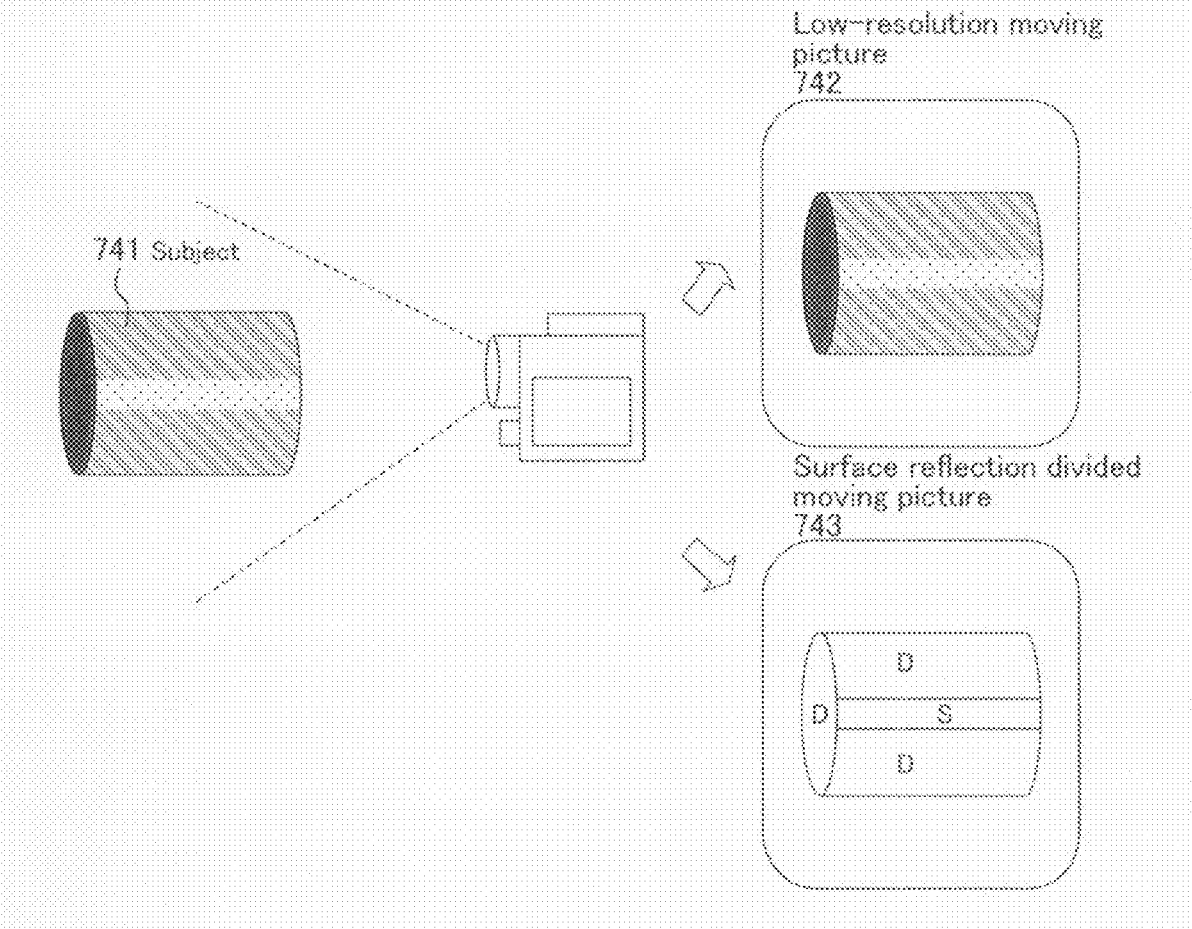
FIG. 41 is a flowchart showing a moving picture recording process according to the seventh embodiment of the present invention.
Figure 42:
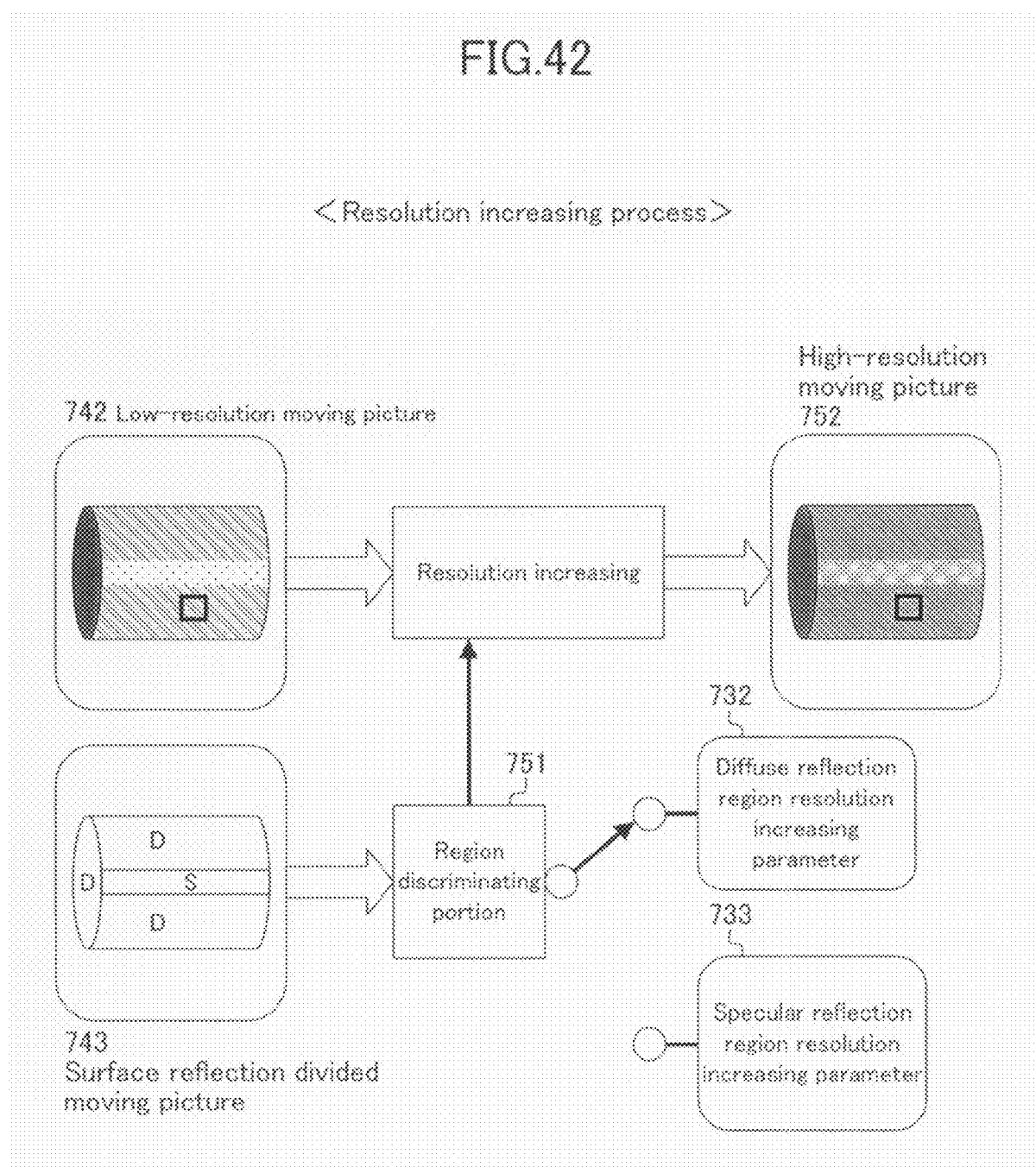
FIG. 42 is a flowchart showing a resolution increasing process according to the seventh embodiment of the present invention.

FIG. 40-FIG. 42 are illustrations showing the flows of the processing according to the embodiment, in which FIG. 40 shows a learning process, FIG. 41 shows a moving picture recording process, and FIG. 42 shows a resolution increasing process. As shown in FIG. 40, in the learning process, the subject 371 is shot first, and the surface reflection divided image 712 is generated. In the drawings, "S" indicates the specular reflection region, and "D" indicates the diffuse reflection region. The shooting person finds out the target regions to be zoomed from the surface reflection divided image 712, and shoots the surface of the subject 731 by a zoom lens to perform learning of a pair of low-resolution image and the high-resolution image. As a result, a diffuse reflection region resolution increasing parameter 732 and a specular reflection region resolution increasing parameter 733 can be obtained as the resolution increasing parameters for each region.

Next, as shown in FIG. 41, in the moving picture recording process, a subject 741 is shot and a low-resolution moving picture 742 is recorded. At this time, a surface reflection divided moving picture 743 is recorded simultaneously. The subject 741 at this time is not necessarily as same as the subject 731 of the learning process. In addition, the lighting condition and the shooting condition are not necessarily the same. The subject 741 in FIG. 41 is drawn in a laid-down state to be different from the subject in FIG. 40 to implicate such situation.

Then, as shown in FIG. 42, resolution increasing processing is performed on the low-resolution moving picture 742 in the resolution increasing process to generate a high-resolution moving picture 752. At this time, a region discriminating portion 751 discriminates the regions by using the surface reflection divided moving picture 743. Then, resolution increasing processing is executed by using the diffuse reflection region resolution increasing parameter 732 in the diffuse reflection region and using the specular reflection region resolution increasing parameter 733 in the specular reflection region. Details of the resolution increasing processing are the same as those of the embodiments described above, so that explanations thereof are omitted.

With the embodiment as described above, the subject has different texture features depending on the surface reflection states such as the specular reflection and diffuse reflection states. Thus, it is possible to perform the optimum resolution increasing processing for each state by discriminating the surface reflection states. Therefore, a better resolution increasing processing can be achieved compared to the conventional learning-type high-resolution method that uses only the luminance, or by separation of the subject image based on the materials, such as a spectral image.

In this embodiment, the case of using a half mirror and a polarization plate is described as an example of the structure of the specular reflection/diffuse reflection separate imaging portion 701. Instead, the specular reflection component and the diffuse reflection component may be separated by, shooting an image with two or more kinds of different polarization axes through rotating the polarization plate without using the half mirror. Alternatively, a method of polarizing the lighting may be employed. As the methods for separating the specular reflection component and the diffuse reflection component without using the polarization plate, various methods are known, e.g. a method of using the color characteristics of the reflected light, and a method of using photometric stereo for changing the light source and using linearization of the image. Details of those can be found in "Separation of diffuse and specular components of surface reflection—using multiple observations through a polarizer and probabilistic independence property—"Meeting on Image Recognition and Understanding (MIRU) 2002, I-469-476. Those existing methods may be employed as the structure of the specular reflection/diffuse reflection separate imaging portion 701.

Eighth Embodiment

Figure 43:
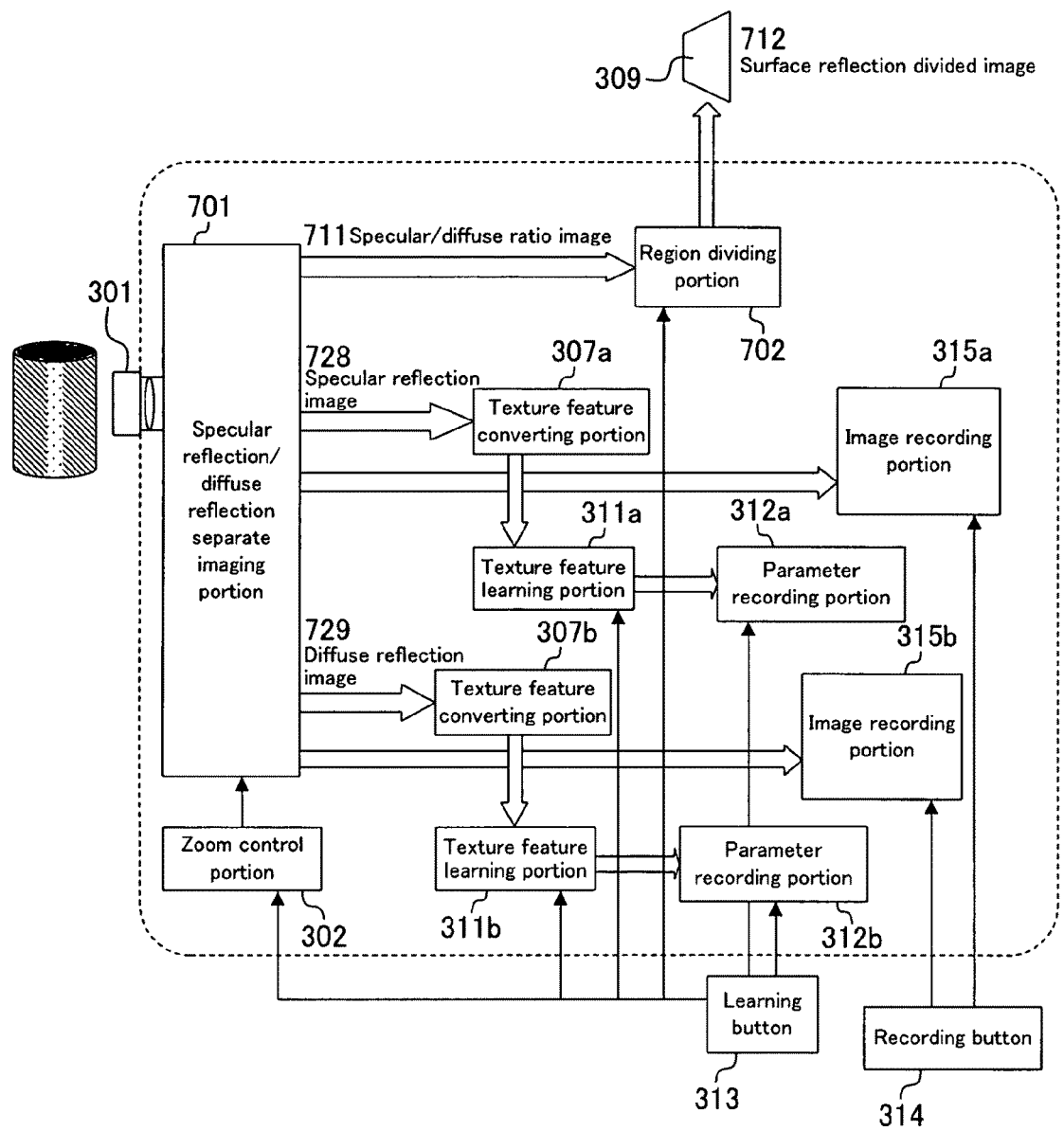
FIG. 43 is a block diagram showing the structure of an image processing apparatus according to an eighth embodiment of the present invention.

FIG. 43 is a block diagram of an image processing apparatus according to an eighth embodiment of the present invention, which shows a case of applying the present invention to a video movie camera. The structure of this embodiment is different from the structure of the seventh embodiment in FIG. 37 in respect that learning and recording are executed on each of the specular reflection image 728 and the diffuse reflection image 729 instead of performing those on the visible-light image 713. In the structure of FIG. 37, the first and second images having different resolutions are obtained for the visible-light image 713. In the structure of FIG. 43, however, the first and second images having different resolutions are obtained for each of the specular reflection image 728 and the diffuse reflection image 729. A texture feature converting portion 307a, a texture feature learning portion 311a, a resolution increasing parameter recording portion 312a, and an image recording portion 315a are provided to be used for the specular reflection image, while a texture feature converting portion 307b, a texture feature learning portion 311b, a resolution increasing parameter recording portion 312b, and an image recording portion 315b are provided to be used for the diffuse reflection image.

By separating the luminance from the specular reflection component, the delicate texture information depending on the roughness of the subject surface can be obtained more accurately. Further, by separating the diffuse reflection component, the reflectance (albedo) information such as print on the subject surface can be obtained more accurately. Therefore, by performing the resolution increasing processing respectively on the specular reflection image and the diffuse reflection image, and then mixing both, it is possible to perform the resolution increasing processing with higher efficiency than that of the conventional case.

Furthermore, recording of the surface reflection divided image 712 becomes unnecessary, since the specular reflection image and the diffuse reflection image are recorded separately. That is, the surface reflection divided image 712 is simply displayed on the learned region display portion 309 only to show the shooting person which portion of the subject should be learned.

Prior to the moving picture recording process, the shooting person executes the image learning process. First, the shooting person determines the target regions, and presses the learning button 313 by directing the camera towards the corresponding portion. Upon receiving a signal thereof, the zoom control portion 302 operates the zoom lens 301, and a specular reflection/diffuse reflection separate imaging portion 3703 obtains the low-resolution image and the high-resolution image for the specular reflection image 728 and the diffuse reflection image 729, respectively. Further, the specular reflection/diffuse reflection separate pickup portion 701 generates the specular/diffuse ratio image 711, and the learned region dividing portion 702 performs binarization of the specular/diffuse ratio image 711 to generate the surface reflection divided image 712. The generated surface reflection divided image 712 is displayed on the learned region display portion 309.

Upon looking at such display, the shooting person operates the learning button 313 to set the target region in the region of the subject that is the unlearned region to execute learning. The signal from the learning start button 313 is also sent to the texture feature learning portions 311a, 311b and the resolution increasing parameter recording portions 312a and 312b, and the resolution increasing parameter between the texture features is generated and recorded.

Figure 44:
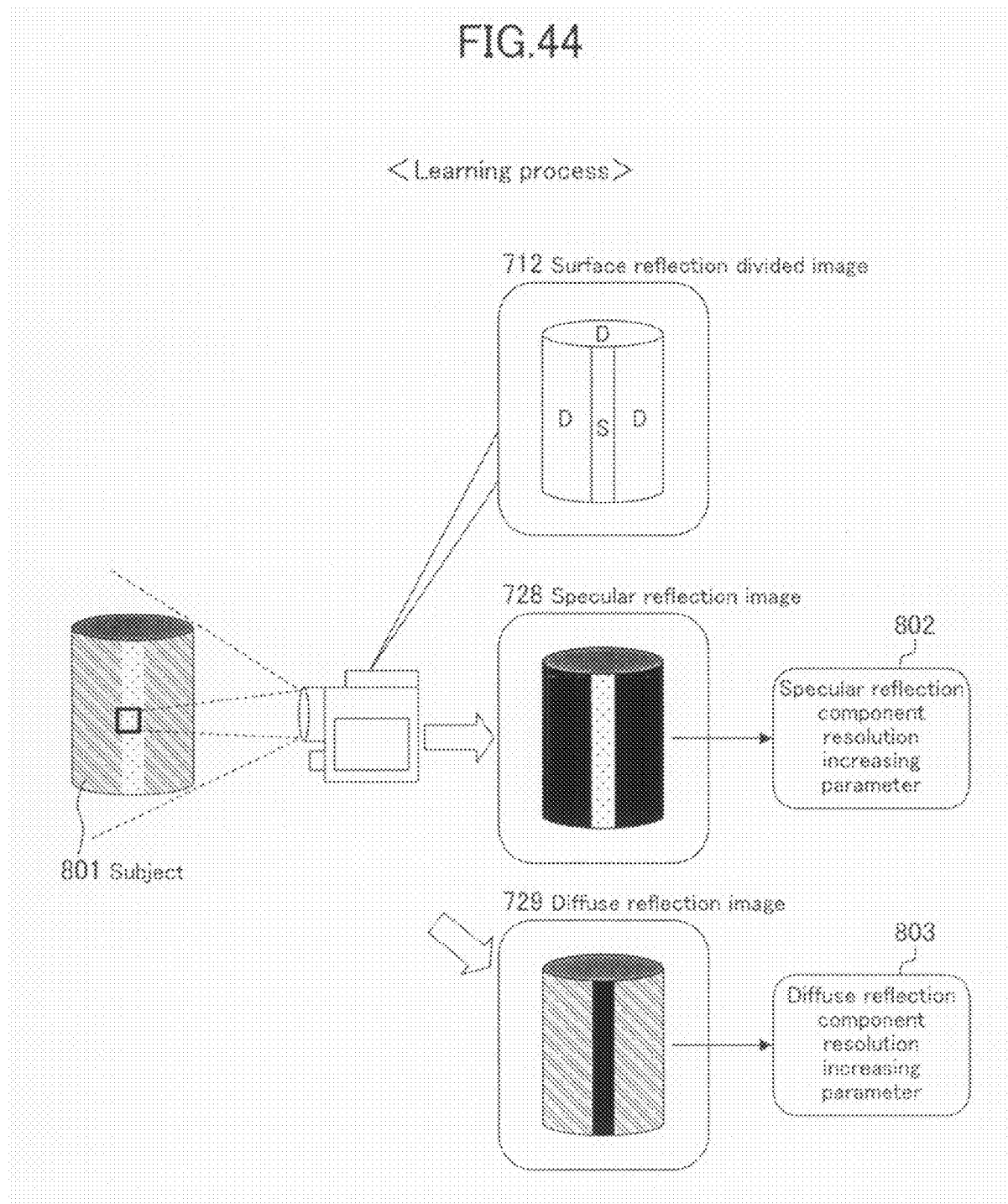
FIG. 44 is a flowchart showing a learning process according to the eighth embodiment of the present invention.
Figure 45:
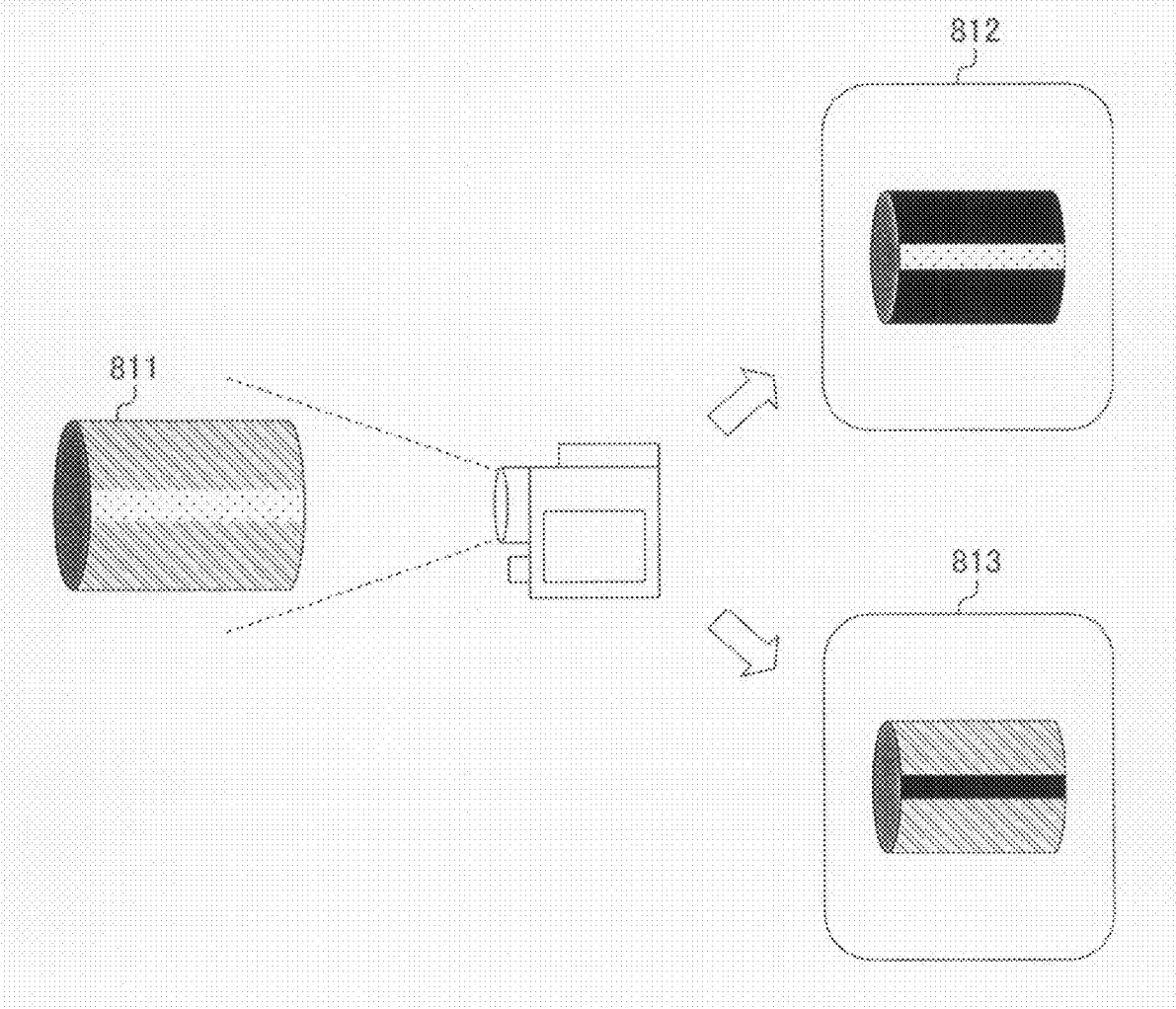
FIG. 45 is a flowchart showing a recording process according to the eighth embodiment of the present invention.

FIG. 44-FIG. 46 are illustrations showing the flows of the processing according to the embodiment, in which FIG. 44 shows a learning process, FIG. 45 shows a moving picture recording process, and FIG. 46 shows a resolution increasing process. As shown in FIG. 44, in the learning process, the specular reflection image 728 and the diffuse reflection image 729 of a subject 801 is obtained, and a specular reflection component resolution increasing parameter 802 and a diffuse reflection component resolution increasing parameter 803 are accumulated.

After the learning process, the shooting person presses the recording button 314 for executing the recording process. With this, a subject 811 is shot, and the moving picture of the visible-light image is separated into the components of a specular reflection image 812 and a diffuse reflection image 813 to be recorded. These images are moving pictures shot and recorded with low resolution without being zoomed. In this case, it is desirable to perform proper image compression.

Next, as shown in FIG. 46, in the resolution increasing process, resolution increasing processing is performed on the recorded specular reflection image 812 first by using the specular reflection component resolution increasing parameter 802 to generate a high-resolution specular reflection image 822. At this time, resolution increasing processing is performed on the diffuse reflection image 813 by using the diffuse reflection component resolution increasing parameter 803 to generate a high-resolution diffuse reflection image 823. Details of the resolution increasing processing are the same as those of the embodiments described above, so that explanations thereof are omitted. Finally, the two components of the images 822 and 823 on which resolution increasing processing is performed are added by an adder 824 thereby to generate a high-resolution image 825.

Lastly, the possibility of detecting the execution of the present invention according to the seventh and eighth embodiments will be mentioned. It is the feature of the present invention to perform the different-type resolution increasing processing on each region that exhibits a different reflection state depending on the lighting and observing conditions. Therefore, when the subject of the same material is shot to generate regions with different reflection states, and if it is detected that the state of the high-resolution differs depending on the regions, it can be considered a clear evidence that the present invention is executed.

The present invention can achieve highly accurate resolution conversion by reflecting the subject characteristics with a small amount of image processing. Thus, it is effective to generate digital high-resolution moving images with full of superb textures in various applied fields where the visual information quantity is considered important, for example. Furthermore, the present invention is also effective for displaying images on low-resolution display systems such as portable telephones, for example.

What is claimed is:

1. An image processing method comprising the steps of:
   (a) obtaining a plurality of images of a subject each having a different resolution, and learning a resolution conversion rule from the plurality of images for each of subject characteristics, each of the plurality of images being a visible light image;
   (b) obtaining an original image and dividing the original image into regions based on the subject characteristics; and
   (c) converting a resolution of the original image by applying to each of the regions obtained in step (b) the resolution conversion rule learned in step (a) regarding the subject characteristic corresponding to the region.

2. The method of claim 1, wherein the subject characteristics include an optical characteristic independent of a shooting distance.

3. The method of claim 2, wherein spectral reflectance or infrared spectral reflectance of each image is used as the subject characteristic.

4. The method of claim 1, wherein the subject characteristics include a material of a surface of the subject.

5. The method of claim 1, wherein the subject characteristics include a reflection state of a surface of the subject.

6. The method of claim 1, wherein the resolution conversion rule describes a corresponding relation of texture feature vectors between the images having different resolutions.

7. The method of claim 1, wherein the subject characteristics of an image include a visible light image, and wherein learning a resolution conversion rule includes obtaining a feature vector indicative of a texture of the subject for each of the plurality of images from the visible light images and determining a resolution conversion rule based on a relation between the feature vectors obtained from the visible light images.

8. An image processing method comprising the steps of:
   determining a target region of a subject;
   obtaining a first image and a second image with different resolutions regarding the target region, each of the first and second images being a visible light image;
   learning a resolution conversion rule for relating the first and second images to each other;
   obtaining a subject characteristic for the target region; and
   relating the resolution conversion rule and the subject characteristic, and registering the related resolution conversion rule and subject characteristic to a storage device.

9. An image processing method comprising the steps of:
   learning a resolution conversion rule for each of subject characteristics from a plurality of images of a subject, each of the plurality of images being a visible light image and having a different resolution;
   obtaining an original image and region dividing information that indicates regions on the original image, the regions being divided based on subject characteristics; and
   converting a resolution of the original image by applying to each of the regions indicated by the region dividing information the resolution conversion rule regarding the subject characteristic corresponding to the region.

10. An image processing apparatus comprising:
    an obtaining portion operable to obtain, regarding a target region of a subject, a first and a second images having different resolutions, as well as a third image indicating a subject characteristic;
    a rule learning portion which learns, from the first and second images, a resolution conversion rule for relating the first and second images to each other; and
    a regionally divided image generating portion which generates, from the third image, a regionally divided image that is divided into regions based on the subject characteristic.

11. The apparatus of claim 10, wherein the obtaining portion obtains, as the third image, a spectral image constituted with spectral information of the subject.

12. The apparatus of claim 10, wherein the obtaining portion comprises a zoom lens and obtains the first and second images by using an optical zooming method.

13. The apparatus of claim 10, further comprising a learning button for giving an instruction to generate the resolution conversion rule from an exterior of the apparatus.

14. The apparatus of claim 10, further comprising a display portion for displaying the regionally divided image.

* * * * *